(12) United States Patent
Srivastava et al.

(10) Patent No.: US 10,645,272 B2
(45) Date of Patent: May 5, 2020

(54) CAMERA ZOOM LEVEL AND IMAGE FRAME CAPTURE CONTROL

(71) Applicant: QUALCOMM Incorporated, San Diego, CA (US)

(72) Inventors: Nitin Srivastava, Hyderabad (IN); Lucky Bagaria, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/830,801

(22) Filed: Dec. 4, 2017

(65) Prior Publication Data

US 2019/0174054 A1    Jun. 6, 2019

(51) Int. Cl.
*H04N 5/232*    (2006.01)
*G06F 3/0488*    (2013.01)

(52) U.S. Cl.
CPC ..... *H04N 5/23216* (2013.01); *H04N 5/23293* (2013.01); *H04N 5/23296* (2013.01); *G06F 3/04883* (2013.01)

(58) Field of Classification Search
CPC .......... H04N 5/23216; H04N 5/23293; H04N 5/23296; G06F 3/04883; G06F 3/005; G06F 3/0416; G06F 3/0484–0487
See application file for complete search history.

(56) References Cited

U.S. PATENT DOCUMENTS

| | | |
|---|---|---|
| 2008/0165255 A1 | 7/2008 | Christie et al. |
| 2009/0015703 A1 | 1/2009 | Kim et al. |
| 2010/0289825 A1 | 11/2010 | Shin et al. |
| 2011/0199517 A1 | 8/2011 | Laberge et al. |
| 2012/0011456 A1* | 1/2012 | Noda ............. G03B 17/40 17/40 |
| 2012/0105588 A1 | 5/2012 | Yamamoto |
| 2012/0113216 A1* | 5/2012 | Seen ........... H04N 5/23293 348/38 |

(Continued)

FOREIGN PATENT DOCUMENTS

| | | |
|---|---|---|
| EP | 2405299 A2 | 1/2012 |
| EP | 2482179 A2 | 8/2012 |
| WO | WO-2011007264 A1 | 1/2011 |

OTHER PUBLICATIONS

International Search Report and Written Opinion—PCT/US2018/063452—ISA/EPO—dated Apr. 15, 2019.

*Primary Examiner* — Mekonnen D Dagnew
(74) *Attorney, Agent, or Firm* — QUALCOMM Incorporated

(57) ABSTRACT

Methods, devices, and systems are disclosed. In some aspects, a device includes a processor coupled to a camera module, a display, and a memory. The processor can be configured to cause the display to output a graphical user interface element including a first region. The processor can also receive, from a user input surface, a first input type including movement of an input element relative to the user input surface. The processor can control a first imaging operation based on the first input type and cause the first region to move relative to the user input surface while the first input type is received. The processor can control a second imaging operation based on a second input type, and the second input type can be received after the first input type. The second input type can include a selection of the first region by the input element.

34 Claims, 39 Drawing Sheets

(56) References Cited

U.S. PATENT DOCUMENTS

| | | | |
|---|---|---|---|
| 2014/0063313 A1* | 3/2014 | Choi | H04N 5/23216 |
| | | | 348/333.02 |
| 2014/0118563 A1* | 5/2014 | Mehta | G06F 3/04845 |
| | | | 348/207.1 |
| 2014/0368436 A1 | 12/2014 | Abzarian et al. | |
| 2015/0326793 A1 | 11/2015 | Mäkinen et al. | |
| 2016/0139774 A1* | 5/2016 | Rivard | G06F 3/04842 |
| | | | 715/781 |
| 2016/0381282 A1 | 12/2016 | Bandlamudi et al. | |
| 2017/0078564 A1 | 3/2017 | Jones et al. | |
| 2017/0090571 A1 | 3/2017 | Bjaerum et al. | |
| 2018/0129224 A1 | 5/2018 | Hur | |
| 2019/0174055 A1 | 6/2019 | Srivastava et al. | |

* cited by examiner

CAMERA ZOOM LEVEL AND IMAGE FRAME CAPTURE CONTROL

BACKGROUND

Field

Aspects of this disclosure relate generally to electronic image capture devices. More specifically, some aspects of this disclosure relate to controlling imaging operations in electronic image capture devices.

Background

An electronic device may include, or have access to image data received from, one or more camera modules. In such devices, an imaging operation such as a zoom level adjustment of the one or more camera modules may be controlled. For example, a zoom level adjustment of a camera module can be increased (e.g., a "zoom-in" operation) to increase an overall size of a subject relative to an image frame. Additionally, a zoom level of the camera module can be decreased (e.g., a "zoom-out" operation) to decrease an overall size of a subject relative to an image frame and/or to capture more portions of a scene within the image frame. Additionally, other imaging operations can be controlled.

SUMMARY

Aspects of the present disclosure are directed to methods and devices for controlling, at least, first and second imaging operations. In one aspect a device includes a memory and a processor. The processor is coupled to a camera module, a display having a user input surface, and the memory. The processor is configured to cause the display to output a graphical user interface element having a first region. The processor is also configured to receive, from the user input surface, a first user input type including movement of an input element relative to the user input surface. The processor is configured to control a first imaging operation based on the first input type and to cause the first region to move relative to the user input surface while the first input type is received. The processor also is configured to control a second imaging operation based on a second input type that is received after the first input type. The second input type includes a selection of the first region by the input element.

In some aspects, the first input type can be received during a first portion of a continuous user input and the second input type can be received during a second portion of the continuous user input. For example, the first portion and the second portion can be arranged in temporal series with no intervening portion there between. In some aspects, the input element includes a first structure that translates relative to the user input surface and a second structure that translates relative to the user input surface while the first input type is receive. The second input type can include a translation of the first structure relative to the input surface while the second structure is stationary relative to the input surface during the second input type. The second input type can include a release of at least one of the first structure and the second structure from the user input surface.

In another aspect, a method is disclosed. The method includes causing a display to output a graphical user interface element having a first region. The method also includes receiving, from a user input surface, a first user input type including movement of an input element relative to the user input surface. The method includes controlling a first imaging operation based on the first input type, causing the first region to move relative to the user input surface while the first input type is received, and controlling a second imaging operation based on a second input type that is received after the first input type. The second input type includes a selection of the first region by the input element.

In another aspect, a non-transitory computer-readable storage medium is disclosed. The non-transitory computer-readable storage medium stores instructions that, when executed, cause one or more processors to cause a display to output a graphical user interface element, the graphical user interface element including a first region. The instructions also cause one or more processors to receive, from a user input surface, a first user input type including movement of an input element relative to the user input surface, control a first imaging operation based on the first input type, cause the first region to move relative to the user input surface while the first input type is received, and control a second imaging operation based on a second input type, wherein the second input type is received after the first input type and includes a selection of the first region by the input element.

In yet another aspect, a device is disclosed. The device includes means for causing a display to output a graphical user interface element having a first region. The device also includes means for receiving, from a user input surface, a first user input type including movement of an input element relative to the user input surface. The device also includes means controlling a first imaging operation based on the first input type, means for causing the first region to move relative to the user input surface while the first input type is received, and means for controlling a second imaging operation based on a second input type that is received after the first input type. The second input type includes a selection of the first region by the input element.

The details of one or more examples are set forth in the accompanying drawings and the description below. Other features, objects, and advantages will be apparent from the description, drawings, and claims.

DETAILED DESCRIPTION

Figure 1A:
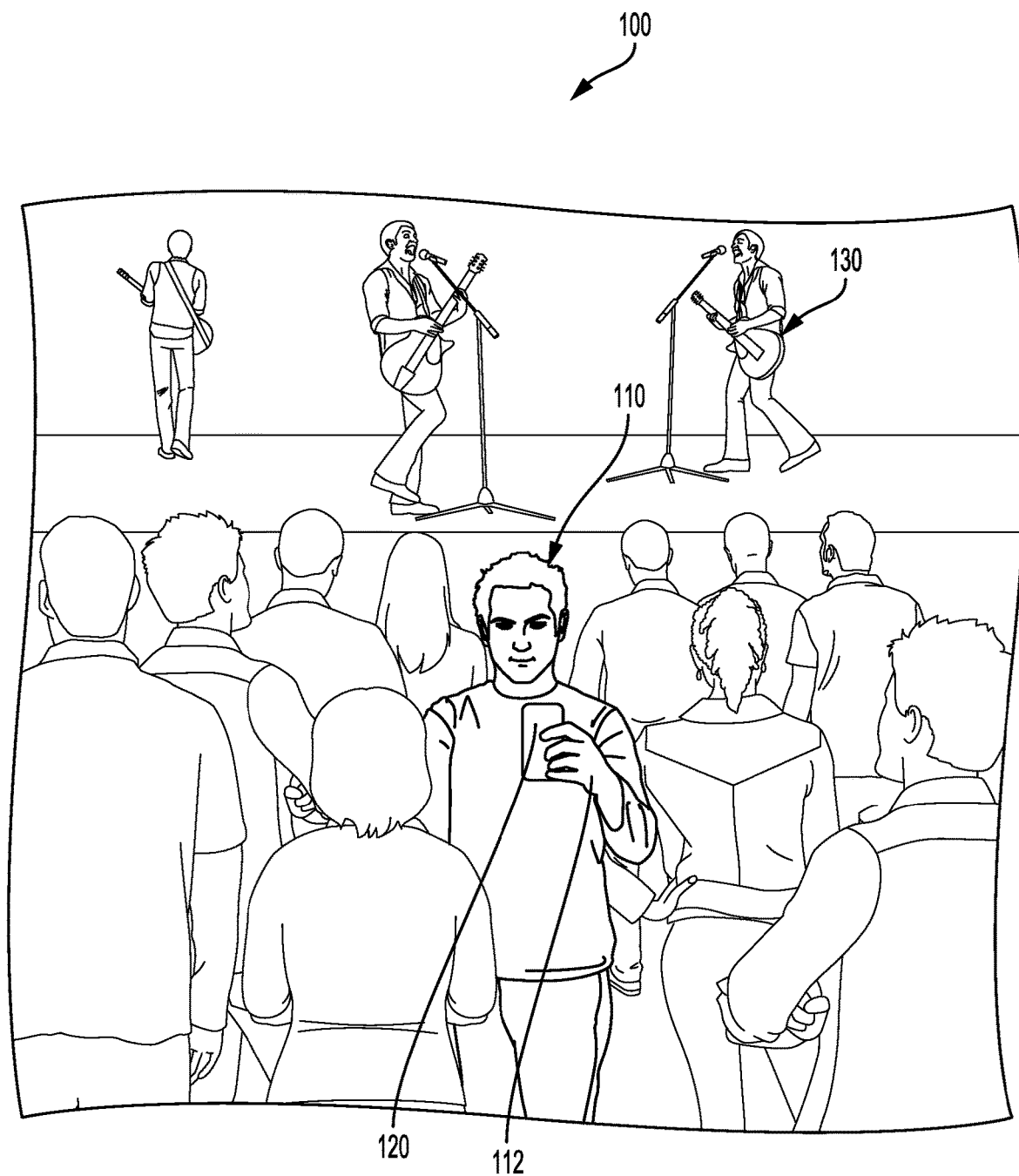
FIGS. 1A-1C depict an example scene and separate user inputs to control camera zoom level and image frame capture operations using a front facing camera module.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "adjusting," "causing," "accessing," "receiving," "sending," "using," "selecting," "determining," "normalizing," "multiplying," "averaging," "monitoring," "comparing," "applying," "updating," "measuring," "deriving," "estimating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, equivalents thereof, and the like.

Aspects of the present disclosure are applicable to any suitable electronic image capture device (such as mobile phones, tablets, laptop computers, digital cameras, web cameras, security systems, personal digital assistants, gaming systems, media players, e-book readers, television platforms, intelligent monitors, an automobile navigation systems, a wearable device (e.g., a head mounted display, other eyewear, a watch, a sleeve, etc.), and so on) that includes, or has access to image data from, one or more cameras, and may be implemented in electronic devices having a variety of camera configurations. Some aspects of the present disclosure can be implemented in or by a device that is able to cause a camera to "zoom-in" or "zoom-out" when framing a scene.

As used herein, a "zoom level" may correspond to an effective optical angle and focal length of an image frame received by one or more cameras at a given zoom level value. For example, the term zoom-in can refer to a relative increase in zoom level as related to an effective optical angle narrowing and focal length increase as compared to a lower zoom level exhibiting a larger effective optical angle and decreased focal length. Further, the term zoom-in can refer to an imaging operation (e.g., a zoom level control operation). Similarly, the term zoom-out can refer to a relative zoom level lowering or reduction with an effective optical angle being widened and focal length being shortened as compared to another, higher zoom level. In some examples, a numeric zoom level may correspond to a factor that an object in a scene may be enlarged relative to a received image frame. For example, a 10× zoom level may result in an object appearing 10× larger than a default zoom level (e.g., a zoom level of 1×).

Those having skill in the art will understand that an electronic image capture device may include a camera module having, for example, a lens, an aperture, and an image sensor. The elements of the camera module can be controlled to receive and/or capture image frames at a plurality of different zoom levels. The different zoom levels can be implemented by digital zoom and/or optical zoom techniques that are well understood in the art. For example, zoom level can be controlled in a camera module including a single camera by moving a lens position of the camera relative to the sensor and/or by digital zoom techniques. Additionally, zoom level can be controlled in camera modules including more than one camera (e.g., asymmetric dual-camera modules) by applying digital zoom to image data received by a first camera having a fixed focal length until a transition zoom level is reached, and then transitioning to a second camera having a different fixed focal length where digital zoom can then be performed on the image data received by the second camera. In this way, an overall effective range of zoom level for a multiple camera module can be extended without increasing a z-height dimension of the camera module by switching between two or more cameras having differing fields-of-view, optics, and/or sensor sizes.

From these examples, it can be appreciated that there are many options and available configurations for adjusting and/or controlling zoom level in electronic image capture devices. Further, those having skill in the art will appreciate that zoom level control functionality is an important enabler to a satisfactory user experience when capturing an image frame as described below.

Figure 1B:
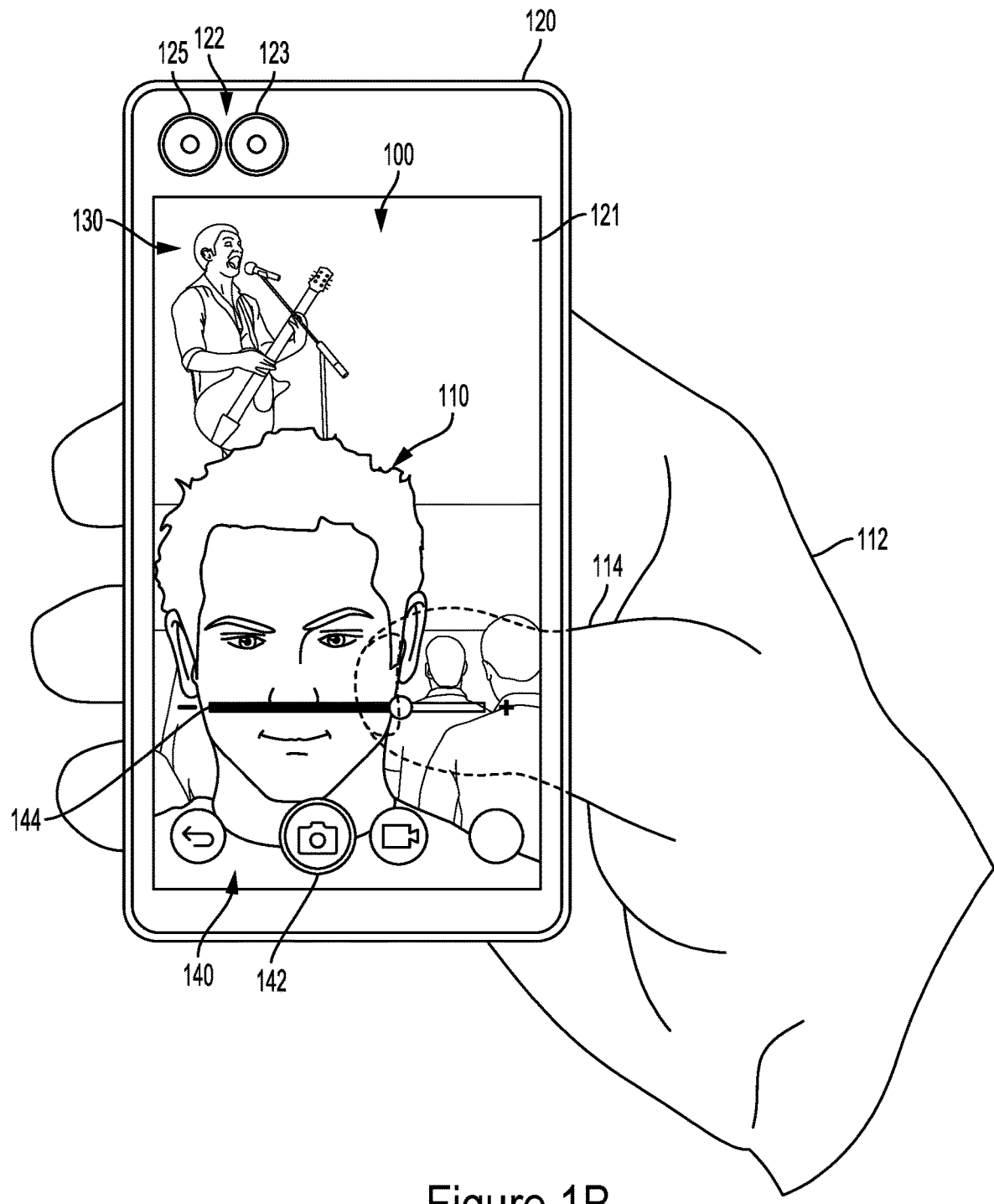
Figure 1C:
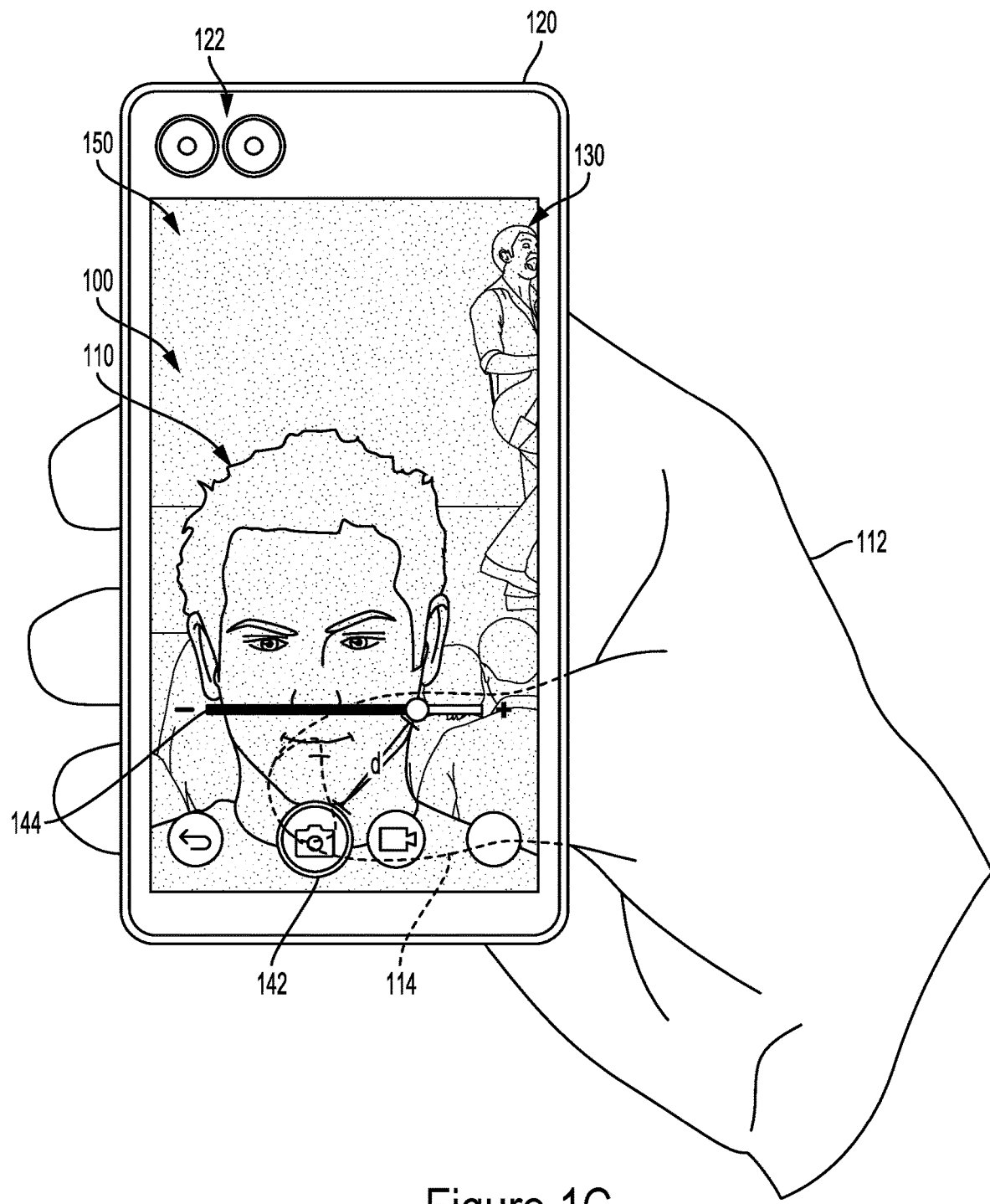

Turning now to FIGS. 1A-1C, an example scene 100 is schematically depicted. The scene 100 illustrates a concert with a user 110 in the audience attempting to capture a "selfie" using a front facing camera module 122 of an electronic image capture device 120 (e.g., a mobile phone). The front facing camera module 122 includes a first camera 123 and a second camera 125. However, those having skill in the art will appreciate that the example scene 100 depicted in FIGS. 1A-1C can be captured using a front facing camera module having only a single camera.

As used herein, a "selfie" refers to a self-portrait image frame depicting a user and taken by the user. Similarly, an "usie" or "groupie" can refer to an image frame depicting two or more people with one of the people being responsible for capturing the image frame using an electronic image capture device. With the increased prevalence of mobile electronic image capture devices (e.g., mobile phones, digital still cameras, tablets, etc.), improved wide area network functionalities, device storage capabilities, and the growing importance of social media and/or networking, selfies have become more and more popular. For example, a user may take a selfie to capture, and potentially share, a current situation of a user, an especially significant moment, and/or a notable occasion. For example, as shown in FIG. 1A, the user 110 may desire to capture a selfie to share a concert experience with friends, family, and/or social network contacts. Further, the user 110 may desire to capture the selfie so as to reflect and fondly remember and/or reflect back on the scene 100 at a point in the future. For example, the captured selfie may assist the user 110 in remembering the time he was up front at a concert performed by a beloved artist 130.

Referring now to FIGS. 1A and 1B, it will be appreciated that user skill and/or coordination can be required to compose a scene so as to capture an aesthetically pleasing and/or desirable selfie. For example, as shown, the user 110 is positioning the electronic image capture device 120 using a single hand 112. Since a position of the electronic image capture device 120 is constrained by a range of possible positions of the user's hand 112, it can be difficult to compose a scene that: 1) depicts in the user 110 in a flattering way (e.g., according to a flattering angle that minimizes wrinkles, unpleasant face geometries, etc.); 2) accounts for optimal lighting conditions (e.g., does not wash out the foreground or result in a subject that is too dark); and 3) frames the background scene content desired to be captured in the image frame/selfie.

Further, in addition to the limitations on the location of the electronic image capture device relative to important portions of the scene (e.g., the user and/or the depicted performing artist 130), the user 110 is using a thumb 114 from the hand 112 to provide input via a graphical user interface 140. In the FIG. 1B and the figures described below, those having skill in the art will understand that a portion of a hand (e.g., a forefinger, thumb, or other digit) and/or other input element (e.g., a stylus) will be illustrated in dashed lines to allow the reader to visualize the input element over an underlying input surface while also enable to reader to visualize the underlying display. That is to say, the dashed line representation of an input element represents that the dashed portion is between an input surface of a display of an electronic image capture device and the reader.

As shown in FIG. 1B, the graphical user interface 140 can be displayed over a preview stream rendered on a display 121 of the electronic image capture device 120. The graphical user interface 140 can include various graphical elements (e.g., icons) to allow the user 110 to provide inputs to control various imaging operations or other functions of the device 120. For example, the graphical user interface 140 can include a graphical element 142 that may act as a virtual "shutter" input to control one or more image sensors associated with the camera module 122 to capture a received image frame. The graphical user interface 140 can also include a graphical element that may initiate a video capture mode of a camera application, one or more graphical elements that may be selected to navigate within menus and/or applications. The graphical user interface 140 is also shown to include a graphical element 144 that can be used to receive an input to adjust a zoom level of the camera module 122 (e.g., to adjust a zoom level of the first and/or second cameras 123, 125).

With continued reference to FIG. 1B, the depicted graphical element 144 includes a slider bar that can be selected to receive user input related to a desired zoom level of the camera module 122. In the example shown, the slider bar can be adjusted to control a zoom level by sliding an input (e.g., a touch input or a hovering gesture input) in a left direction towards a "−" region of the graphical element 144 to zoom-out. Similarly, the user can provide a sliding right input towards a "+" region of the graphical element 144 to zoom-in. Those having skill in the art will appreciate that other implementations may be practiced. For example, a graphical element can be designed with a slider and to include "w" (e.g., wide) and "t" (e.g., telescopic) regions to provide indicia to a user on how a zoom level may be controlled based on a direction of user input movement (e.g., swipe direction). Similarly, the directions (e.g., left to zoom-out and right to zoom-in) can be reversed in other implementations.

Although the graphical element 144 may be designed as a slider bar or similar structure to enable a user to intuit an adjustment effect/outcome of different user inputs, those having skill in the art will appreciate the difficulty in composing a selfie using a zoom level adjustment graphical user interface element. For example, positioning the phone with a single hand and using a single digit from that hand to provide a zoom level input requires a level of coordination to desirably frame the subject relative to one or more background objects of interest. FIG. 1B illustrates an example where the user 110 has positioned the electronic image capture device 120 to capture the user 110 at a flattering angle and where the user 110 has adjusted a zoom level of the camera module 122 via the slider bar graphical element 144 so as to maximize a size of the user's face that can be captured while also framing the performing artist 130.

Turning now to FIG. 1C, an additional complexity in capturing a desired selfie is schematically illustrated. In FIG. 1C, the user 110 has moved his thumb a distance d from the graphical element 144 to the graphical element 142 to initiate an image capture operation resulting in captured image frame 150. However, since the graphical element 144 is persistently spaced apart from the graphical element 142 along the display 121, an amount of time is required to transition from the zoom level adjustment input depicted in FIG. 1B to the image capture input depicted in FIG. 1C. As a result, the scene 100 has changed and the performing artist 130 is only partially framed in the image captured in FIG. 1C. That is to say, although the scene 100 was desirably framed in FIG. 1B, the time required to transition between the zoom level adjustment at graphical element 142 and the capture input at graphical element 144 led to a scene change that resulted in an undesirable framing of the scene 100 (e.g., with the performance artist 130 clipped).

Those having skill in the art will appreciate that the time required to transition between the zoom level adjustment in FIG. 1B and the image capture input in FIG. 1C can be dependent on the last location of input along the slider bar since the location of the graphical element 142 and graphical element 144 are persistent along the display 121. In this way, after adjusting to a maximum zoom (e.g., to the far right of the slider bar) a greater distance along the user input surface of the display 121 must be covered to transition from a zoom level adjustment to an image capture input than the example distance d depicted in FIG. 1C. As a result, an amount of time and/or user coordination required to transition between user inputs at discrete, stationary graphical user interface elements 142, 144 can vary depending on the zoom level adjustment applied at the graphical element 144. Further, attempting to quickly transition between user inputs at different graphical elements (e.g., to rapidly move a position of the thumb 114 as shown between FIGS. 1B and 1C) may result in hand shake that unsatisfactorily affects a framing and/or focus of the scene 100. These complexities in applying a zoom level adjustment input and attempting to capture an image frame can be especially frustrating to a user when an unsatisfactorily composed image frame is captured (e.g., the image frame 150 in FIG. 1C) and when a user is unable to recompose a scene of interest (e.g., a particularly special moment of the concert depicted in FIGS. 1A-1C)

Figure 2A:
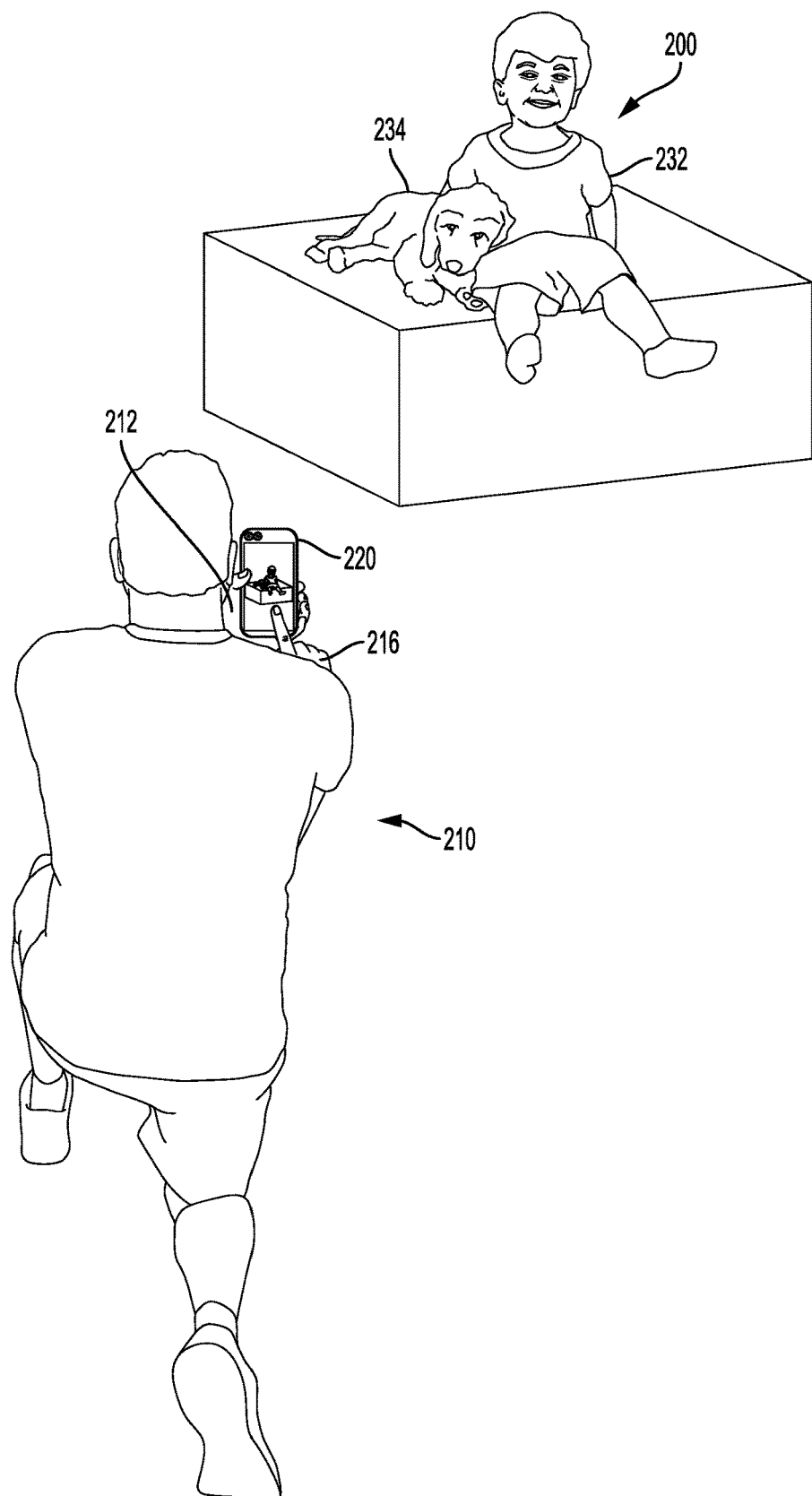
FIGS. 2A-2C depict an example scene and separate user inputs to control camera zoom level and image frame capture operations using a rear facing camera module.
Figure 2B:
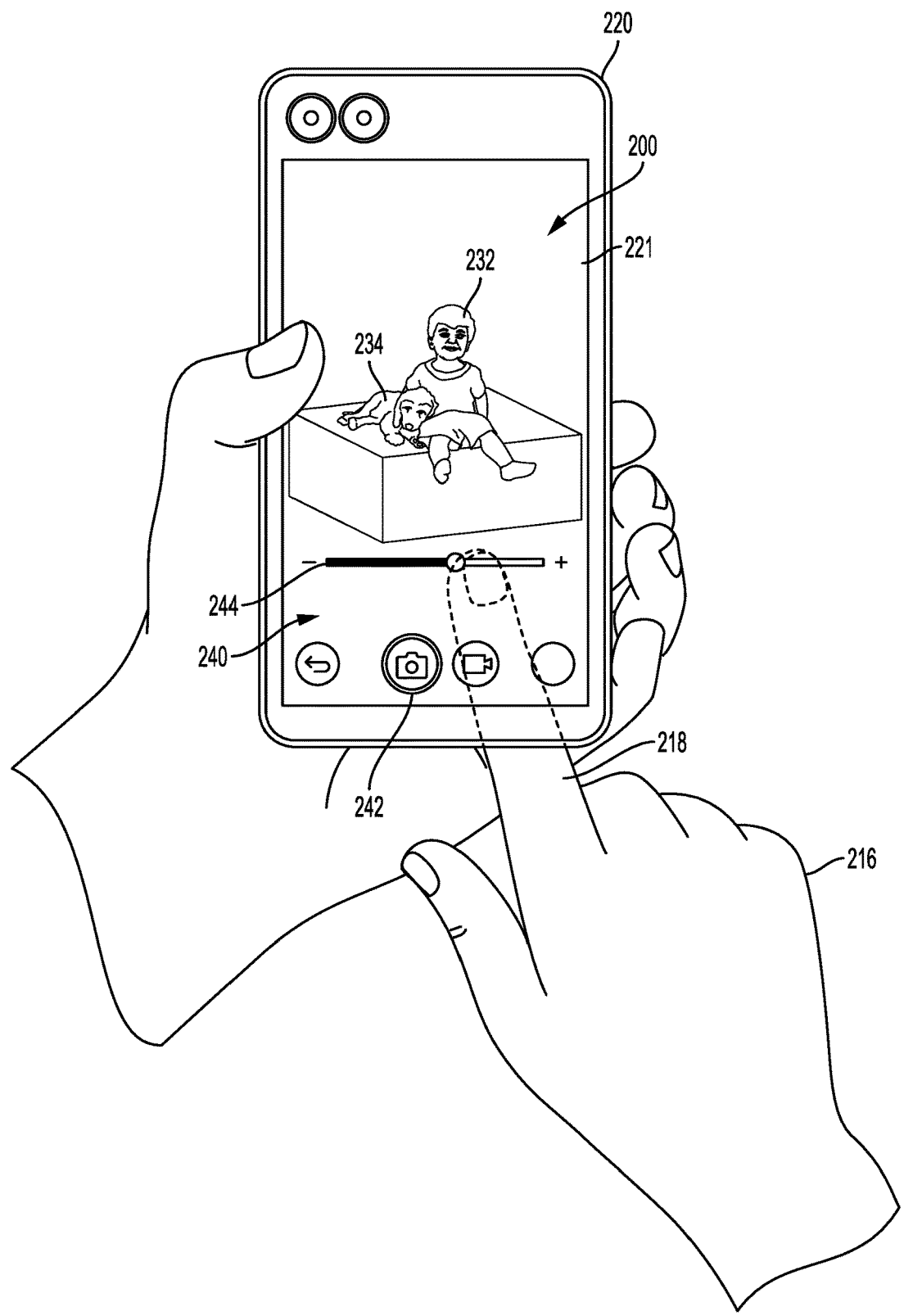

Turning now to FIG. 2A, another example scene 200 is schematically depicted. In this scene 200, a user 210 is attempting to capture in image frame of a child 232 and a juvenile dog (e.g., puppy) 234 using an electronic image capture device 220. In contrast to the example scene 100 described above with reference to FIGS. 1A-1C, the user 210 in FIG. 2A is using a rear facing camera module of the electronic image capture device 220 and is able to use a first hand 212 to hold the device. As shown in FIGS. 2A and 2B, the user 210 is able to use a forefinger 218 of a second hand 216 to provide an input via a graphical user interface 240. Similar to the graphical user interface 140 illustrated in FIGS. 1B and 1C, the graphical user interface 240 in FIG. 2B is shown to include a graphical element 242 that may be configured to receive a user input to control an image frame capture operation. Likewise, the graphical user interface 240 includes a graphical element 244 that can be used to receive an input to adjust a zoom level of the camera module. In this way, the user is able provide input to control a zoom level of the camera module to maximize a size of the child 232 and the dog 234 relative to a preview image displayed on the display 221 of the device 220.

Figure 2C:
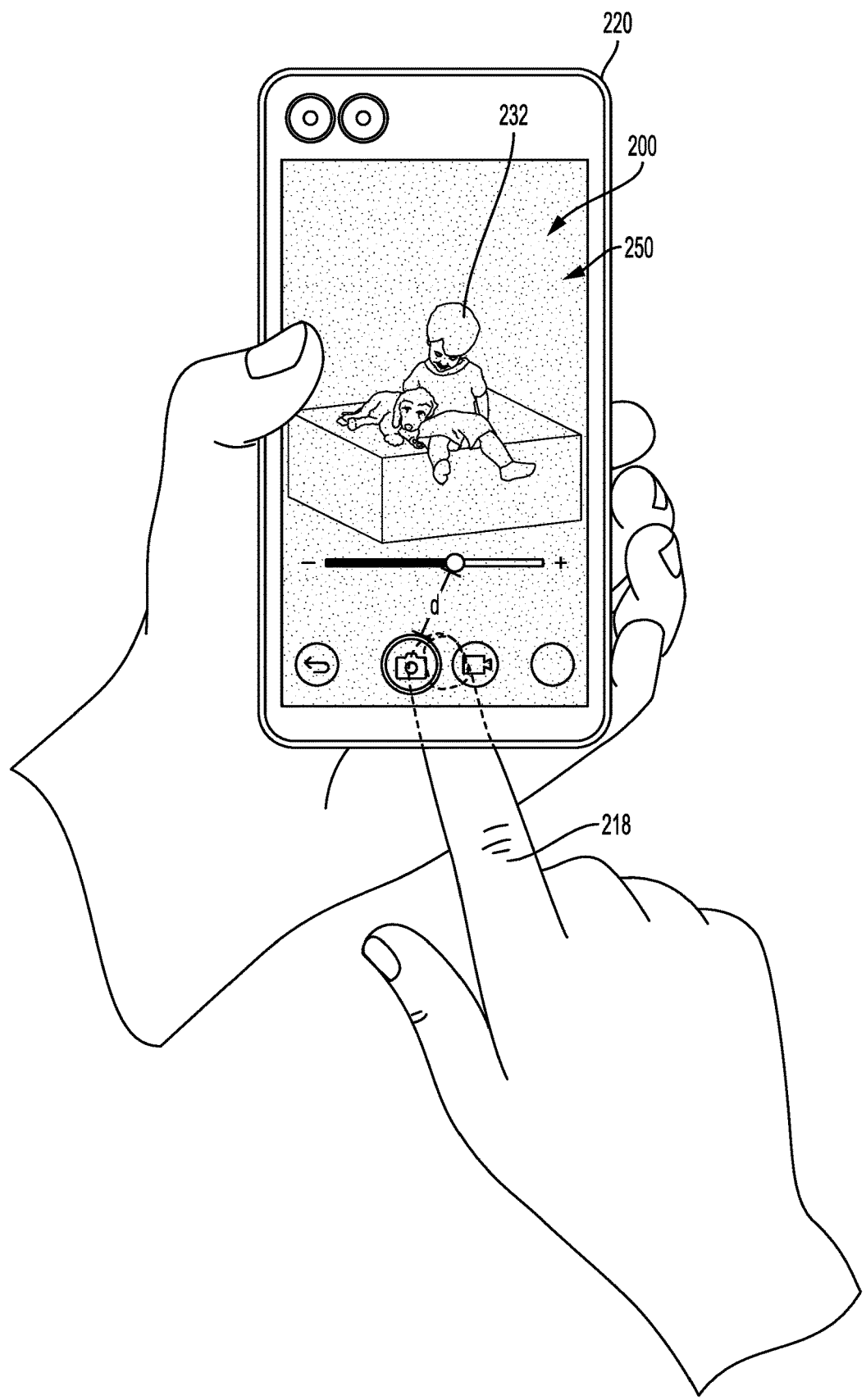

In contrast to the example depicted in FIGS. 1A-1C, the example depicted in FIGS. 2A-2C does not require a user to provide graphical user interface input with a digit from the hand that is primarily used to position and support the electronic image capture device 220 relative to the scene 200. That is, the user 210 in FIGS. 2A-2C is able to utilize two hands to hold the electronic image capture device and provide imaging operation control inputs via the graphical user interface 240. Nevertheless, the complexities in transitioning between a zoom level adjustment input of a first type (e.g., a slide adjustment) at the graphical user interface element 244 and an image capture input at the separate graphical user interface element of a second type (e.g., a touch or selection) are similarly present in FIGS. 1C and 2C.

Turning now to FIG. 2C, the user 210 is illustrated as providing an input at graphical element 242 to capture an image frame 250 of the scene 200. However, since the user 210 is required to move his forefinger a distance d from the graphical element 244 after finalizing the zoom level adjustment input to the graphical element 242 to provide the image frame capture input, an amount of time and some spatial coordination is required to transition between user input types. As a result, although the scene 200 was desirably framed in FIG. 2B, the captured image frame 250 in FIG. 2C unsatisfactorily depicts the child 232 as looking away from the camera module of the electronic image capture device 220. This problem can be especially exacerbating in scenes exhibiting high relative motion and/or when relatively high zoom levels (zoom-in operations) are applied. As with the user 110 in FIGS. 1A-1C, the user 210 may also be frustrated with the lag between FIGS. 2B and 2C and resulting captured image frame 250 that disappointedly represents the scene 200. This experience can be especially frustrating when it is not probable that the scene 200 can be recomposed as intended for capture. For example, scenes including children and/or animals as subjects can be especially difficult to recreate and/or recompose. Thus, those having skill in the art will appreciate the importance of designing systems and methods to control different imaging operations based on user inputs that reduce time lag and/or required coordination to transition between a first and second imaging operation.

As discussed in more detail below, aspects of the present disclosure relate to controlling multiple imaging operations of an electronic image capture device based on user input received during a user input operation. The user input operation can include a first portion and a second portion with a first type of input received during the first portion to control a first camera or imaging operation (e.g., to control a zoom-level). A second type of input can be received during the second portion of the user input to control a second camera or imaging operation (e.g., to cause the device to capture an image frame). In some embodiments, the user input can be continuous. That is, the first portion and the second portion can be arranged in temporal series with no interruption and/or intervening portion disposed there between. Further, the first input type can be different from the second input type to clearly differentiate between the intended control of the first imaging operation and the control of the second imaging operation. In this way, a user experience when providing input to control different imaging operations can be improved by minimizing an amount of time and/or coordination required when transitioning between a first imaging operation and a second imaging operation.

Additional and/or alternative aspects of the present disclosure relate to causing a display of an electronic image capture device to display a graphical user interface element including, at least, a first region and a second region. The first region can be used to receive a first input related to a first imaging operation (e.g., to control a zoom-level) and the second region can be used to receive a second input related to a second imaging operation (e.g., to cause the device to capture an image frame). In some embodiments, the first input can include movement of an input element relative to and/or over at least a portion of the first region. In these embodiments, the first input can cause a position of the second region to move across the display surface relative to the first region and/or relative to a location of the input element. For example, a position of the second region can track the movement of the input element. In this way, a transition between the first input at the first region and the second input at the second region can be minimized to enable a user to swiftly shift from a first input to control a first imaging operation to a second input to control a second imaging operation in a way that can inhibit scene and/or image composition changes during the transition.

Figure 3A:
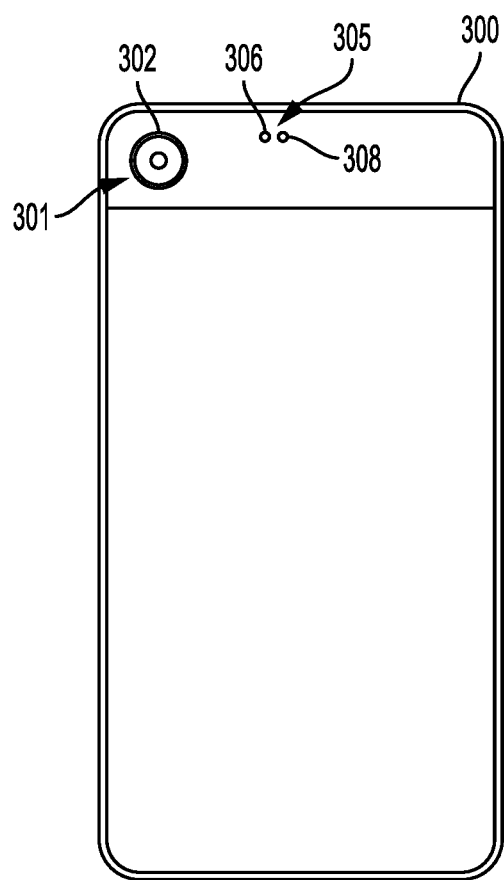
FIGS. 3A-3F depict examples of devices including camera modules.

Turning now to FIG. 3A, an example electronic image capture device 300 is illustrated. The example device 300 includes a "rear-facing" camera module 301 including a camera 302. As used herein, the term "rear-facing" may refer to a facing or direction of a camera module and/or of one or more associated cameras relative to a primary display of the device. For example, a primary display of an electronic image capture device may provide a preview stream of received image frames to be used as a virtual "viewfinder" by a user. In this way, a camera module receiving light from a scene that faces away from the user and/or the device may be considered, in some instances, a rear-facing module and a camera disposed on an opposite side of the device may be considered a "front-facing" module. Those having skill in the art will appreciate that aspects of the present disclosure, as discussed below, can be implemented in conjunction with rear-facing, front-facing, and/or other camera module configurations (e.g., 360 degree capture devices).

Still referring to FIG. 3A, the example device 300 includes a flash unit 305 having a first flash element 306 and a second flash element 308. In some implementations, the first flash element 306 can be a first flash element type and the second flash element 308 can be the same type of flash element. For example, the first flash element 306 and the second flash element 308 can each include one or more LEDs. In other implementations, the first flash element 306 can be a first flash element type and the second flash element 308 can be a different type of flash element. In some implementations, the first flash element 306 and the second flash element 308 can be controlled in concert to regulate an overall intensity output by the flash unit 305 and/or a color temperature of output light (e.g., by mixing outputs of each flash element). A user may provide input, as discussed below, to control the flash unit 305.

Figure 3B:
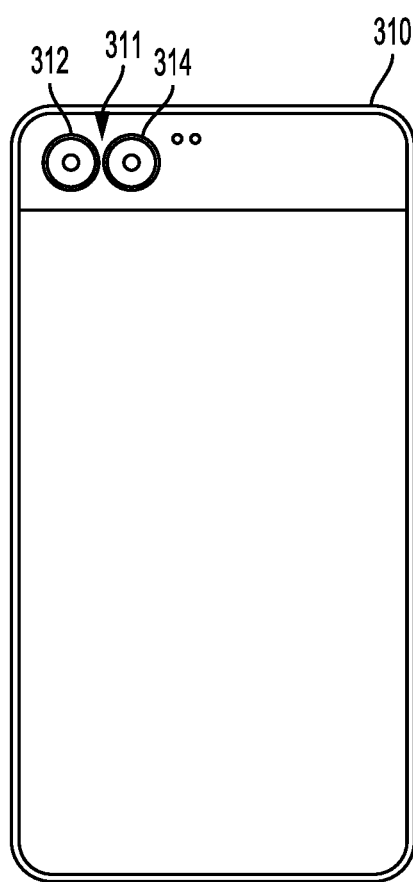
Figure 3C:
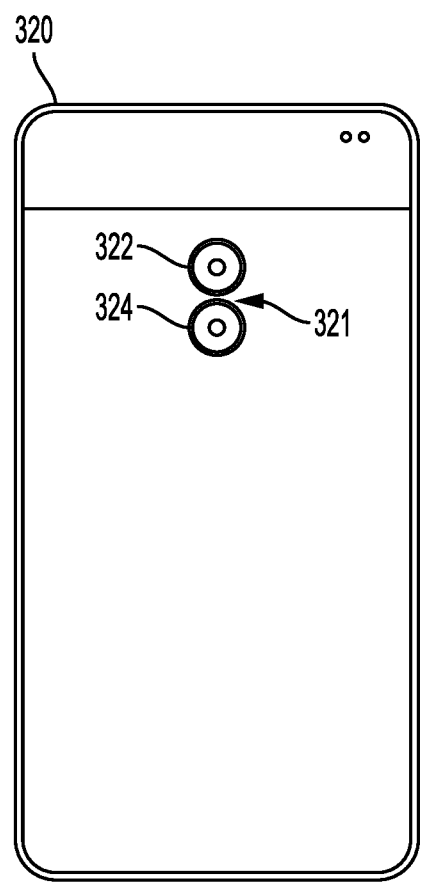

Turning now to FIG. 3B, another example electronic image capture device 310 is shown. The example device 310 includes a dual camera module 311 with a first camera 312 and a second camera 314 arranged in a first configuration. In the first configuration, the first camera 312 is arranged relative to the second camera 314 such that an image frame received by the first camera represents a first field of view of a scene and an image frame received by the second camera represents a second field of view of the scene that is horizontally adjacent to the first field of view when the electronic image capture device 310 is positioned in a portrait mode relative to the scene. FIG. 3C illustrates yet another example electronic image capture device 320 including a dual camera module 321. In contrast to the dual camera module 311 of FIG. 3B, the first camera 322 and the second camera 324 in FIG. 3C are spatially arranged such that an image frame received by the first camera represents a first field of view of a scene and an image frame received by the second camera represents a second field of view of the scene that is vertically adjacent to the first field of view when the electronic image capture device 320 is positioned in a portrait mode relative to the scene.

Referring generally to the dual camera modules 311 and 321 of FIGS. 3B and 3C, in some aspects, one of the cameras (such as the first cameras 312 and 322) may be considered a primary, main, or master camera, and the other camera (such as the second cameras 314 and 324) may be considered an auxiliary or slave camera. Additionally or alternatively, the second cameras 314 and 324 may have a different focal distance, frame capture rate, spatial resolution, color responsivity, and/or field-of-view of capture than the first cameras 312 and 322.

Figure 3D:
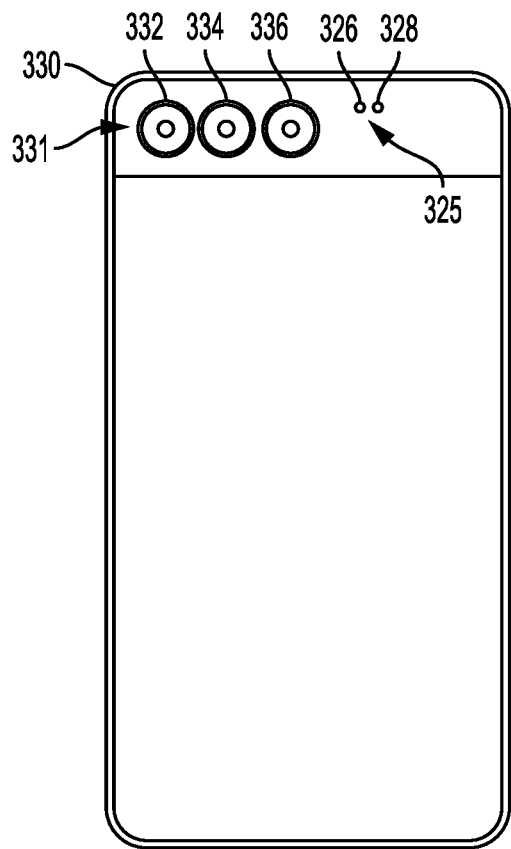

FIG. 3D depicts another example electronic image capture device 330 having a camera module 331 including a first camera 332, a second camera 334, and a third camera 336. In some implementations, two of the cameras, for example, the first camera 332 and the second camera 334, can be configured with different fields-of-view so as to provide an extended overall range of zoom (e.g., by switching between the first and second cameras 332, 334 based on zoom level) while the third camera 336 may include a sensor responsive to all wavelengths of light (e.g., a mono sensor) to enhance color images captured by one or more of the first camera 332 and second camera 334. The example device 330 also includes a flash unit 335 having a first flash element 337 and a second flash element 339. The flash unit 335 can be synchronized with any of the first camera 332, second camera 334, and third camera 336 to provide for a flash photography functionality when capturing image frames via any combination of the cameras.

Figure 3E:
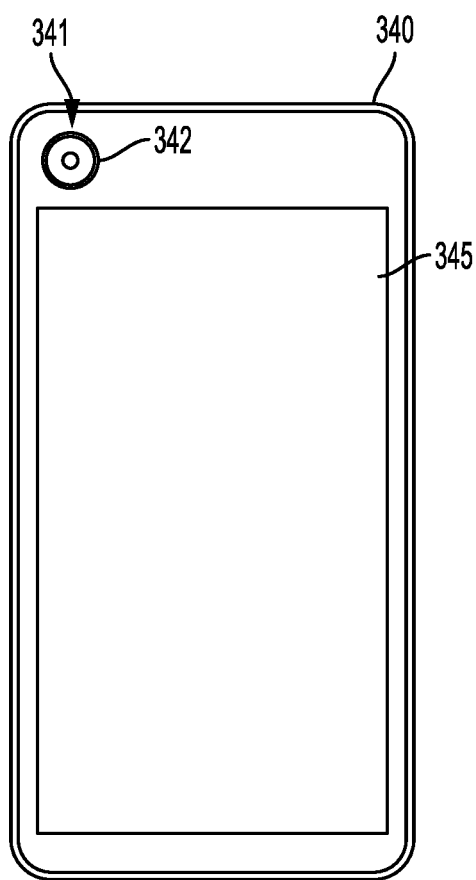
Figure 3F:
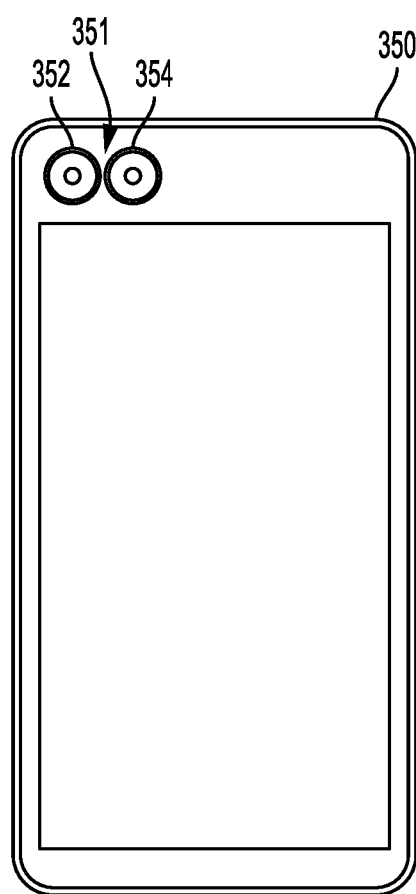

Turning not to FIG. 3E, yet another example electronic image capture device 340 is depicted. As shown, the device 340 includes a camera module 341 having a first camera 342. The device 340 also includes a display 345. As discussed above, since the display 345 and the camera module 341 face a common direction, the camera module 341 can be considered in some applications as a front-facing camera module (e.g., as facing away from a front side of the device 340). In some implementations, the display 345 can act as a flash element to illuminate a scene facing the display 345 and first camera 342 of the camera module 341. FIG. 3F illustrates an example electronic image capture device 350 including a front facing camera module 351 having a first camera 352 and a second camera 354. In this way, those having skill in the art will appreciate that aspects disclosed herein are not limited to electronic image capture devices provisioned with a specific type of camera module and the disclosed aspects can be practiced in conjunction with differently oriented cameras (e.g., front-facing, rear-facing, side-facing, 360 capture devices, etc.). Further, aspects of the present disclosure can be implemented by multiple discrete devices that are communicatively coupled. For example, an image based security system with access to connected cameras that are separately located can implement aspects of the present disclosure. Similarly, as another example, a single device, such as any of the example devices 300, 310, 320, 330, 340, 350 of FIGS. 3A-3F can implement aspects of the present disclosure without receiving image data from a separate device. Thus, it will be understood that while the below description and examples use the singular term "device" to describe various aspects of this disclosure, the term "device" is not limited to a specific configuration, type, or number of objects.

Figure 4:
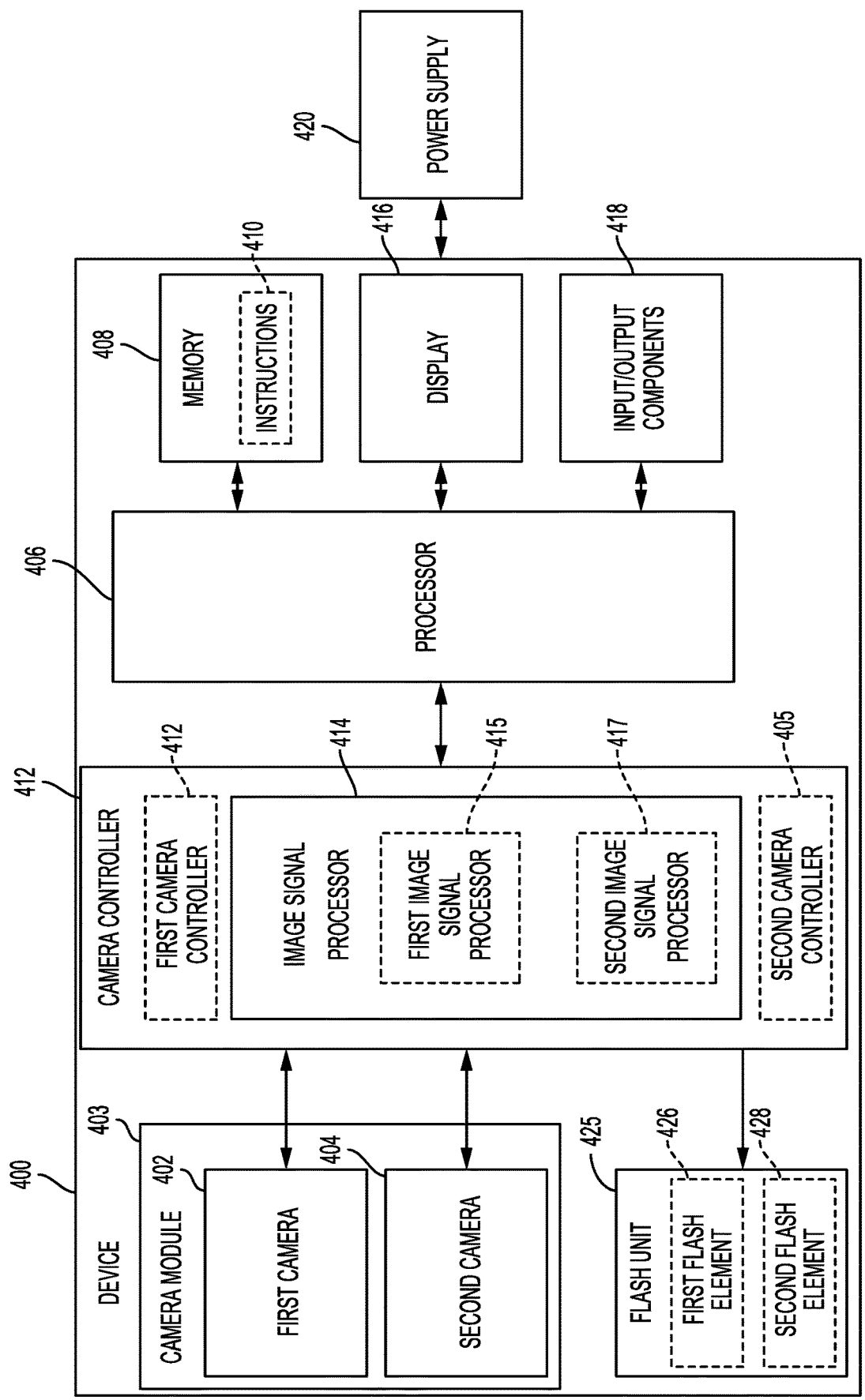
FIG. 4 is a block diagram of an example device including a camera module.

FIG. 4 is a block diagram of an example electronic image capture device 400. The device includes a first camera 402 and a second camera 404. As illustrated, the first camera 402 and the second camera 404 are included as part of a camera module 403. Those having skill in the art will appreciate that FIG. 4 is one example of a device that aspects of the present disclosure can be implemented in, and that other devices with different camera configurations can also implement aspects of the present disclosure. For example, other devices can include a first camera facing a first direction (e.g., rear-facing) and a second camera facing a second direction (e.g., front-facing) with the first and second cameras not being included in a common camera module. Of course, other example devices can include a single camera or more than two cameras.

Skilled artisans will appreciate that the discussion below related to device 400 can be applied to the example devices 300, 310, 320, 330, 340, 350 of FIGS. 3A-3F, and/or to any other suitable device capable of capturing images and/or sequences of image (e.g., video sequences), for example, wired and wireless communication devices (such as mobile phones, smartphones, tablets, security systems, dash cameras, personal action cameras, laptop computers, desktop computers, drones, automobiles, wearable devices, head mounted displays, and so on), digital cameras (including still cameras, video cameras, and so on).

In addition to the first camera 402 and the second camera 404, the example device 400 shown in FIG. 4 includes a processor 406, a memory 408 storing instructions 410, a camera controller 412, a display 416, and a number of input/output (I/O) components 418. The device 400 also includes a flash unit 425. The device 400 may include additional features or components not shown. For example, a wireless interface, which may include a number of transceivers and a baseband processor, may be included for a wireless communication device. Device 400 may include additional cameras other than the first camera 402 and the second camera 404. The disclosure should not be limited to any specific examples or illustrations, including example device 400. Those having skill in the art will appreciate that the example device 400 can be used for traditional photographic and video applications, high dynamic range imaging, panoramic photo and/or video, and stereoscopic imaging, for example.

The first camera 402 and second camera 404 may be capable of capturing individual image frames (such as still images) and/or capturing video (such as a succession of captured image frames). The first camera 402 and second camera 404 also may include one or more image sensors (not shown for simplicity), lenses, actuators, and/or shutters for receiving an image frame and providing the received image frame to the camera controller 412.

The memory 408 may be a non-transient or non-transitory computer readable medium storing computer-executable instructions 410 to perform all or a portion of one or more operations described in this disclosure. The device 400 may also include a power supply 420, which may be coupled to or integrated into the device 400.

The processor 406 may be one or more suitable processors capable of executing scripts or instructions of one or more software programs (such as instructions 410) stored within memory 408. In some aspects, the processor 406 may be one or more general purpose processors that execute instructions 410 to cause the device 400 to perform any number of different functions or operations. In additional or alternative aspects, the processor 406 may include integrated circuits or other hardware to perform functions or operations without the use of software. While shown to be coupled to each other via the processor 406 in the example of FIG. 4, the processor 406, memory 408, camera controller 412, the display 416, and I/O components 418 may be coupled to one another in various arrangements. For example, the processor 406, memory 408, camera controller 412, the display 416, and/or I/O components 418 may be coupled to each other via one or more local buses (not shown for simplicity).

The camera controller 412 may include an image signal processor 414, which may include a single processing resource that is shared by the first camera 402 and the second camera 404. Optionally, the image signal processor 414 can include a first image signal processor 415 that is configured to process image data received from the first camera 402, and the image signal processor 414 can include a second image signal processor 417 that is configured to process image data received from the second camera 404. Thus, it will be understood that some configurations may include a dedicated image signal processor for each of the first camera 402 and the second camera 404, and in other configurations the first camera and the second camera 404 may be coupled to a common image signal processor 414.

In some aspects, the image signal processor 414, or optionally first image signal processor 415 and/or second image signal processor 417, may execute instructions from a memory (such as instructions 410 from memory 408 or instructions stored in a separate memory coupled to the image signal processor 414) to control operation of the cameras 402 and 404. In other aspects, the image signal processor 414 may include specific hardware to control operation of the cameras 402 and 404. The image signal processor 414 may alternatively or additionally include a combination of specific hardware and the ability to execute software instructions. Moreover, in other implementations, the camera controller 412 can include a first camera controller 403 configured to control the first camera 402, and a second camera controller 405 configured to control the second camera 404. In this way, the first and second cameras 402, 404 can be controlled by a single controller module and/or by separate controller modules disposed within the camera controller 412.

In some example implementations, the camera controller 412 may receive instructions from the processor 406 and control operation of the first camera 402 and the second camera 404, and/or operation of the image signal processor 414 (or first and second image signal processors 415 and 417). For example, the processor 406 may receive image frame data processed by the image signal processor 414 and determine one or more image capture settings including automatic exposure control ("AEC"), automatic focus ("AF"), automatic white balance ("AWB"), and flash unit settings for an upcoming frame based on the received image frame data. In some implementations, the processor 406 can activate the flash unit 425 to emit a pre-flash for use in determining AEC, AF, and/or AWB settings for an upcoming image frame to be captured using a full flash intensity emitted by the flash unit 425. Based on the determined image capture settings, the processor 406 may provide instructions to the camera controller 412. These instructions may include camera settings to be applied by the first camera 402 and/or second camera 404 such as exposure, sensor gain, etc., and may include digital image processing instructions to be applied by the image signal processor 414.

With continued reference to FIG. 4, the processor 406 and/or camera controller 412 can control a zoom level of the camera module 403. As used herein, a zoom operation may refer to an operation that results in a zoom level adjustment in response to a control signal. For example, a zoom operation can be initiated automatically based on a scene classification, object detection and/or recognition, and/or based on other techniques. Alternatively or additionally, a zoom operation can be initiated to adjust a zoom level setting of the camera module 403 in response to user input. Additionally, the processor 406 and/or camera controller 412 can control other imaging operations of the electronic device 400. For example, the camera module 403 may be controlled to capture one or more still images and/or a sequence of video based on user input and/or in response to automated control signals (e.g., control signals that control an imaging operation without requiring a user input).

As illustrated, the flash unit 425 of the device 400 can include one or more flash elements. For example, the flash unit 425 can include a first flash element 426 and a second flash element 428. The processor 406 can be configured to transmit signals to the flash unit 425 via the camera controller 412 to control the first flash element 426 and/or second flash element 428 as part of a flash photography operation. In some examples, a flash photography operation can optionally be initiated in response to a user input or selection.

In some implementations, the processor 406 can be configured to control the display 416 to display a captured image, or a preview of one or more received images, to a user. The display 416 may also be configured to provide a viewfinder or bounding box when displaying a preview image for use by a user prior to capturing an image frame of a scene. For example, a bounding box may be used to identify one or more faces in a scene can be used to control AF operations. Additionally, the processor 406 can be configured to control the display 416 to emit light during an image capture operation in conjunction with a flash instruction. That is to say, although depicted as a separate functional block in the example device 400, those having skill in the art will appreciate that the display 416 can optionally be used as a flash element of the flash unit 425.

The display 416 may be any suitable display or screen allowing for user interaction and/or to present items (such as captured images and video) for viewing by a user. In some aspects, the display 416 may be a touch-sensitive display that incorporates one or more (including all) of the I/O components 418. For example, the display 416 can include a user input surface such as a resistive touch screen, a surface acoustic wave touch screen, a capacitive touch screen, or other similar technology. The display 416 may include underlying or adjacent liquid crystal display elements, dot matrix display elements, light emitting diode elements, organic light emitting diode elements, e-ink elements, interferometric modulator elements, and/or other display elements. In this way, the display 416 may be configured to provide a preview stream of image frames received by the camera module 403 and receive user input on a surface that is disposed over the preview stream.

In addition to the examples provided above, the I/O components 418 may be or include any suitable mechanism, interface, or device to receive input (such as commands) from the user and to provide output to the user. For example, the I/O components 418 may include (but are not limited to) a graphical user interface displayed by the display 416 and including one or more icons or graphical elements, keyboard, a mouse, a microphone and speakers, electro-mechanical buttons and input mechanisms, and so on. In some examples, the I/O components 418 can receive tactile (e.g., touch inputs) from a user and/or an input element (e.g., a stylus, pen, finger or other hand digit, etc.) and/or receive non-tactile (non-touch inputs). For example, the I/O components 418 may sense hover inputs and/or 3D gestures using active depth sensing technologies. In this way, a user may provide input by physically contacting an input surface of the I/O components 418 (e.g., an input surface of the display 416) and/or may provide an input to adjust one or more aspects of an imaging operation performed by the electronic image capture device 400 using non-touch input types.

Turning now to FIGS. 5A-5E, example imaging operations performed by an electronic image capture device 520 are illustrated. While FIGS. 5A-5E discuss example zoom level control and image capture operations in response to different portions of a single user input, those having skill in the art will appreciate that other imaging operations may be performed by the electronic image capture device 520 in response to the user input. For example, flash photography, camera module selection, auto focus, imaging mode (e.g., HDR, low light, video, high frame rate mode, etc.), imaging filters, and the like can be controlled by the electronic image capture device 520 in response to any of the example user input operations described herein.

Figure 5A:
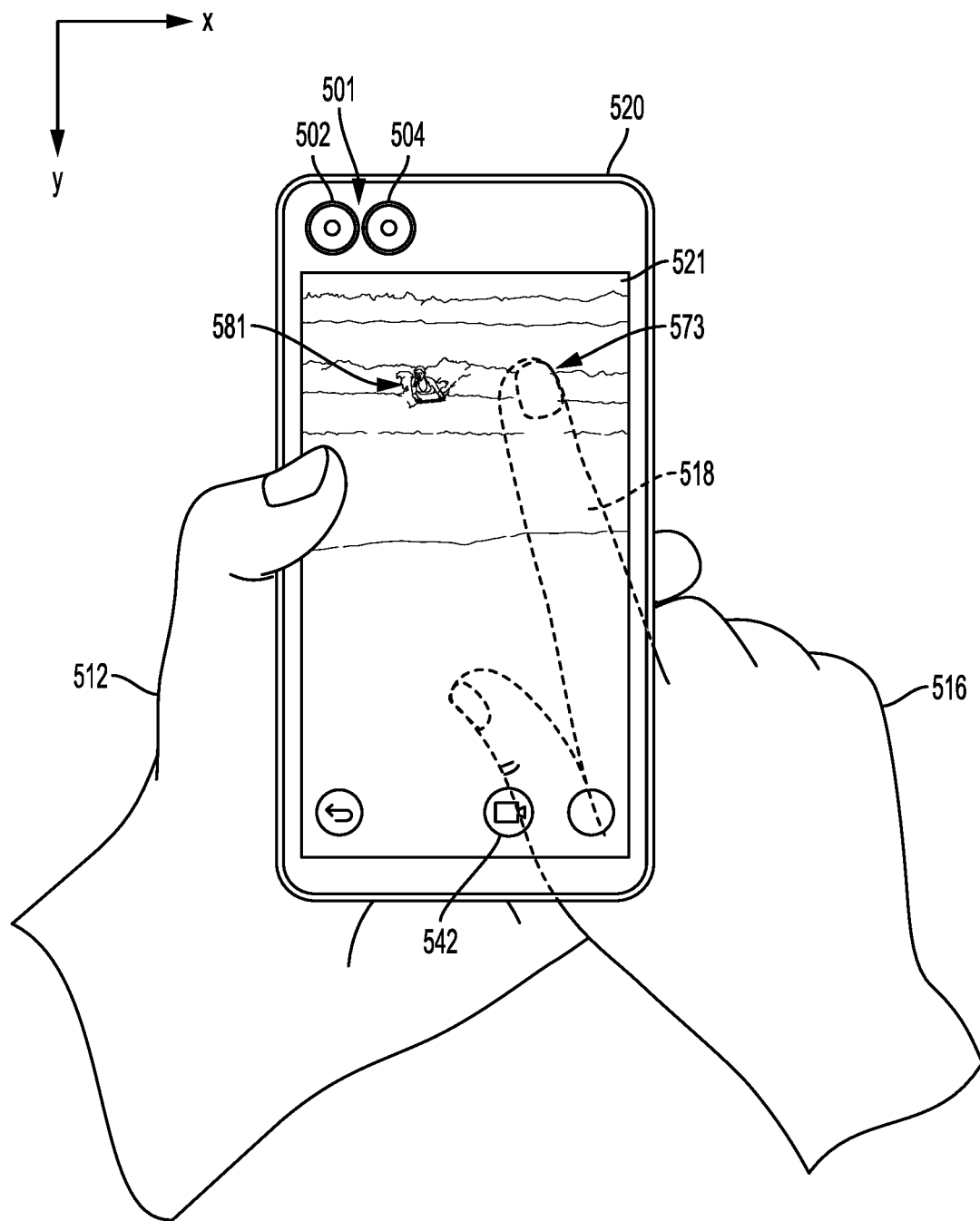
FIGS. 5A-5E depict example imaging operations controlled in response to a continuous user input.

Referring to FIG. 5A, the electronic image capture device 520 is illustrated as being held by a first hand 512 of a user during an imaging operation. The electronic image capture device 520 includes a front facing module 501 including a first camera 502 and a second camera 504. The electronic image capture device 520 includes a rear facing module (not visible in FIG. 5A) that is receiving image frames that are being displayed in a preview stream on a display 521. As shown, the preview frames or preview stream depict a subject 581 engaging in a bodyboarding activity in an aquatic environment.

Still referring to FIG. 5A, a second hand 516 of the user is positioning an input element 518 that is being used to provide a touch input (e.g., a contact or tactile input) at a position 573 of an input surface of the display 521. The input surface of the display 521 is disposed along an x-y plane as defined by the illustrated reference coordinate system. In the example shown, the input element 518 includes a forefinger of the hand 516. Of course, those with skill in the art will appreciate that other fingers and/or digits can be utilized as input elements, and that other non-anatomical structures can be utilized as input elements to practice aspects of the present disclosure (e.g., styluses, controllers, wands, etc.).

In this example, the display 521 outputs a graphical user interface including graphical element 542 and other graphical elements. However, the position 573 of touch input utilized by the user can be selected as anywhere on the input surface of the display 521. That is to say, a user may determine a position to initiate the user input described with reference to FIG. 5A so as to select a convenient or desired location on the display 521. Of course, the example in FIGS. 5A-5E may also be practiced by providing a graphical element (not shown) dictating a location of touch input to initiate the user input and resulting imaging operations discussed below. Further, while the example in FIG. 5A illustrates a touch input at position 573 by the input element 518, those having skill in the art will understand that aspects of this disclosure can be practiced using non-touch inputs (e.g., using input structures such as image sensors, ultrasound sensors, active depth sensors, etc. that do not require touch).

Figure 5B:
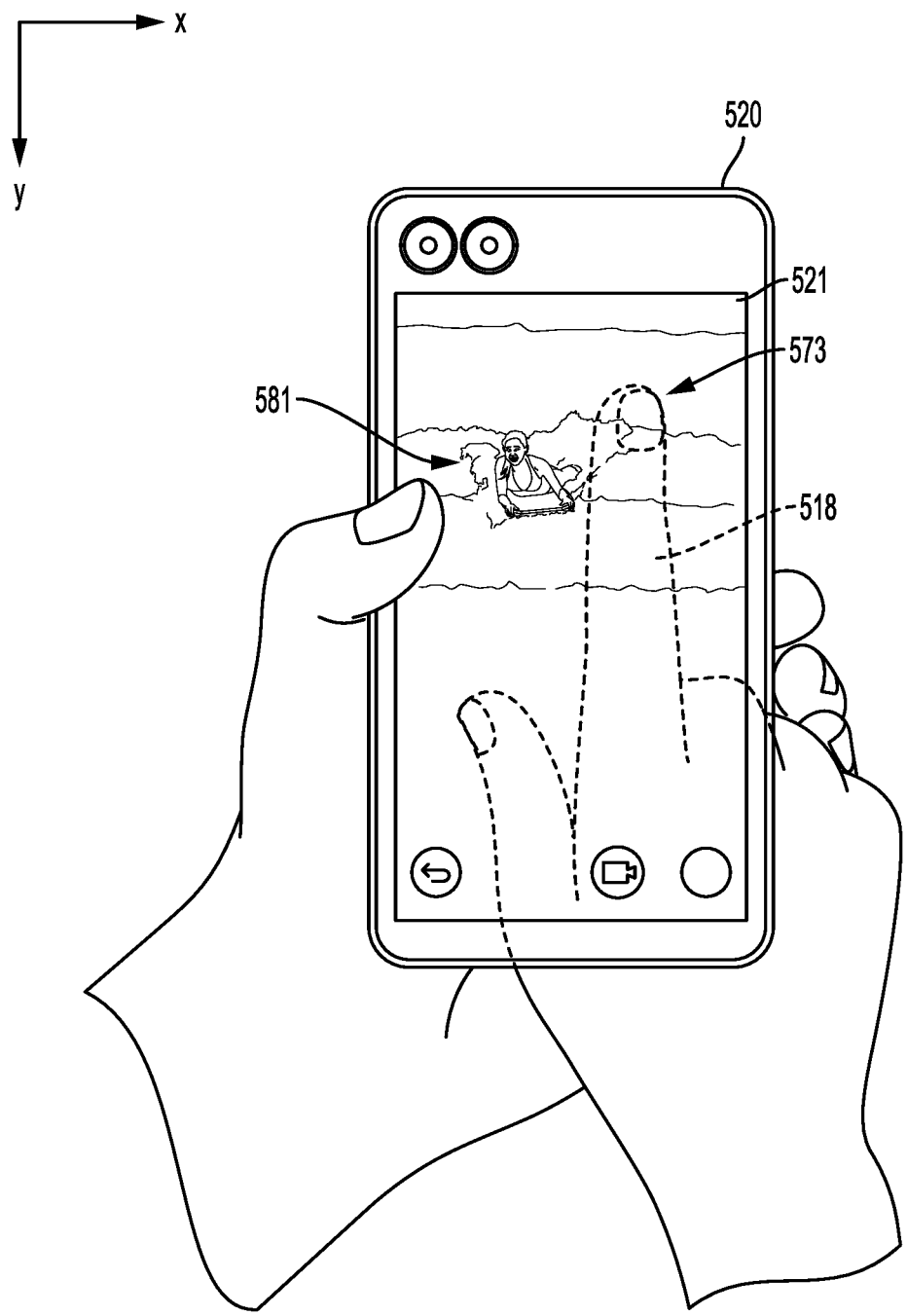

Turning now to FIG. 5B, the input element 518 has moved about the position 573 of the display 521 in a clockwise direction so as to provide a zoom level control input. That is to say, the input element 518 has maintained in contact with the display 521 at position 573 and a contacting surface of the input element 518 has twisted, turned, or revolved, and possibly translated, relative to the x-y plane about a z-axis of the example reference coordinate system. In some embodiments, the twisting or turning of the input element 518 relative to the input surface of the display 521 can be tracked, for example, by monitoring a connected component of touched pixels and monitoring the shape of the connected component in a frame-by-frame read. For example, an initial touch (e.g., the touch of FIG. 5A) can result in a connected component or blob of sensed pixels in an underlying touch-sensitive array, and monitoring a shape of the connected component from a first frame to a subsequent frame can provide an indication of a twist based on a change of the center of mass of the blob and/or by monitoring peripheral pixels of the blob (e.g., by monitoring a movement of a periphery of the blob). In this way, a center of a touch point can translate frame-by-frame as the input element 518 rotates or twists so as to not require a perfect rotation of the initial center of touch about the z-axis of the reference coordinate system. That is to say, the twist input does not have to be centered absolutely on an axis.

In another embodiment, the blob monitoring can be simplified by identifying a maximum x-y dimension of a bounding box of the blob and monitoring the displacement of one, or both, of the dimensions relative to the x-y coordinates in a frame-by-frame fashion to track relative twisting. Of course, those having skill in the art will appreciate that other techniques (e.g., monitoring input pressure) can be applied to determine a twisting motion of the input element 518.

Figure 5C:
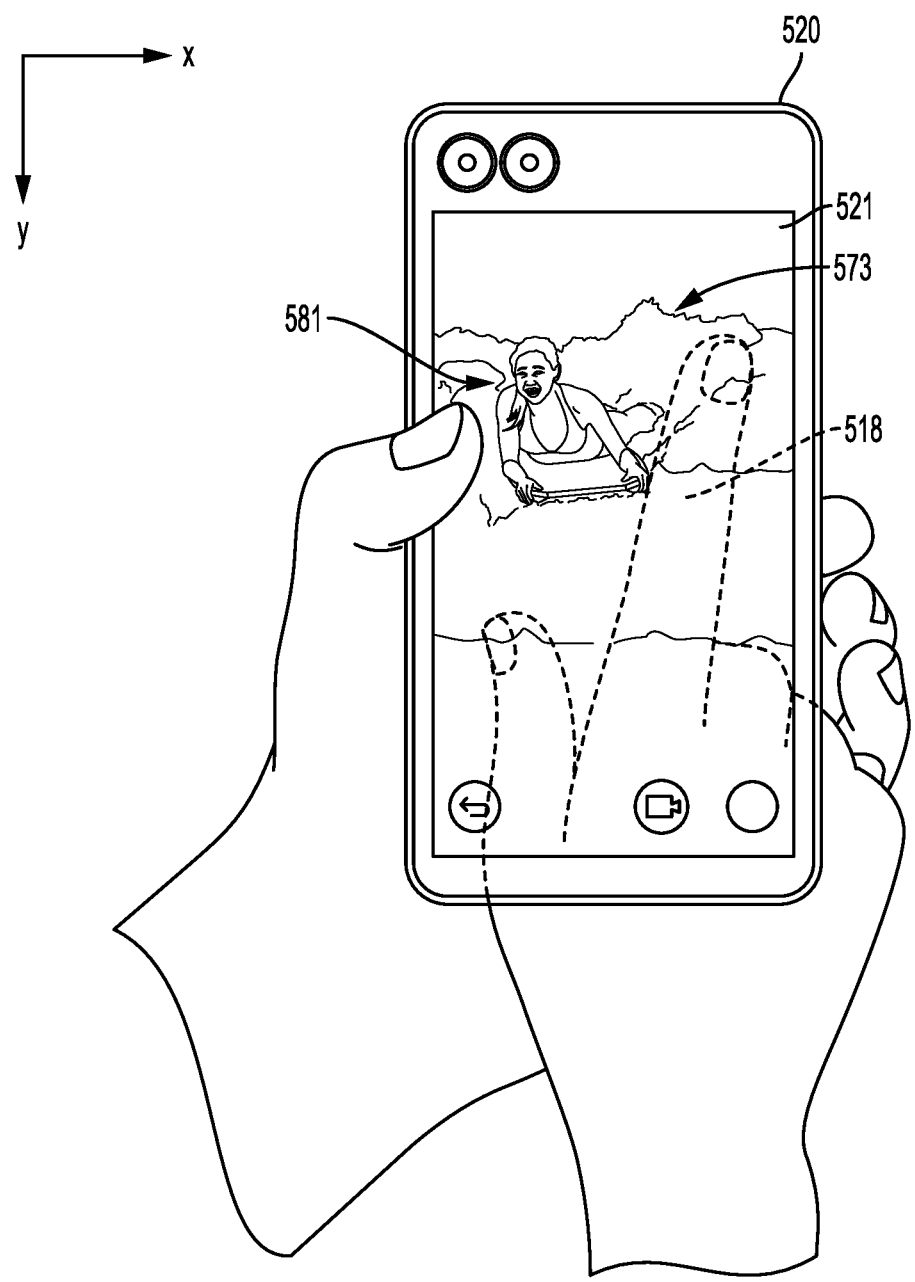

Referring to FIGS. 5B and 5C, this "twisting" motion forms a first portion of the user input illustrated in FIGS. 5A-5D and can be used to intuitively control a zoom-level of the electronic image capture device 520. As shown, the subject 581 in the received preview stream is enlarged relative to the display 521 between FIGS. 5A and 5B, and further between FIGS. 5B and 5C as a result of the twisting input provided between the initialization of the input at FIG. 5A and the selected zoom level illustrated in FIG. 5C. FIGS. 5A-5C depict a zoom level increase in response to the illustrated clockwise twisting input since standard convention in threaded fasteners results in tightening (e.g., zooming in or increasing zoom level) in this rotational direction. However, the direction of zoom level control can be designed to react in an opposite fashion (e.g., to zoom-out when clockwise touch input is received) and/or can be selected by a user based on preference.

Figure 5D:
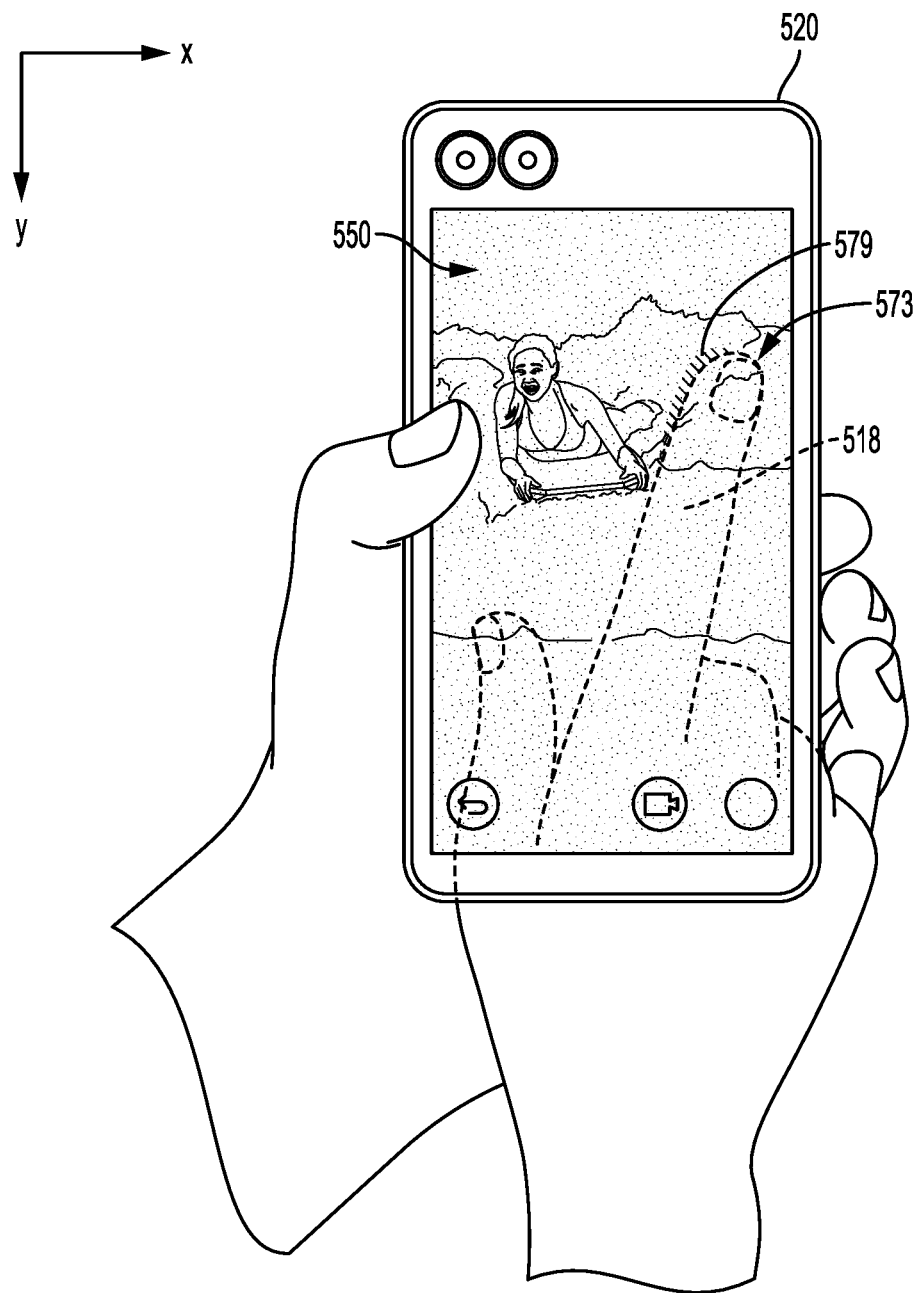

Referring now to FIG. 5D, a second portion of the user input is illustrated. The second portion of the example user input includes a release of the twisting touch input shown in FIGS. 5A-5D. For example, FIG. 5D illustrates a separation 579 (hatching) between the input element 518 and position 573 of the input surface of the display 521. This release can be used to control an image capture operation as represented by the stylized hatching of the captured image frame 550 shown on the display 521. In this way, the user is able to provide a single user input including a first portion (twisting touch motion) to control a zoom level of the rear facing camera and release the touch input during a second portion to control an image capture operation. In other embodiments, the second portion can include an alternative type of touch input. For example, the input type during the second portion can include a release (as illustrated), a translation of the input element across the display 521, a steady touch (e.g., a long touch), a pressure varying touch, etc. As a result, the user can seamlessly transition between the two example imaging operations using a single input and without being required to transition between separate graphical user interface elements displayed at separate locations along the display 521. Thus, the user is able to initiate the capture operation much faster, and with less required coordination, once the desired zoom level is reached than the example operations depicted in FIGS. 1 and 2.

Although the first portion and second portion of the single user input described above with reference to FIGS. 5A-5D can be considered continuous since the touch input of the first portion and the release of the touch input of the second portion are arranged in temporal series with no interruption and/or intervening portion or input types disposed there between, those having skill in the art will appreciate that in some embodiments described below, a continuous user input can include more than two portions with at least one portion allowing a user to maintain an input related to a first imaging operation while transitioning to provide an input related to a second imaging operation. Moreover, it will be understood that while the input provided by the input element 518 is continuous between FIGS. 5A-5C, it will be understood that the movement exhibited by the input element 518 during the first portion need not be continuous. That is, the first portion of the example user input can include a continuity of a touch input with pauses and intermittency of movement of the user input element relative to the input surface of the display 521.

Figure 5E:
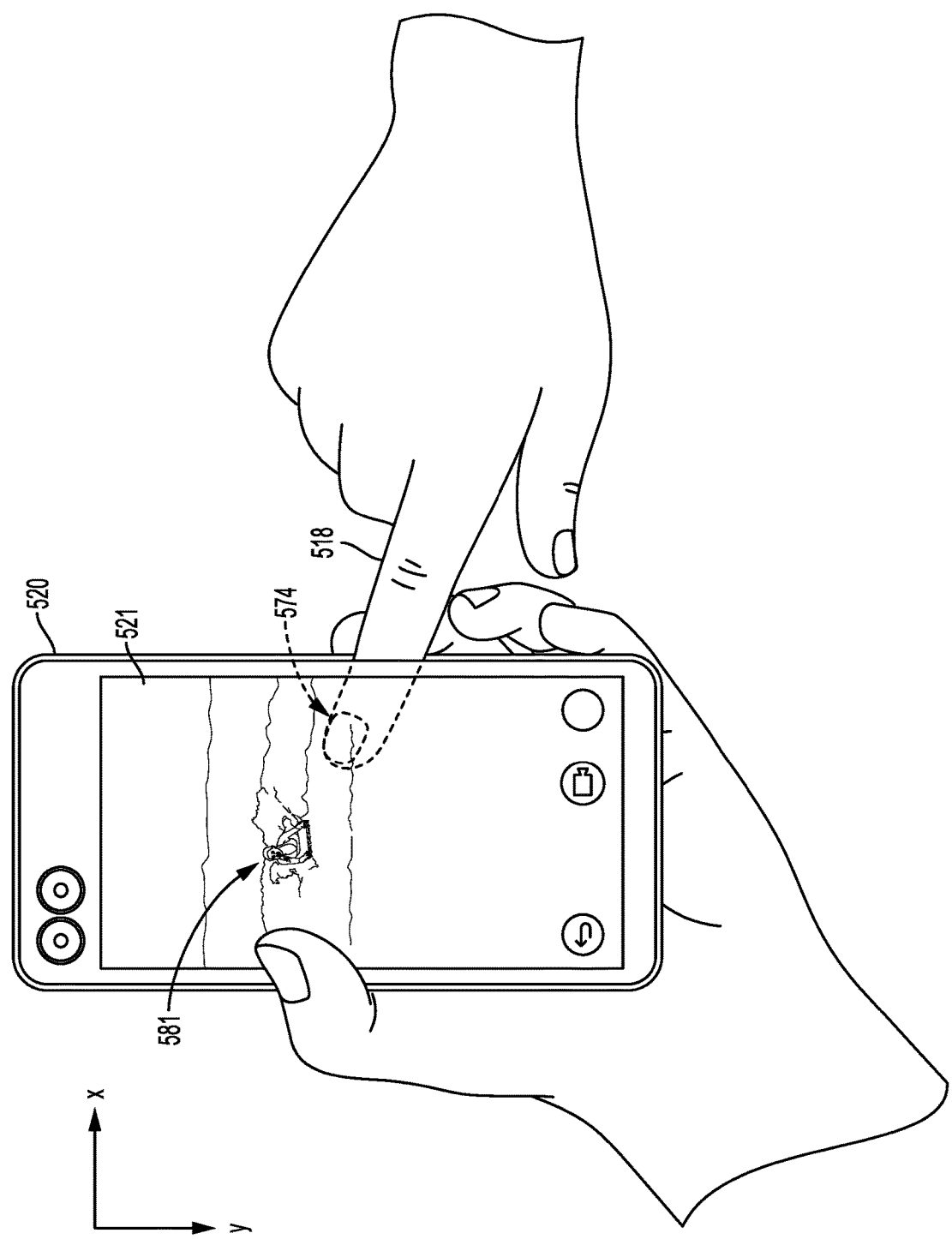

Turning now to FIG. 5E, an initiation of a second user input to control zoom level and image capture operations is illustrated. In this example, the user has caused the electronic image capture device 520 to complete the image capture operation depicted in FIG. 5D (as a result of the release of the touch input) and has provided a second touch input via input element 518 at a second position 574 of the input surface of the display 521. In order to capture a second image frame depicting the subject 581 and the scene at a lower zoom level than was used to capture the image in FIG. 5D (e.g., to zoom-out) the user has twisted the input element 518 at the second position 574 relative to the display 521 in a counter-clockwise direction. As a result, a zoom-out operation has been performed by the device 520 and the subject 581 displayed in FIG. 5E is smaller relative to the display 521 than in the image frame captured in the preceding user input depicted in FIGS. 5A-5D. Hence, it will be appreciated that opposing directions of movement during a first portion of a user input can result in different adjustments to zoom level.

Referring generally to FIGS. 5A-5E, while the depicted example illustrates an intuitive mechanism to control two or more imaging operations via a single, continuous user input, in some aspects it may be desirable to control a first imaging operation during the first portion of the input in accordance with an expected range of comfortable movement by the user. For example, when a twisting input type is providing during the first portion of the user input to control a zoom level, it may be desirable to set a zoom level maximum and a zoom level minimum relative to a comfortable range of motion that may be expected by the user. In some cases, this range can be based on the type of input element. For example, when a finger is utilized as the input element, a range of comfortable rotation or twisting of the input element relative to the display 521 may be less than 360 degrees. For example, it may be comfortable for a user to twist a forefinger of one hand in a range of between 45 degrees and 270 degrees. In another example, it may be comfortable for a user to twist a thumb of one hand in a more restricted range of motion. For example, a thumb may be comfortably twisted in a range of 45 degrees, or less, relative to the display 521 when a hand associated with the thumb is utilized to hold the electronic image capture device 520. In this way, the zoom level control can be adjusted based on a range of twist or rotational movement of the input element that is less than 360 degrees. Further, a different range may be used to control a zoom level of a rear facing camera module as compared to a range used to control a zoom level of a front facing module since different types of input elements may commonly be used with each module (e.g., thumb for front facing selfie and forefinger for rear facing camera module zoom level control). In this way, a zoom level control responsivity can vary depending on the overall range set for twist input. Hence, a 15 degree twist applied when using a front facing camera module of an electronic image capture device can result in a different overall change in zoom level as compared to a 15 degree twist applied when using a rear facing camera module of the same electronic image capture device since different bounds of a zoom level control range may be set for the different camera modules.

Figure 6A:
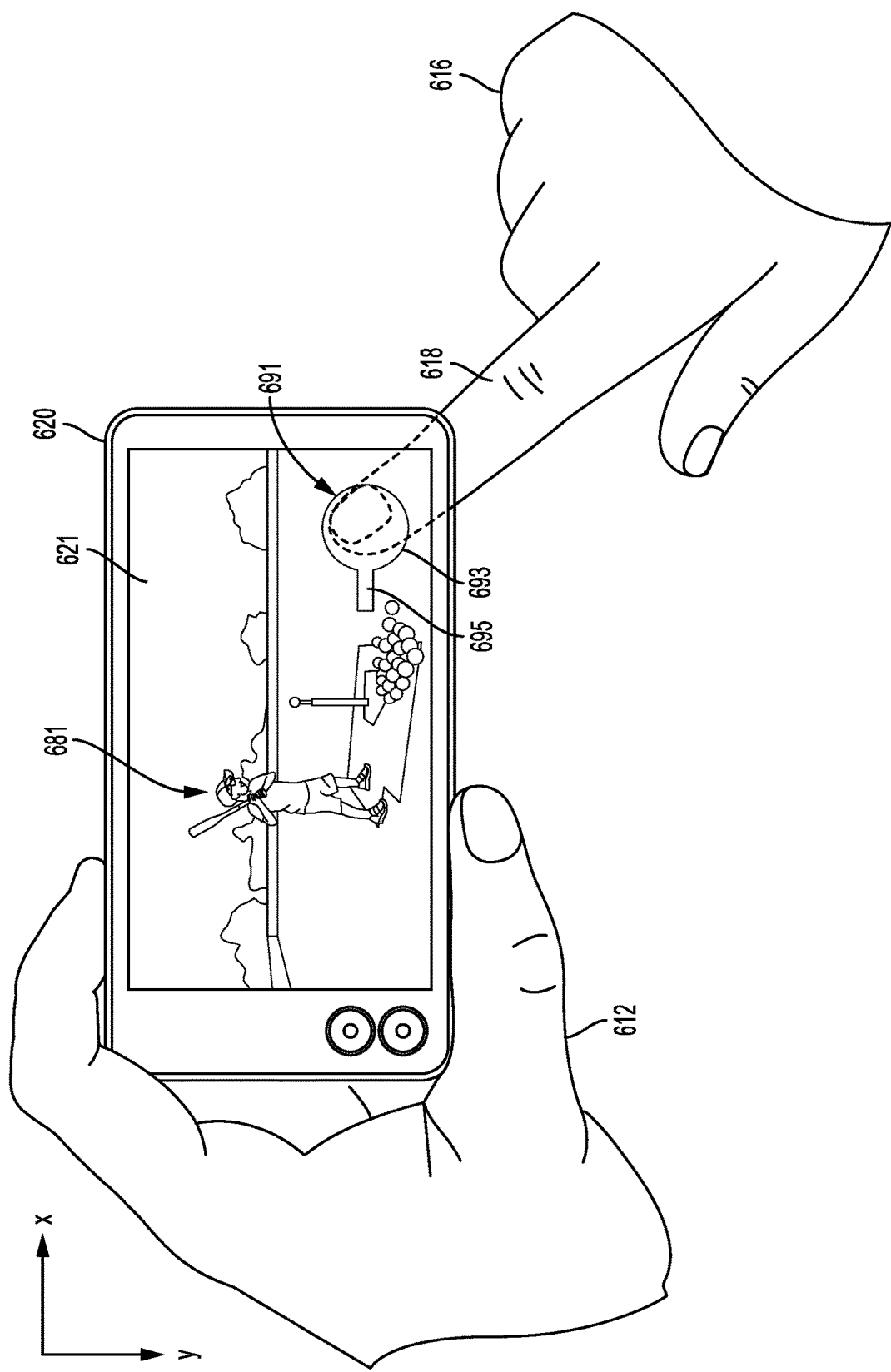
FIGS. 6A-6C depict another example of imaging operations controlled in response to a continuous user input.
Figure 6B:
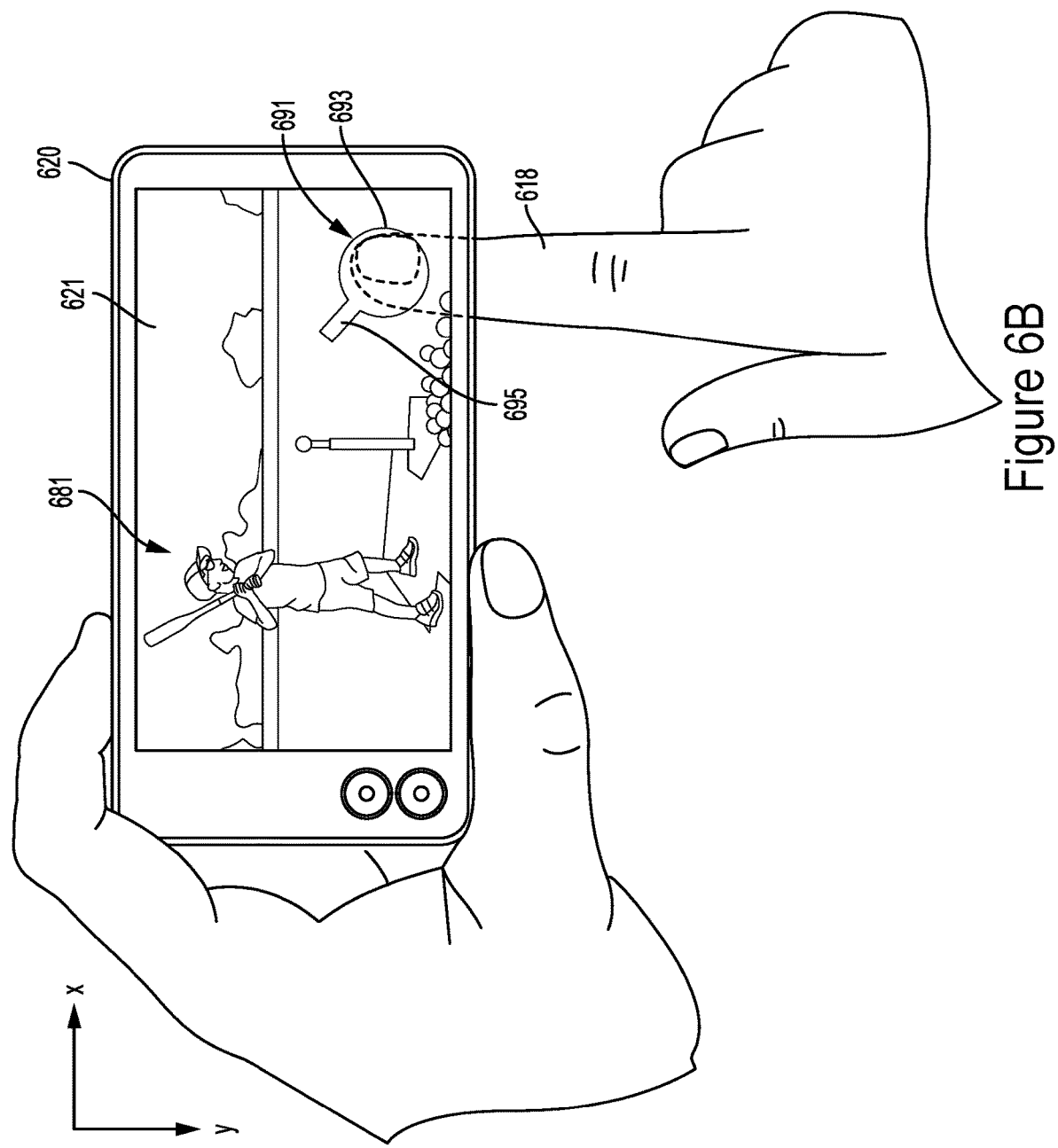
Figure 6C:
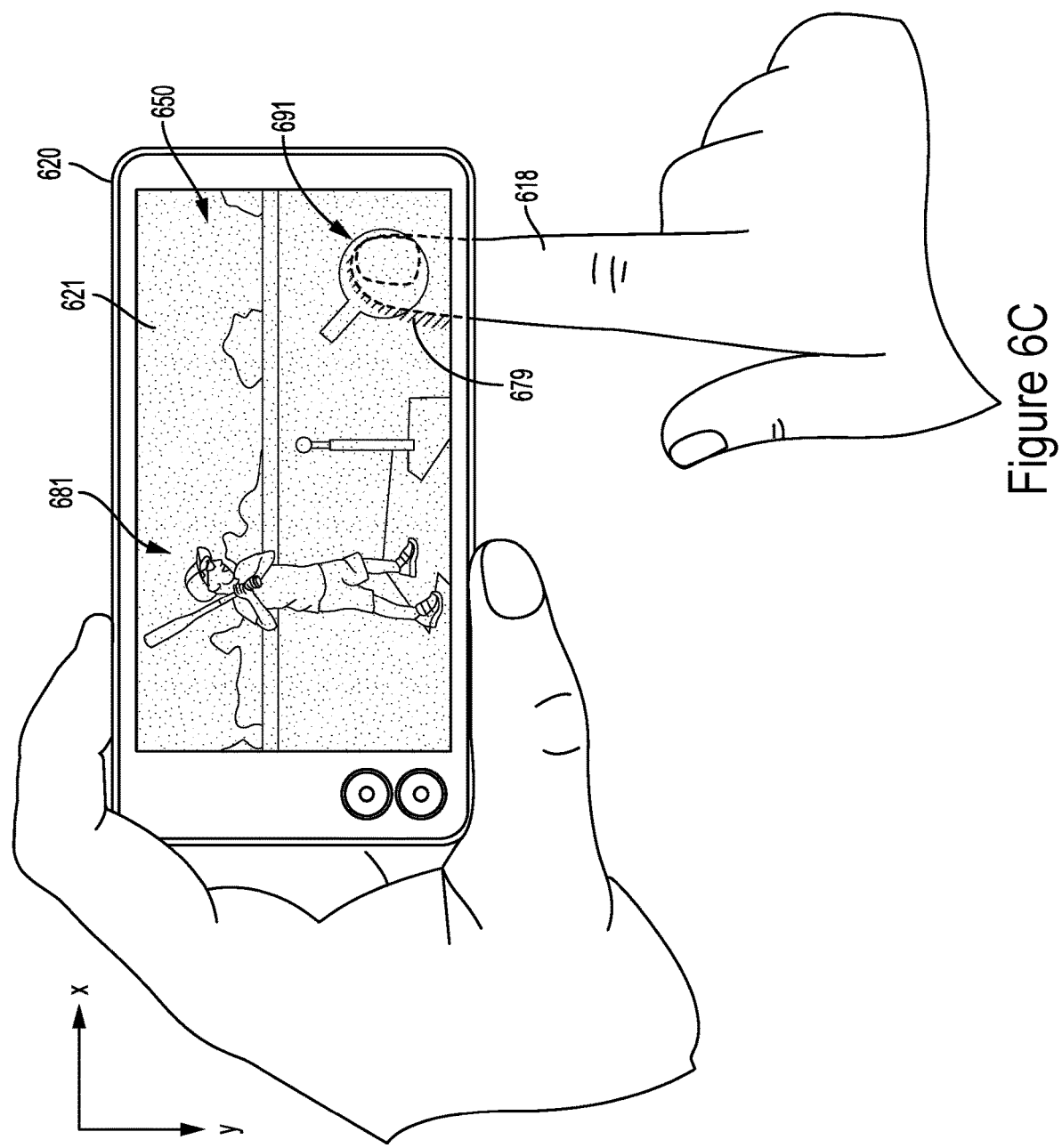

FIGS. 6A-6C schematically depict another example of a user input that controls different imaging operations performed by an electronic image capture device 620. The electronic image capture device 620 is supported by a first hand 612 of a user. The electronic image capture device 620 also includes a display 621 having a user input surface and outputting a preview stream of image frames depicting a scene. The scene includes a subject 681 depicted as a child preparing to a strike a baseball disposed on a baseball training device. The display 621 is also illustrated as outputting a graphical element 691 of a graphical user interface. The graphical element 691 includes a first region 693 and a second region 695. In this example, the user input can include a first portion which commences after a touch input is provided by an input element 618 at the graphical element 691.

In the example illustrated in FIG. 6A, the input element 618 includes a forefinger of a second hand 616 of the user. Of course, it will be appreciated that the input element 618 can include other forms. Further, it will be appreciated that the location of the graphical element 691 can be persistent relative to the display 621. That is, the position of the graphical element 691 can be set so as to appear at a common location along the input surface of the display whenever a camera application is in use. Alternatively, the graphical element 691 can appear in response to a touch input at any position along the input surface of the display. In this way, a user may determine a location for the graphical element 691. For example, a user can place the a touch input at a location on the display so as to position the graphical element 691 in a location that does not occlude a region of interest of a preview frame.

Turning now to FIG. 6B, the user has maintained the touch input via the input element 618 that was initiated in FIG. 6A, and has moved the input element relative to the display 621. The movement of the input element 618 between FIGS. 6A and 6B can be characterized as a twisting or rotational movement relative to the input surface of the display 621. The twisting or rotational movement of the input element 618 can be observed by comparing positions of the input element 618 in FIGS. 6A and 6B. Additionally, the graphical element 691 has rotated about the x-y plane of the input surface between FIGS. 6A and 6B to provide feedback to the user related to the movement of the input element 618 as sensed by the electronic image capture device 620. More specifically, the second region 695 of the graphical element 691 has moved in a clockwise direction about the perimeter of the first region 693 to provide indicia of the sensed movement of the input element 618. Those having skill in the art will appreciate that the arrangement of the first region 693 and the second region 695 can be intuited by a user as a virtual dial that is responsive to a twisting input. Further, it will be understood that the graphical element 691 is one example of a virtual or graphical dial and that other geometries, shapes, or arrangements of graphical elements can be utilized in accordance with aspects of the present disclosure.

Still referring to FIG. 6B, the first portion of the user input illustrated as the movement of the input element 618 between FIGS. 6A and 6B can be used to control a zoom level of a rear facing camera module of the electronic image capture device 620. For example, the subject 681 is enlarged relative to the display 621 in FIG. 6B as compared to FIG. 6A.

Referring now to FIG. 6C, a second portion of the user input is shown. The second portion includes a release of the input element 618 as illustrated by an emphasized separation 679 disposed between the display 621 and the input element. The second input type of a release conducted during the second portion of the user input controls a different imaging operation than the first type of user input (twisting) conducted during the first portion of the user input illustrated described with reference to FIGS. 6A and 6B. In this illustrated example, the release controls an image capture operation depicted by the stylized hatching of the captured image frame 650 presented on the display 621 in FIG. 6C. As discussed above with reference to FIG. 5D, in other embodiments, the second portion can include an alternative type of touch input. For example, the input type during the second portion can include a release (as illustrated), a translation of the input element across the display 621, a steady touch (e.g., a long touch), a pressure touch, etc. In this way, the user is able to conduct a single, continuous user input to control a zoom level of the rear facing camera module of the electronic image capture device 620 before smoothly transitioning to control an image capture operation in a way that does not require a repositioning of the input element 618 along the x-y plane. As a result, the user is able to more quickly capture an image frame depicting the subject as desired after the zoom level control adjustment as compared to the examples depicted in FIGS. 1 and 2.

FIGS. 7A-7D illustrate another example of a user input that controls different imaging operations performed by an electronic image capture device 720 via a graphical user interface. The example user input begins in FIG. 7A with a touch between an input element 717 and an input surface of a display 721. The touch input is provided at a location 773 on the display 721 and in this example the input element 717 includes a thumb. The thumb is associated with a hand 716 that is supporting the electronic image capture device 720 so as to frame an image of the user 781A and a second subject 781B situated in close proximity to the user 781A via a front facing camera module 701 of the device. In this way, FIG. 7A can be considered as depicting an example of a selfie, usie, or groupie capture operation and highlights the aforementioned complexities in adjusting different imaging operations using a digit of a hand that is also used to support and position the device 720. The front facing camera module 701 includes a first camera 702 and a second camera 704. However, in other embodiments the example operation described with reference to FIGS. 7A-7D can be implemented in differently provisioned electronic image capture devices (e.g., using a rear facing camera module and/or using differently configured front facing camera modules than the example depicted in FIG. 7A).

Figure 7A:
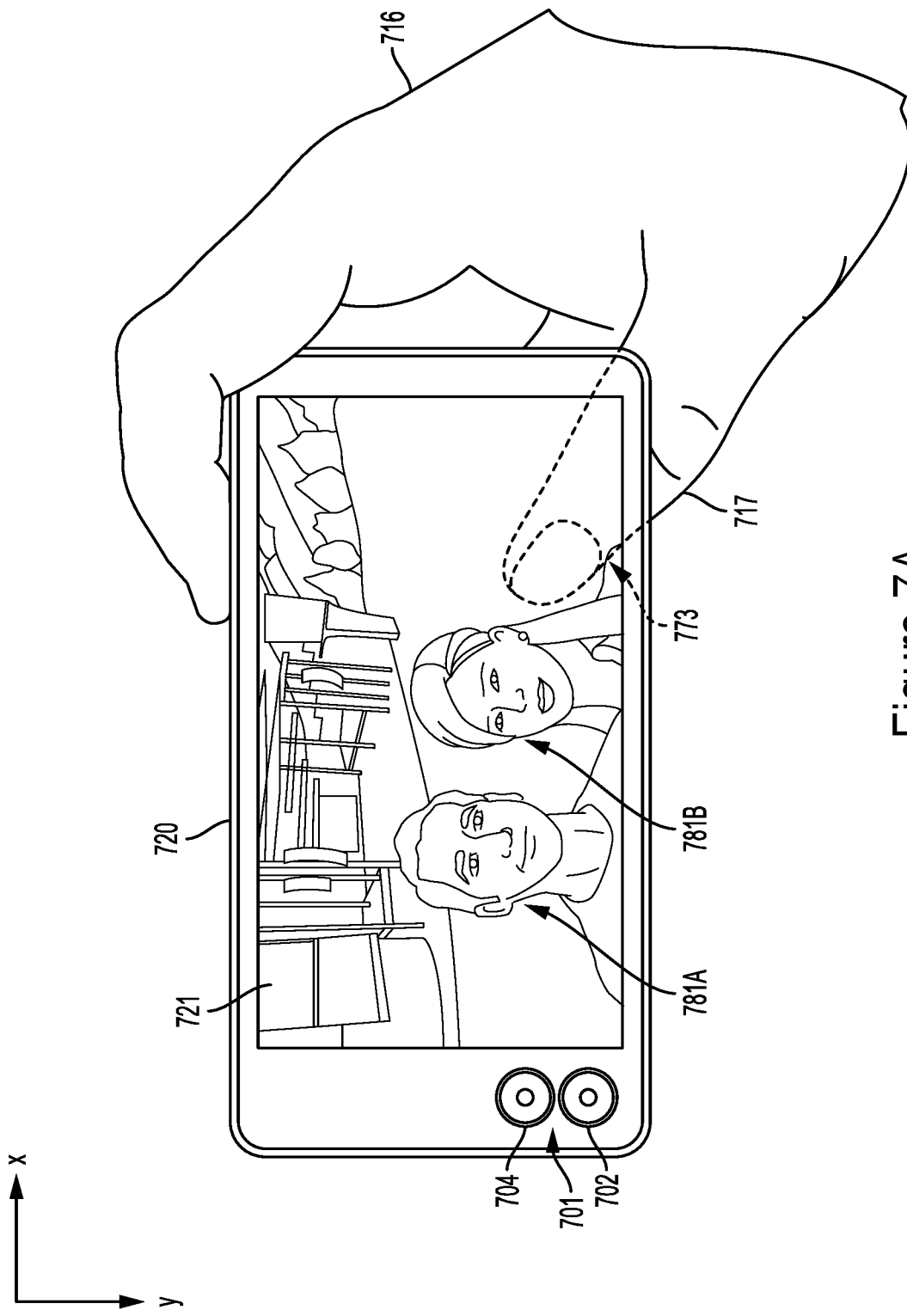
FIGS. 7A-7D depict example imaging operations controlled in response to user input provided via a graphical element of a graphical user interface.

Still referring to FIG. 7A, the location 773 of the touch input can be selected by the user 781A. That is, in some implementations, the user 781A can initiate the example user input by touching any location along the input surface of display 721. In other implementations, a graphical user interface may dictate a location of the touch input described below. That is to say, the display may persistently present one or more graphical user interface elements setting a location of touch input to control one or more imaging operations (e.g., a zoom level control and/or image frame capture control). In other implementations, a sub-portion of the input surface of the display 721 may be utilized to receive the touch input shown in FIG. 7A. For example, the electronic image capture device 720 can be configured to enable the user 781A to provide the input depicted in any location bounded within a lower half, upper half, quadrant, right most half, left most half, etc. of the display 721.

Figure 7B:
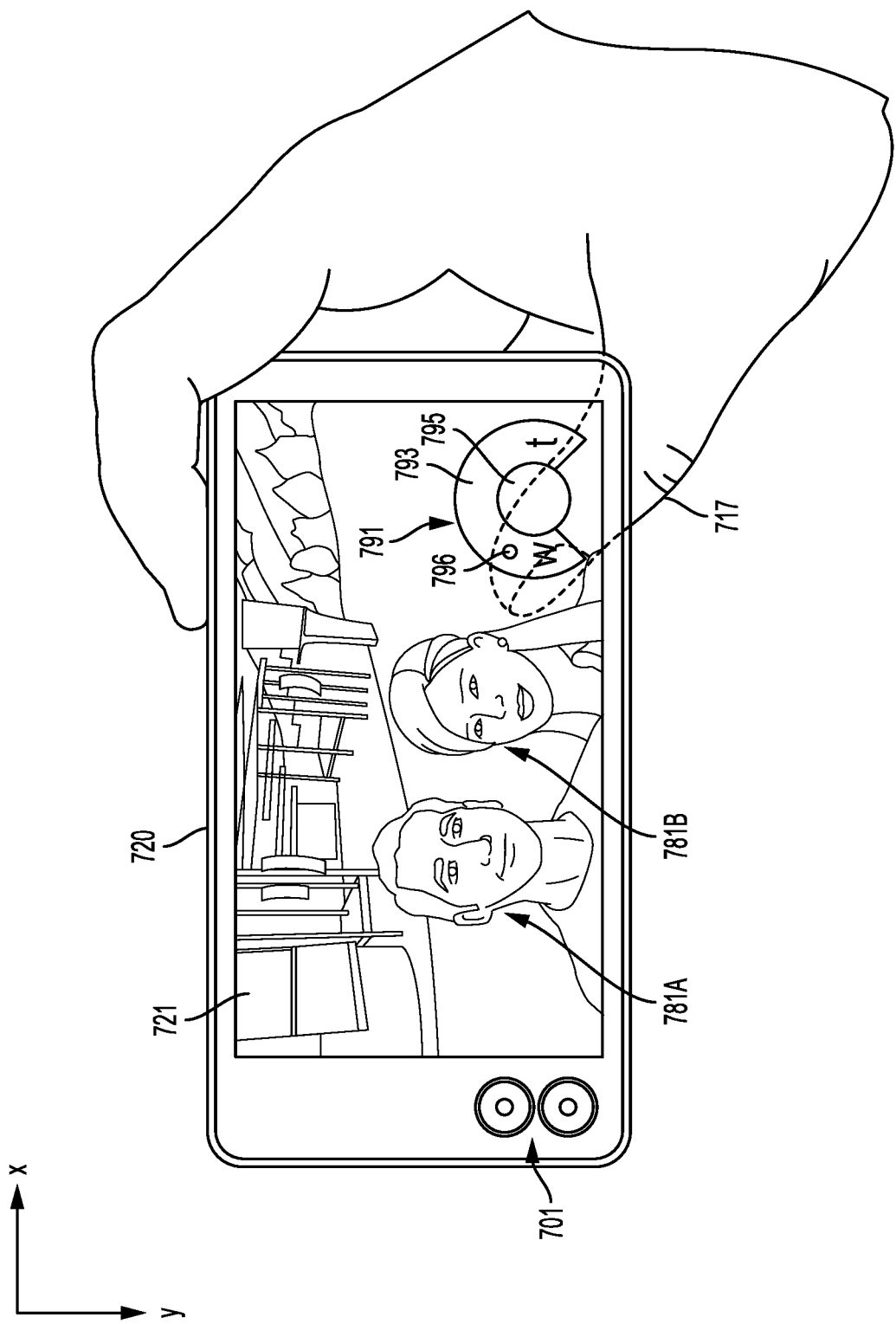

Referring now to FIG. 7B, once the touch input depicted in FIG. 7A is received, a graphical element 791 may be displayed at or near the location 773 of the touch input. In some embodiments, the graphical element 791 can be displayed once a threshold length of time of the touch input has been met. For example, the graphical element 791 can be configured once the initiated touch input has persisted for 0.5 seconds, or another amount of time that can indicate an intended touch or persistent touch. In any case, the graphical element 791 can include a first region 793 and a second region 795.

Figure 7C:
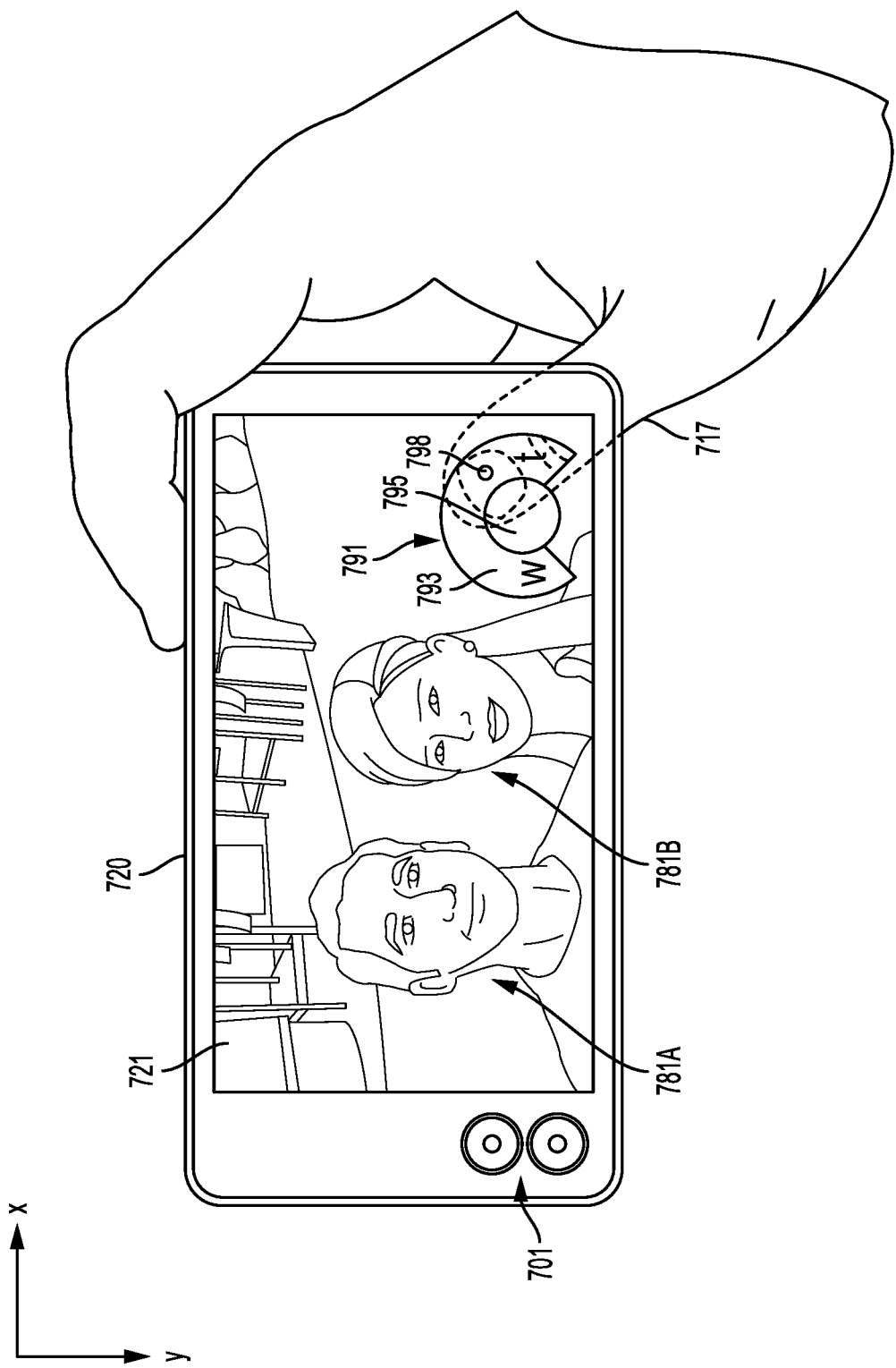

Referring now to FIGS. 7B and 7C, a zoom level of the camera module 701 can be controlled in response to a movement of the input element 717 relative to the first region 793 during a first portion of the user input described with reference to FIGS. 7A-7D. For example, a location 796 of the touch input on the first region 793 in FIG. 7B is different than a location 798 of the touch input on the first region in FIG. 7C. In some embodiments, the movement of the input element 717 relative to the first region depicted in FIGS. 7B and 7C can include a continuous translated touch input (e.g., a drag) across the display 721 along an arc. In other embodiments, the movement can include a transition from a first touch to a second touch with a separation of the input element 717 from the display 721 there between. In this way, the first region 793 of the graphical element 791 can act as an arced slider or virtual dial to allow the user 781A to provide a zoom level control input via a graphical user interface.

In some implementations, an initial zoom level upon the initialization of the camera module 701 can be disposed evenly between a minimum and maximum zoom level that the camera module 701 can be controlled to. In such implementations, the graphical element 791 can be initially displayed such that a position of the initial touch input relative to first region 793 is between the relative ends of the illustrated arc. In other implementations, a default zoom level may be fully zoomed out (wide level) or fully zoomed in (tele level) and the graphical element 791 can be rendered accordingly such that it is convenient for the user to provide input to control the zoom level via the first region 793, if needed.

Figure 7D:
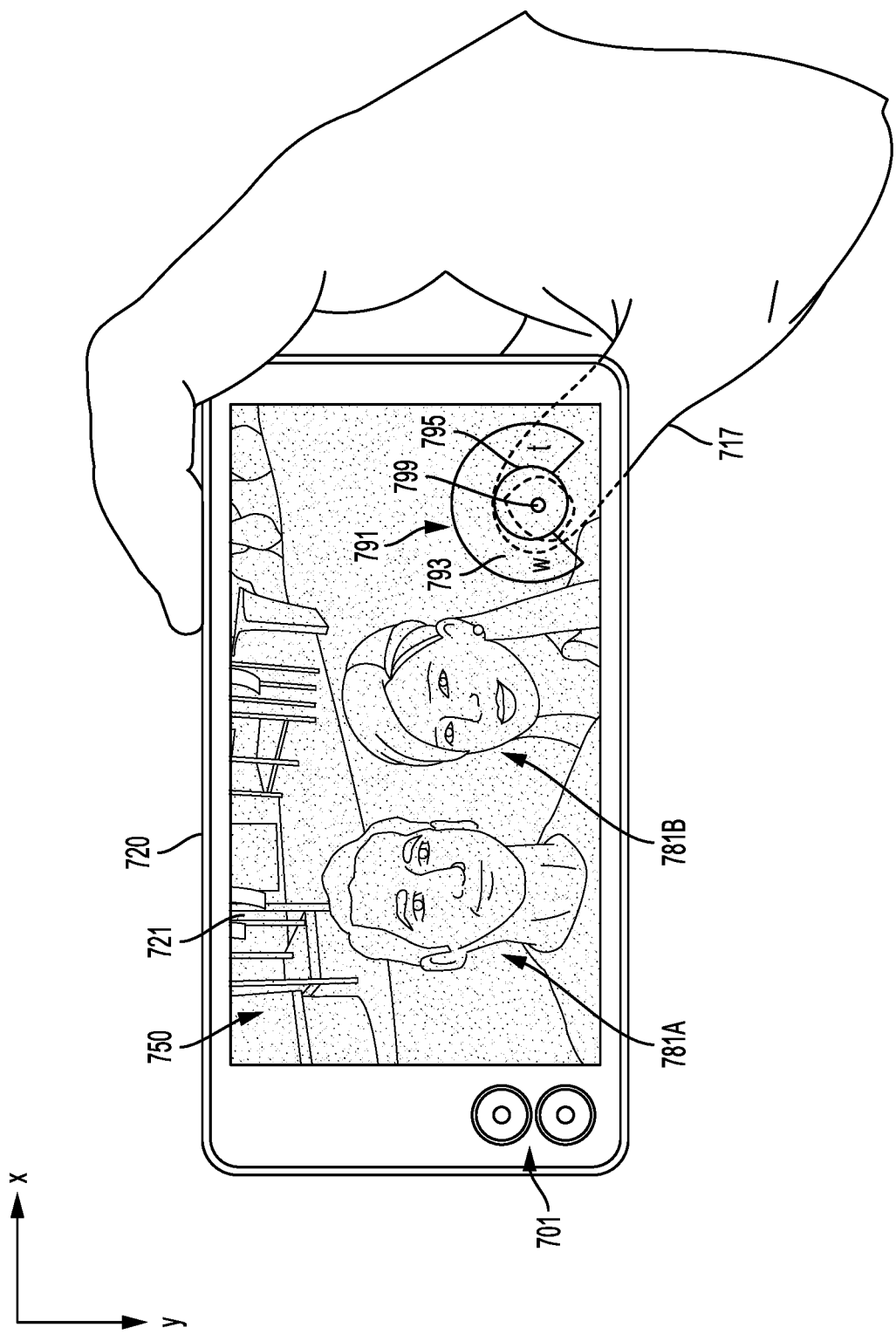

Turning now to FIG. 7D, a location 799 of touch input by the input element 717 has moved to the second region 795 of the graphical element 791 as compared to the location 798 shown in FIG. 7C. In this way, those having skill in the art will appreciate that a second portion of the user input described with reference to FIGS. 7A-7D can include a second movement of the input element 717 between the first region 793 and the second region 795. This second movement during the second portion of the user input can be provided to control an image capture operation once a desired zoom level has been reached based on the first portion of the user input. For example, as shown in the captured image frame 750 rendered on the display 721 in FIG. 7C, the user 781A and the second subject 781B are framed in the scene such that they are enlarged relative to FIG. 7A and such that the background stage at the depicted venue is also framed within the image frame 750. In some embodiments, the user 781A can maintain a touch input at the second region 795 after moving the input element from the first region 793 to the second region to trigger a burst capture of multiple still image frames and/or to trigger a video capture mode.

In some embodiments, the movement of the input element 717 between FIGS. 7C and 7D can include a translated, continuous touch input (e.g., a drag) along the display 721 along a line segment extending between the location of touch input depicted in FIG. 7C and the location of touch input depicted in FIG. 7D. In this way, the first portion (e.g., FIGS. 7A-7C) of the user input to control the zoom level and the second portion (e.g., FIGS. 7C-7D) of the user input can form a continuous touch input including at least two translations. That is to say, the first portion and the second portion can be arranged in temporal series with no interruption and/or intervening portion there between. As a result, a time and level of coordination required to transition between a zoom level control input (e.g., the first portion) and an image capture control input (e.g., the second portion) can be minimized as compared to the examples described with reference to FIGS. 1 and 2. Of course, in other embodiments, the movements depicted in FIGS. 7B-7D need not be continuous touch translations (e.g., one or more drags along the display) and the first portion and the second portion can be arranged with intervening portions there between so as to not be arranged directly in temporal series.

Figure 8A:
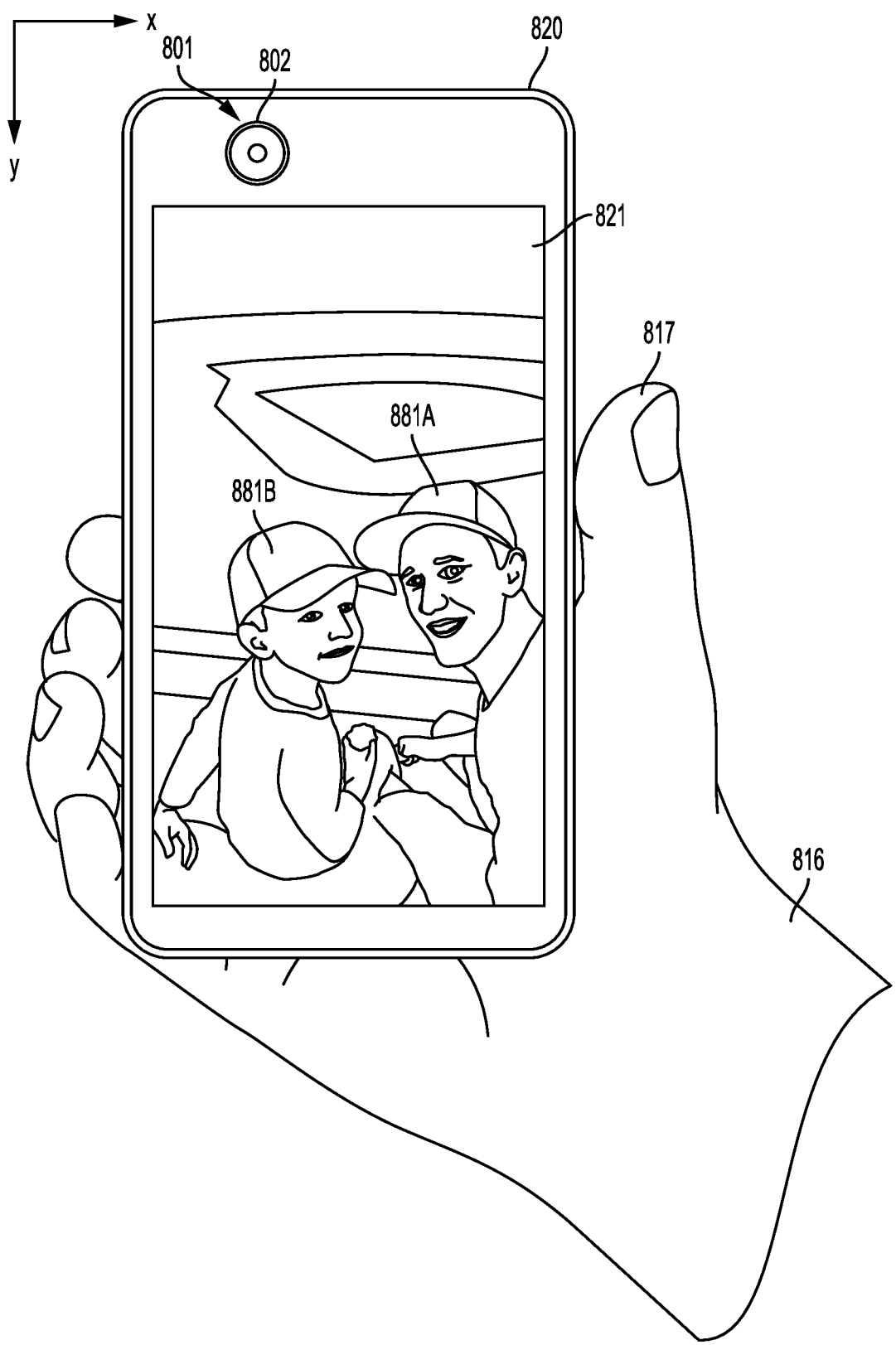
FIGS. 8A-8E depict yet another example of imaging operations controlled in response to user input provided via a graphical element of a graphical user interface.

FIGS. 8A-8E schematically depict another example of imaging operations performed in response to a user input provided via a graphical user interface. FIG. 8A illustrates an electronic image capture device 820 being held by a hand 816 of a user 881A. Similar to FIGS. 7A-7D, FIG. 8A illustrates an example of image frame capture operation using a front facing camera module 801 having a single camera 802 configured to receive image frames depicting the user 881A and a young child 881B.

Figure 8B:
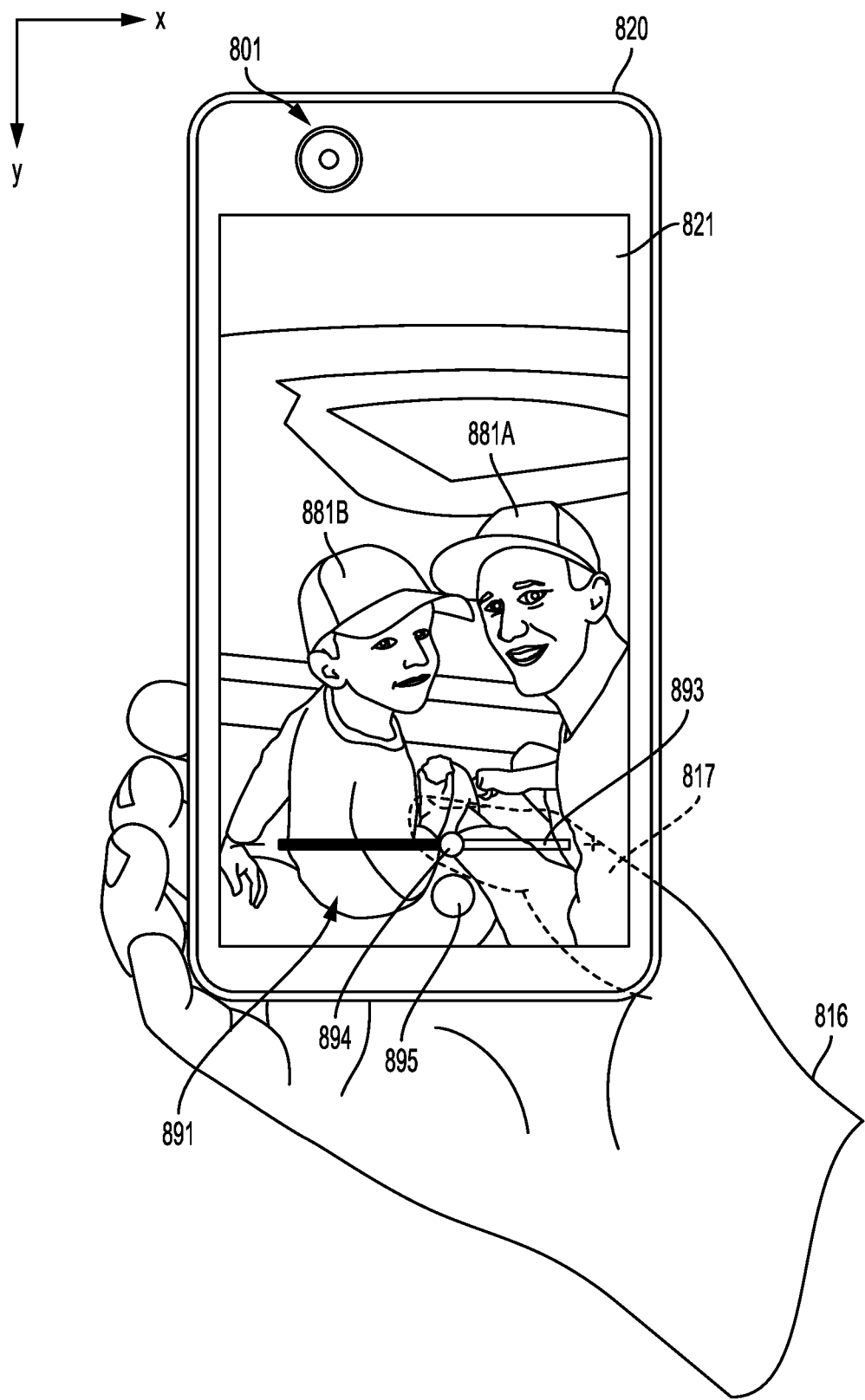

FIG. 8B shows a touch input on the input surface of the display 821 provided by the input element 817. In response to the touch input, a graphical element 891 is rendered. For discussion purposes, only graphical element 891 is shown in FIGS. 8B-8E. However, it will be understood that the electronic image capture device 820 can be configured to output a graphical user interface including additional graphical elements. For example, a graphical user interface can be provided to receive touch inputs related to other imaging and/or device control operations than the examples discussed herein.

Still referring to FIG. 8B, the graphical element 891 includes a first region 893, a second region 895, and a third region 894. The first region 893 includes a slider bar and the third region 894 includes a sliding indicator. The slider bar and the sliding indicator can be used to receive an input to control a zoom level. For example, a touch input can move between positions along the slider bar to adjust a zoom level of the camera module 801 between a minimum zoom level ("−" or "w") and a maximum zoom level ("+" or "t"). Similarly, the sliding indicator of the third region 894 can provide feedback to the user regarding a location along the display 821 of sensed touch input and/or of a current zoom level applied relative to a range of zoom level control. In some implementations, a continuous touch input can be applied to move the third region 894 relative to the first region 893 (e.g., a drag gesture). In other implementations a zoom level can be adjusted by providing discrete touch inputs along the slider bar (e.g., separate touch inputs). Persons with skill in the art will appreciate that other input types (e.g., non-touch gestures) can be received to adjust a zoom level via the slider bar and sliding indicator.

Figure 8C:
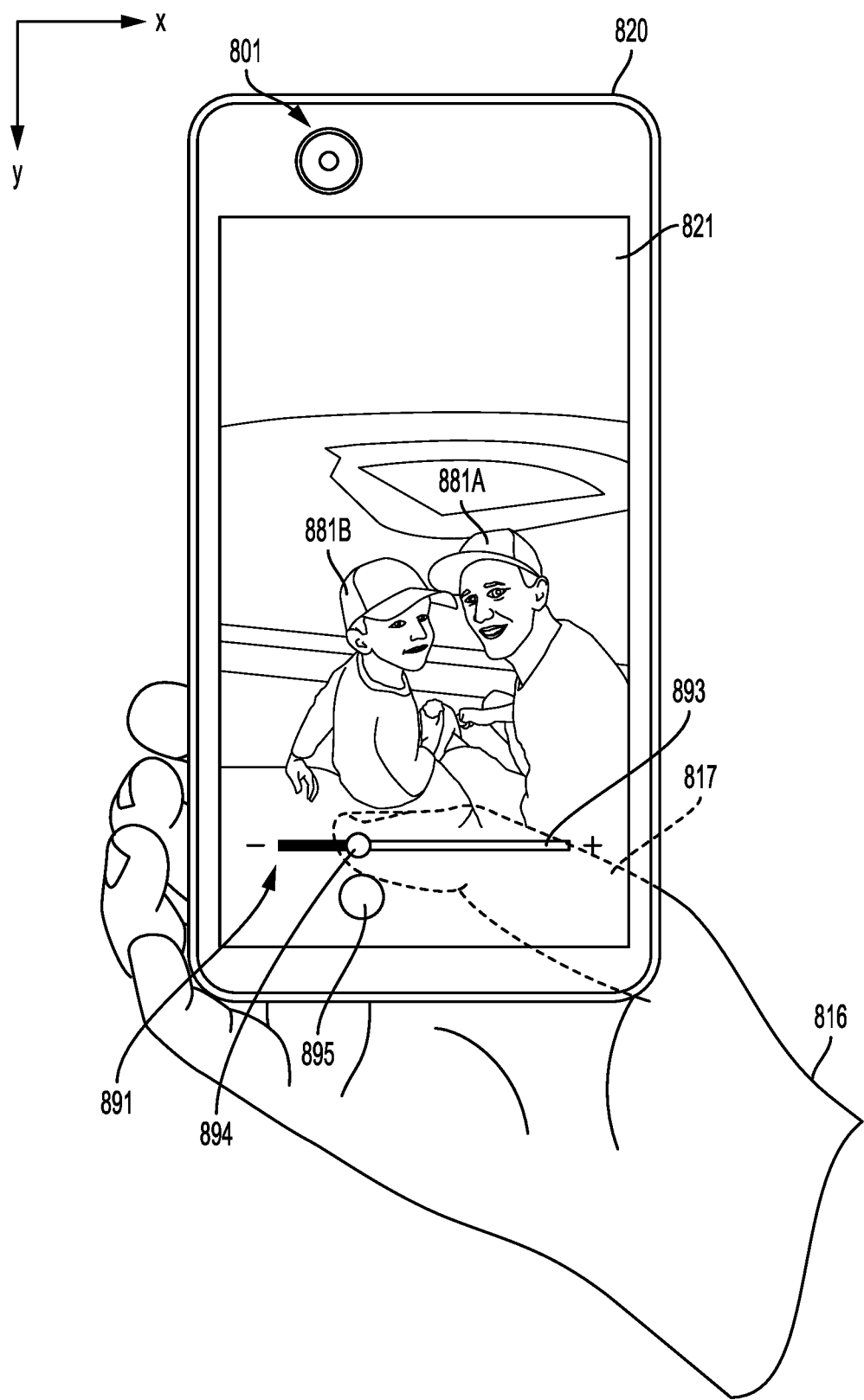
Figure 8D:
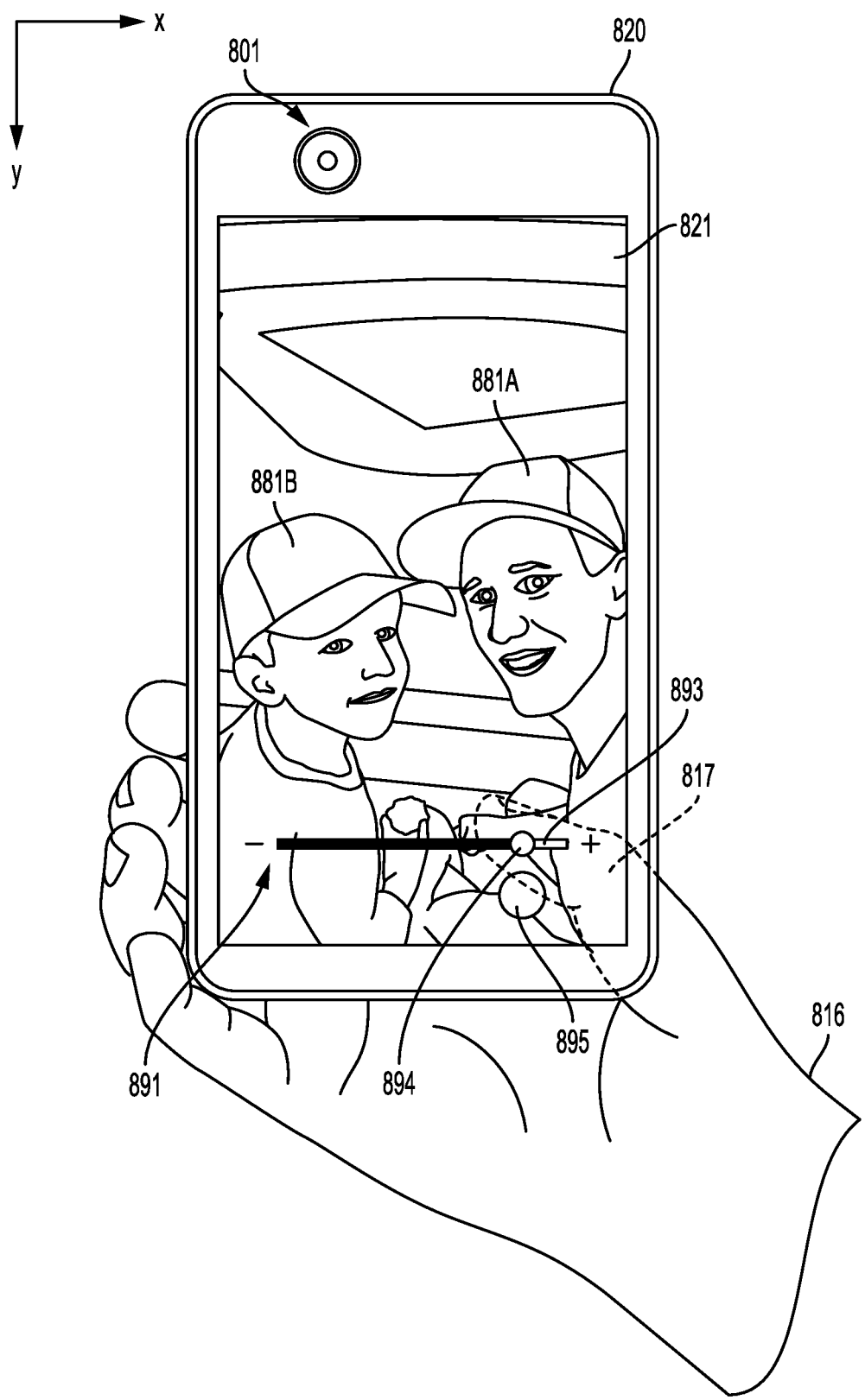

Turning now to FIG. 8C, a position of the received touch input along the slider bar of the first region 893 as indicated by the sliding indicator of the third region 894 has moved relative to the position shown in FIG. 8B. Specifically, the sliding indicator is positioned closer to the minimum zoom level as compared to the position of touch input along the slider bar in FIG. 8B. As a result, a zoom level of the preview image represented on the display 821 has decreased in FIG. 8C. Further, a position of the second region 895 has also moved between FIG. 8B in response to the change in touch position. FIG. 8D shows yet another position of the received touch input along the slider bar of the first region 893. In this figure, the sliding indicator of the third region 894 is positioned closer to the maximum zoom level as compared to the position of the touch input along the slider bar in FIG. 8B. Thus, a zoom level of the preview image on the display 821 has increased in FIG. 8D relative to FIGS. 8C and 8B.

In some embodiments, the second region 895 can include a capture or shutter graphical element that can receive an input from the user 881A to cause the camera module 801 to capture an image frame. As discussed throughout this disclosure, it can be desirable to provision a user interface of an electronic image capture device so as to limit an amount of time and/or coordination required by a user to transition between input types that control separate imaging operations. For example, it can be desirable in some embodiments to limit a distance between a first region of a graphical element that can be used to control a first imaging operation and a second region of the graphical element that can be used to control a second, and different, imaging operation. Further, it can be desirable to maintain a spatial relationship between input areas of different regions of a graphical element such that a common direction of motion is available at all times to transition from the first region to the second region (e.g., to transition between input to adjust different imaging operations affected by the separate regions of the graphical element).

Referring now to FIGS. 8C and 8D, it can be observed that a location of the second region 895 of the graphical element 891 moves in response to a change in location of the slider indicator of the third region 894. In other words, the second region 895 moves in concert with the third region 894 relative to the first region 893 based on a location of the touch input received from the input element 817 by the display 821. As a result, an x-y coordinate distance between the sliding indicator of the third region 894 and the second region 895 is maintained over time regardless of where the sliding indicator is positioned relative to the slider bar of the first region 893. Moreover, a relative direction in the x-y plane between the sliding indicator and the second region 895 is also persistent even as the sliding indicator moves along the slider bar. That is to say, the second region 895 is updated along with, and tracks the position of, the third region 894 such that it is always directly below (in a y-axis dimension) the sliding indicator. In some embodiments, a distance and/or direction between the second region 895 and the third region 894 can be selected and/or adjusted by a user. For example, a user may prefer an upward swipe or directional relation between the regions. Additionally, a user may adjust a distance to reduce a required time to transition between the two regions and/or to increase a distance so as to inhibit inadvertent selection.

Figure 8E:
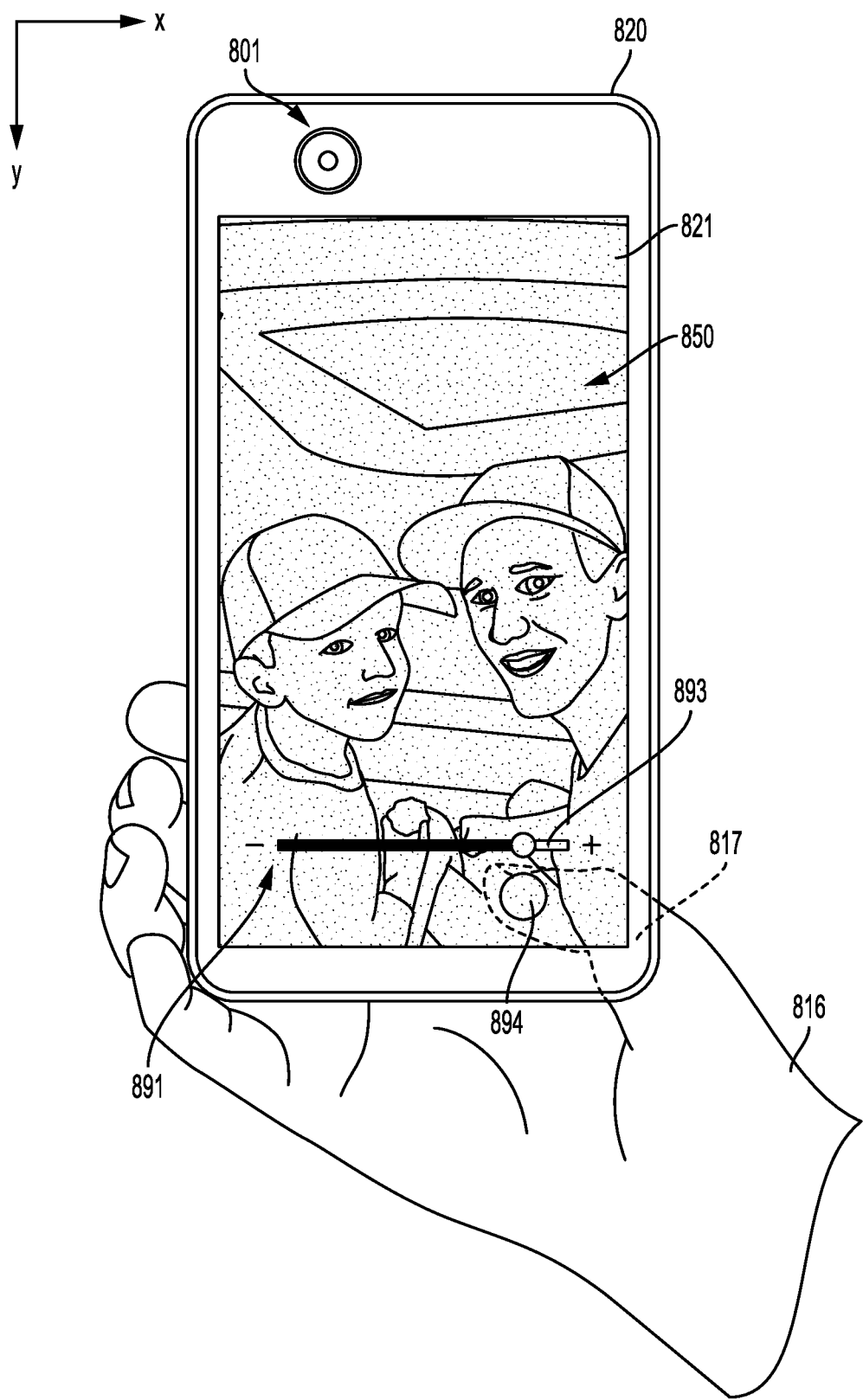

Turning now to FIG. 8E an advantage and improved user experience provided by the movement of the second region 895 relative to the first region 893 can be observed. In this figure, the user 881A has moved the input element 817 to provide a touch input at the second region 895. In some examples, the electronic image capture device 820 can be configured to cause the camera module 801 to capture an image frame 850 in response to the touch input at the second region 895. In other examples, additional or alternative imaging operations can be controlled in response to the user input via the second region 895 of the graphical element 891. In any case, because the movement of the second region 895 between FIGS. 8B and 8D tracks the touch input represented by the sliding indicator, a distance d between the third region and the second is maintained throughout the user input operation. In this way, an amount of coordination and time required to transition between the first input to control the zoom level (FIGS. 8B-8D) and a second input to control the image capture (FIG. 8E) can be reduced as compared to the examples discussed above with reference to FIGS. 1 and 2. As a result, a user of the device depicted in FIGS. 8A-8E is more likely to capture an image frame as intended because it is less likely that the scene changes between the first input and the second input and/or because hand shake can be limited due to a reduction in coordinational complexity.

In contrast to the example of FIGS. 7A-7D, the user 881A in FIGS. 8A-8E is holding the electronic image capture device 820 in a portrait mode configuration so as to frame himself, the young child 881B, and a region of interest of a background portion of the scene (e.g., an infield of a baseball field positioned behind the child 881B and user 881A). Those having skill in the art will appreciate that since an x-axis coordinate of the center of mass of the device 820 is disposed squarely within x-axis coordinate boundaries of the user's hand 816, it may be easier to move the thumb of the hand in a greater range of motion than in the example of FIGS. 7A-7D (with the device in landscape mode configuration). That is, an effect of a moment applied on the center of mass of the user's hand by the movement of the thumb (e.g., input element 817) is reduced by the balance of the device 820. As a result, a greater range of motion of an input element 817 relative to the display 821 can be utilized to control a first imaging operation without increasing a level of manual dexterity and/or coordination required by the user 881A as compared to the implementation depicted in FIGS. 7A-7D. For example, a maximum translation dimension of the slider bar of the first region 893 can be higher than a maximum arc length of the first region 793 in FIGS. 7B-7D since it may be easier for a user to move a thumb in a greater range of motion when holding a device in a portrait configuration. Similarly, the arc shape of the first region 793 depicted in FIGS. 7B-7D may facilitate a translation length that is more comfortable to provide input over by a user than the same length arranged in a linear dimension since an x-axis minimum and a x-axis maximum of the arc shape may be closer to each other than the x-axis minimum and x-axis maximum of an equal linear translation span.

Continuing to compare the examples depicted in FIGS. 7 and 8, in some embodiments a region of a graphical element can be spaced apart from another region of the graphical element along an input surface such that the regions are not contiguous and/or do not abut one another along the input surface. For example, as illustrated in FIG. 8E the first and second regions 893, 895 are spaced apart from the third region 894 along the surface of the display 821 by a distance d. In some implementations, the spatial position and/or arrangement of regions of the graphical element can be selected to inhibit inadvertent contact or selection by a user. For example, by spacing the first and second regions 893, 895 apart from the third region 894, a user may more easily provide input via the first and second regions (e.g., to control a zoom level) without inadvertently contacting the third region 894 so as to provide input related to a separate imaging operation (e.g., to control a capture of an image frame). Those having skill in the art will appreciate that this selection can be applied to any of the embodiments disclosed herein. For example, although the first region 793 of the graphical element 791 in FIG. 7B abuts the second region 795 of the graphical element, those having skill in the art will appreciate that the first and second regions can be optionally spaced from one another along the surface of the display 721. Similarly, the responsivity to input of the touch stack can vary across the regions of the graphical element 791. In this way, a portion of the first region 793 that is proximate to the second region 795 can be less responsive or sensitive to user input than a more distal portion of the first region 793.

Those having skill in the art will appreciate that, in some implementations, it may be undesirable to receive an input to control an imaging operation (e.g., to control a zoom level) via a twist or rotation of an input element when using a front facing camera module since a common input element in such applications may be a thumb of a user, and it can be difficult to twist a thumb relative to an input surface while supporting a device with the hand of the thumb. Thus, in some aspects of the present disclosure, an electronic image capture device can be configured to receive different types of user inputs to control a common imaging operation (e.g., to control a zoom level) depending on which camera module is being utilized. For example, a first input type (e.g., a twist as depicted in FIG. 5 or 6) can be received to control a zoom level when a rear facing camera module is receiving image data and a second input type (e.g., a linear or non-linear translation as illustrated in FIGS. 7 and 8) can be received by the device to control a zoom level when a front facing module of the device is receiving image data. In some implementations, a user may be able to assign different input types to control a common imaging operation depending on which camera module is being utilized.

Figure 9A:
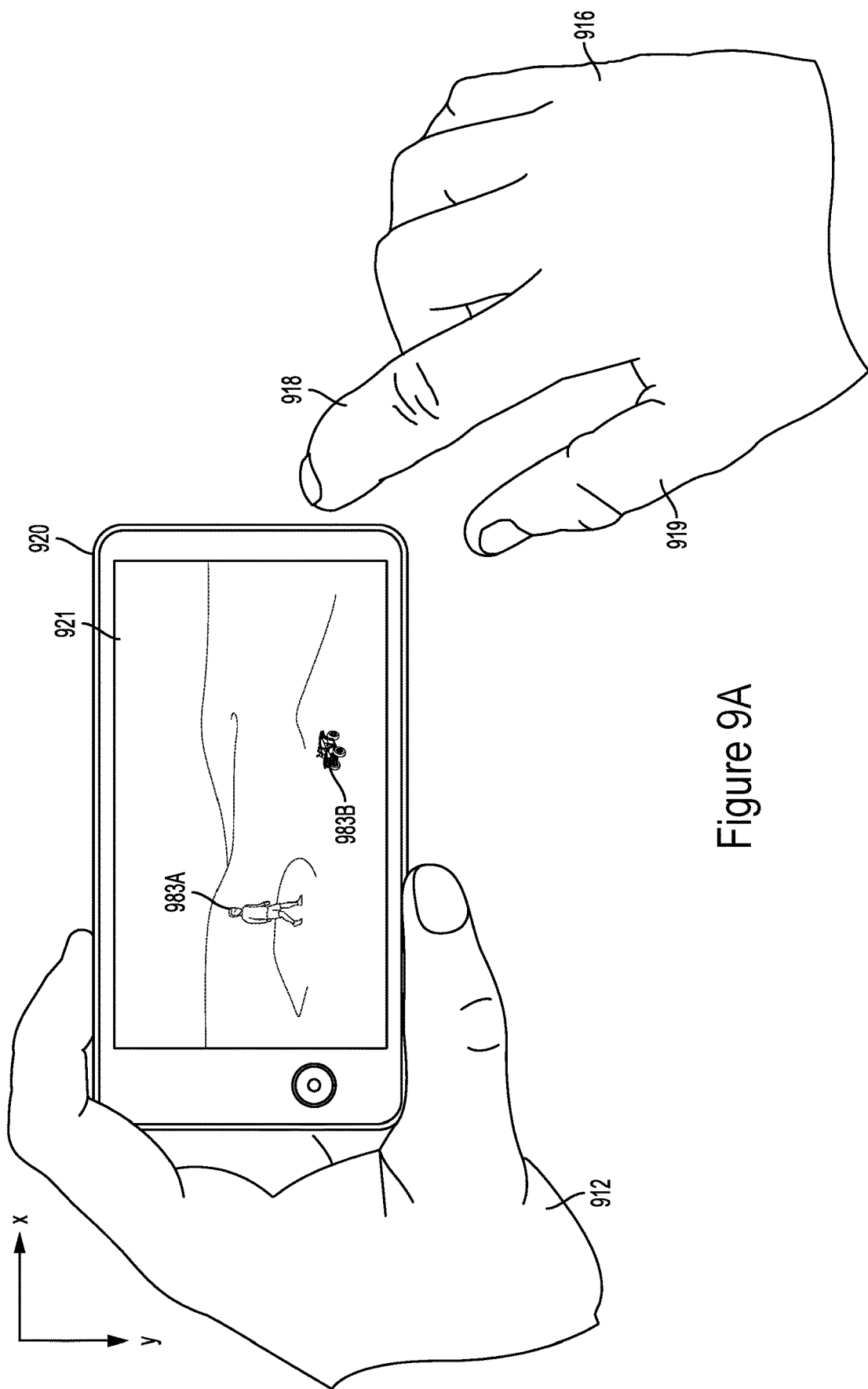
FIGS. 9A-9E depict an additional example of imaging operations performed in response to user input provided via a graphical element of a graphical user interface.

FIGS. 9A-9E depict an additional example of imaging operations performed in response to user input provided via an input surface of a device 920. FIG. 9A includes an electronic image capture device 920 including a display 921. The display 921 includes a preview image of a scene including a first subject 983A and a second subject 983B in a scene. The preview image is based on image data received by a rear facing camera module of the device 920 (not shown in FIG. 9A) and can form part of a preview stream utilized by a user to frame and compose the scene before capturing one or more image frames (e.g., before capturing one or more video sequences and/or one or more still image frames).

Figure 9B:
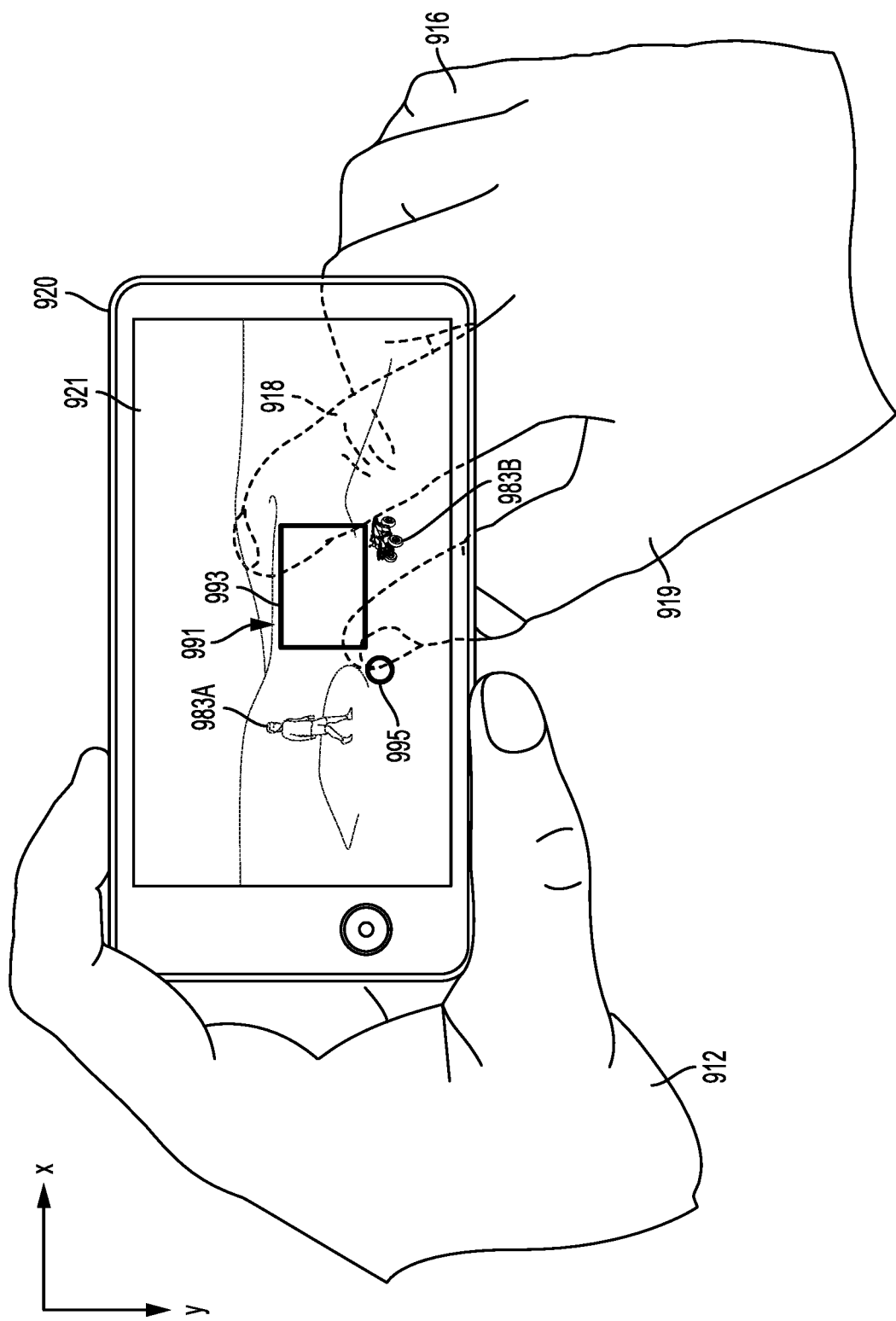

Referring now to FIGS. 9A and 9B, a first hand 912 of a user is illustrated as supporting and positioning the electronic image capture device 920 and a second hand 916 of the user is used as an input element to provide an input via an input surface of the display 921. In this example, a first digit of the second hand 916 (e.g., a forefinger) forms a first structure of the 918 of the user input element and a second digit (e.g., a thumb) forms a second structure 919 of the user input element.

Turning now to FIG. 9B, the example user input depicted in FIGS. 9A-9E can begin by positioning the first and second structures 918, 919 of the user input element relative to the display 921. For example, as shown, the first and second structures 918, 919 can be positioned by the user to touch an input surface of the display 921 at selected locations. Of course, in other examples, the first and second structures 918, 919 can be positioned to hover relative to the display 921 (e.g., in devices with contactless or non-tactile gesture input capabilities).

Once the positioning of the first and second structures 918, 919 relative to the display 921 is sensed by the device 920, a graphical element 991 can optionally be rendered on the display 921 to provide feedback to the user related to the positioning of the first and second structures. In some implementations, the graphical element 991 can include a first region 993 and a second region 995. In the illustrated example, the first region 993 can include a bounding box formed such that opposite corners of the box lie below sensed positions of the first and second structures 918, 919 of the user input element. Of course, other geometries can be implemented (e.g., other polygons or shapes including triangles, circles, squares, trapezoids, etc.). The first region 993 can include any suitable shape or geometry. For example, a circle, a square, a stylized icon, an asymmetrical shape with internal detail, etc. Those having skill in the art will appreciate that the first and second regions 993, 995 can be selected to provide indicia to a user related to: 1) a sensed location of the first and second structures 918, 919 as used to control a first imaging operation and 2) a location for input related to a second imaging operation.

Figure 9C:
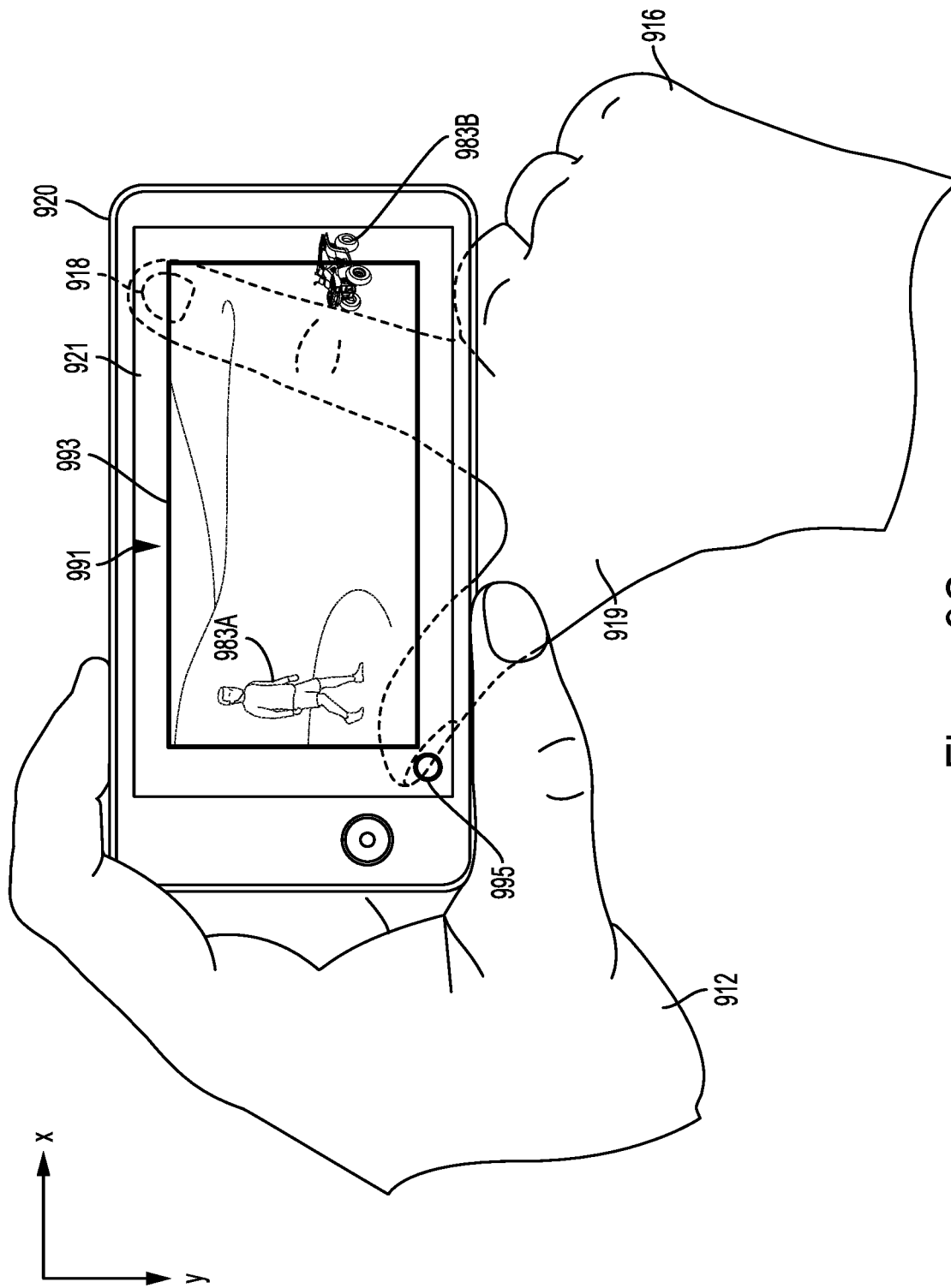

Turning now to FIGS. 9B and 9C, the example user input continues with a coordinated movement of the first and second structures 918, 919 of the user input element relative to the display 921 and relative to one another. Specifically, the first structure 918 has translated along an input surface of the display 921 between the position depicted in FIG. 9B and the position depicted in FIG. 9C. Similarly, the second structure 919 has translated along an input surface of the display 921 between the position depicted in FIG. 9B and the position depicted in FIG. 9C. Additionally, the direction of movement of the first structure 918 is opposite the direction of movement of the second structure 919 in x-axis coordinates and y-axis coordinates.

Those having skill in the art will appreciate that the movement of the first and second structures 918, 919 of the user input element observed by comparing FIGS. 9B and 9C depicts an example of an expansion of a pinch gesture (e.g., an unpinch) applied via touch on the display 921. Turning now to FIG. 9C, it can be observed that the depicted movement or pinch gesture can be used to control a zoom level applied by the rear facing camera module of the electronic image capture device 920. For example, the expansion of the distance between the first and second structures 918, 919 as represented by the first region 993 (e.g., bounding box) results in an increased zoom level or zoom-in between FIGS. 9B and 9C.

Figure 9D:
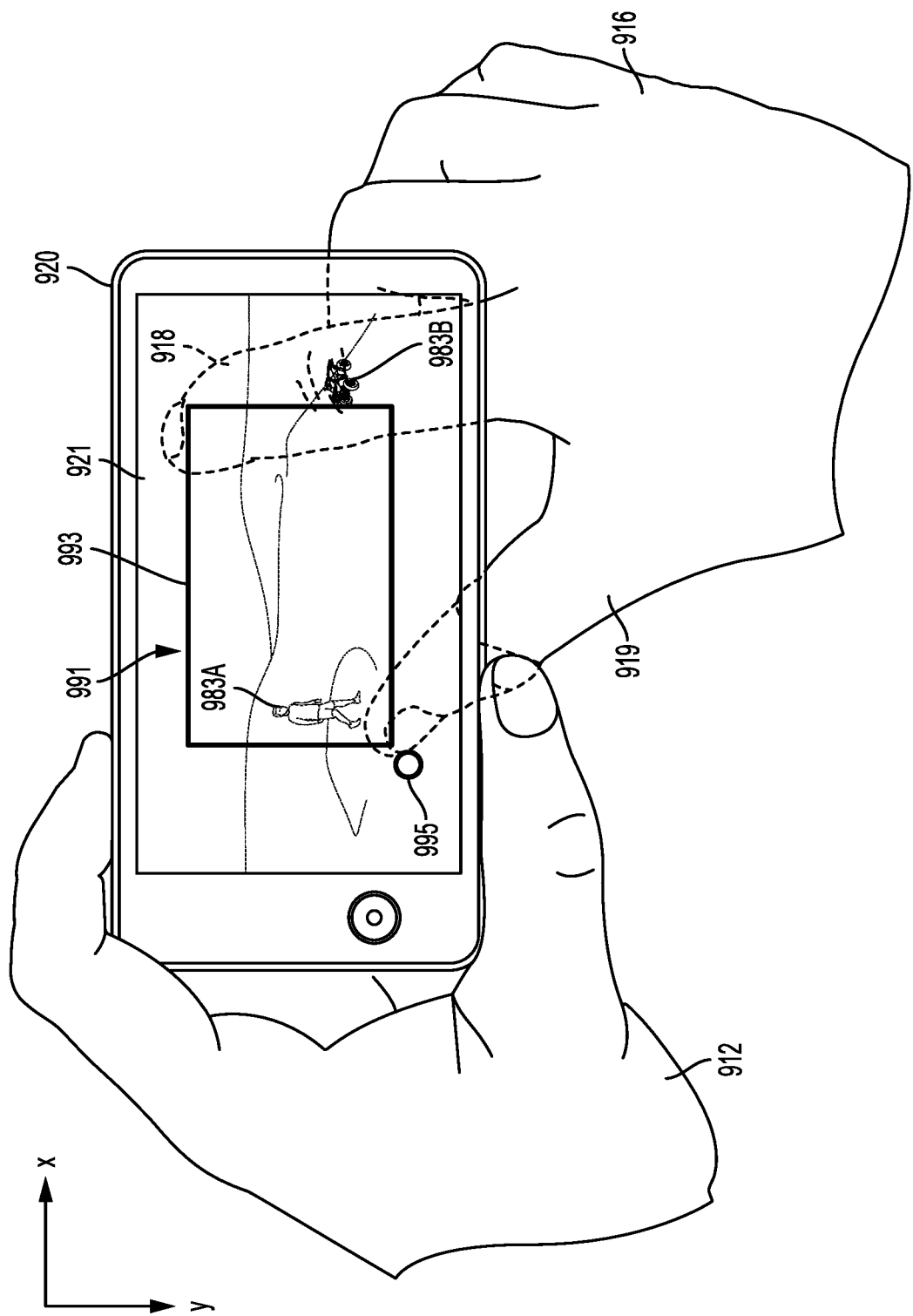

Turning now to FIGS. 9C and 9D, the example user input continues with another movement of the first and second structures 918, 919 of the user input element relative to the display 921 and relative to one another. In this additional movement, the first structure 918 and second structure 919 have translated along the display back toward one another (e.g., in a direction toward the positions illustrated in FIG. 9B). As a result, the pinch gesture or is used by the electronic image capture device 920 to decrease the applied zoom level between FIGS. 9C and 9D as observed by comparing the sizes of the first and second subjects 983A, 983B in these figures. Thus, it will be appreciated that an example pinch and/or expansion of a pinch gesture or series of gestures can be used to control an imaging operation (e.g., to control a zoom level adjustment operation).

Referring now to FIGS. 9B-9D, it can be observed that a location of the second region 995 of the graphical element 991 moves in response to a change in shape and/or position of the first region 993. More specifically, a position of the second region 995 relative to a corner of the first region 993 remains constant even as the first region changes in shape and/or size as the first and second structures 918, 919 move relative to the display 921. As a result, an x-y coordinate distance and direction between the second structure 919 and the second region 995 is maintained as the locations of sensed input associated with the first and second structures 918, 919 move.

Those having skill in the art will appreciate that the electronic image capture device 920 can be configured such that the second region 995 tracks a predetermined portion of the first region 993. For example, as shown, the second region 995 can be considered as tracking a location of a lower, left corner of the first region 993. In other implementations, a portion of the first region 993 that is tracked by the second region 995 can be selected by a user. For example, a user may select a different corner of the depicted first region 993 that the second region 995 can track. Additionally, as mentioned above, those having skill in the art will appreciate that the example of FIGS. 9A-9E can be practiced without the graphical element 991. For example, a user may provide the illustrated inputs, or equivalents thereof, without one or more of the first and second regions 993, 995 being rendered by the display 921. In such an example, the imaging operation discussed below with reference to FIG. 9E can be controlled by a selection of a display area that is persistently positioned in terms of x-y coordinate distance and direction relative to a sensed position of one or both of the first and second structures 918, 918.

Figure 9E:
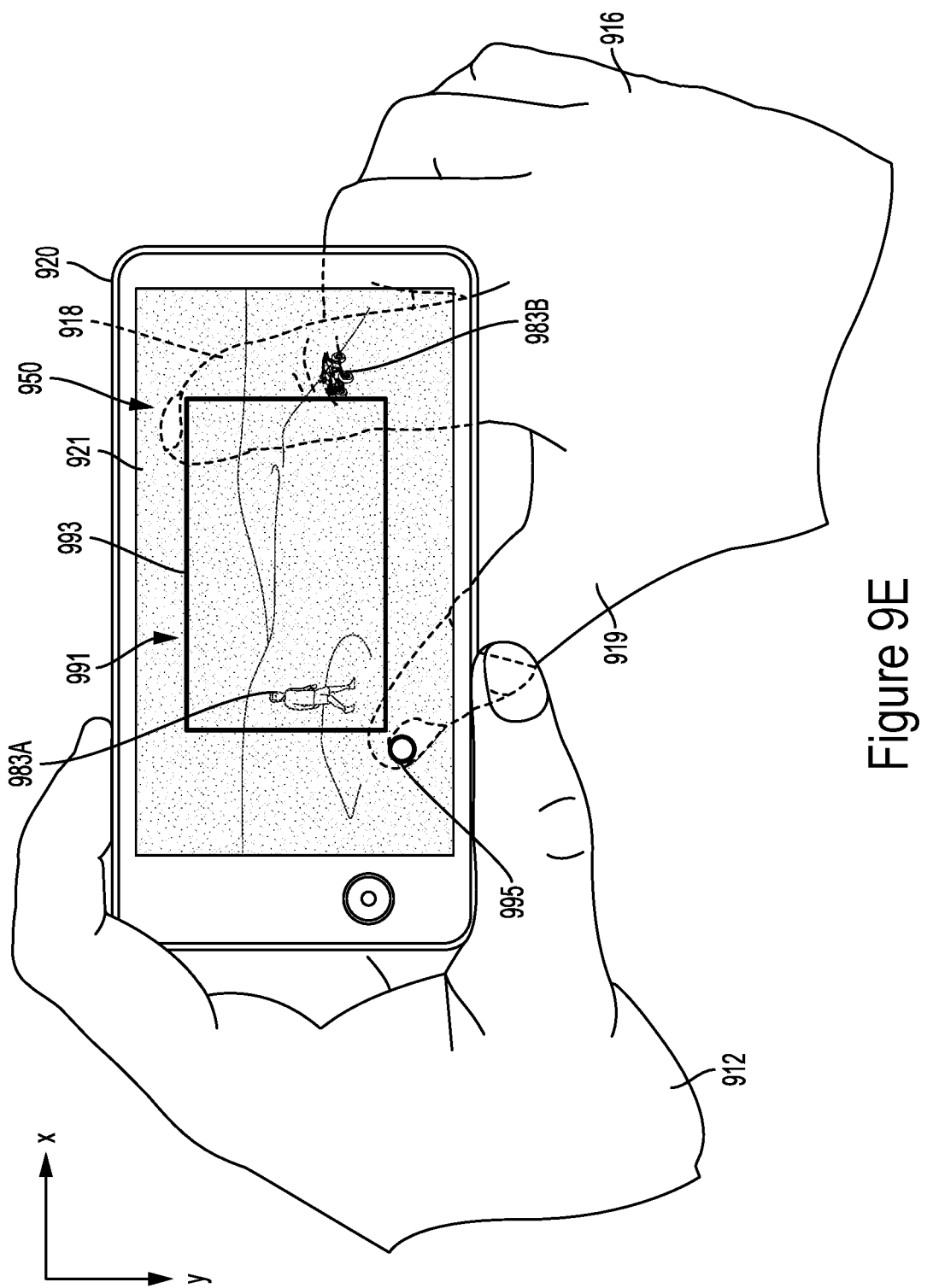

Turning now to FIG. 9E, an advantage and improved user experience provided by the movement of the second region 995 based on the movement of the first and second structures 918, 919 of the user input element is shown. In this figure, the user has moved the second structure 919 to provide a touch input at the second region 995. In some examples, the electronic image capture device 920 can be configured to cause the rear facing camera module to capture an image frame 950 in response to the touch input at the second region 995. Of course, in other examples, additional or alternative imaging operations can be controlled in response to the user input via the second region 995 of the graphical element 991. For example, flash photography, AF, and/or AR operations can be controlled. In any case, because the movement of the second region 995 between FIGS. 9B and 9D tracks the movement of touch input of the first and second structures 918, 919 represented by the first region 993 (e.g., bounding box), a distance is maintained between the second region and a portion of the first region (e.g., the lower, left corner) throughout the user input operation. In this way, an amount of coordination and time required to transition between the first input to control the zoom level (FIGS. 9B-9D) and a second input to control the image capture (FIG. 9E) can be reduced as compared to the examples discussed above with reference to FIGS. 1 and 2.

Still referring to FIG. 9E, in some embodiments a first imaging operation (e.g., zoom level control) based on the locations of input of the first and second structures 918, 919 can be paused or concluded in response to an independent movement of one the first and second structures while the other structure maintains a touch input without moving relative to the input surface of the display 921 (e.g., while the other structure remains stationary relative to the display). For example, as shown, the first structure 918 maintains a touch input on the display 921 and does not move in position between FIGS. 9D and 9E. As a result, the zoom control operation depicted in FIGS. 9B-9E can be paused to allow the user to select the second region 995 to initiate the second imaging operation (e.g., image frame capture). Stated differently, an independent movement of one of the structures can pause a relative movement of the second region 995 relative to the position of the moving structure so as to allow the user to select a still, unmoving region. Those having skill in the art will appreciate that other techniques can be utilized to signal a user's intent to transition between imaging operations and that the user input depicted in FIGS. 9B-9E can be achieved by maintaining touch input by both of the first and second structures 918, 919 throughout the user input or can be achieved by providing intermittent or non-continuous touch input.

Figure 10A:
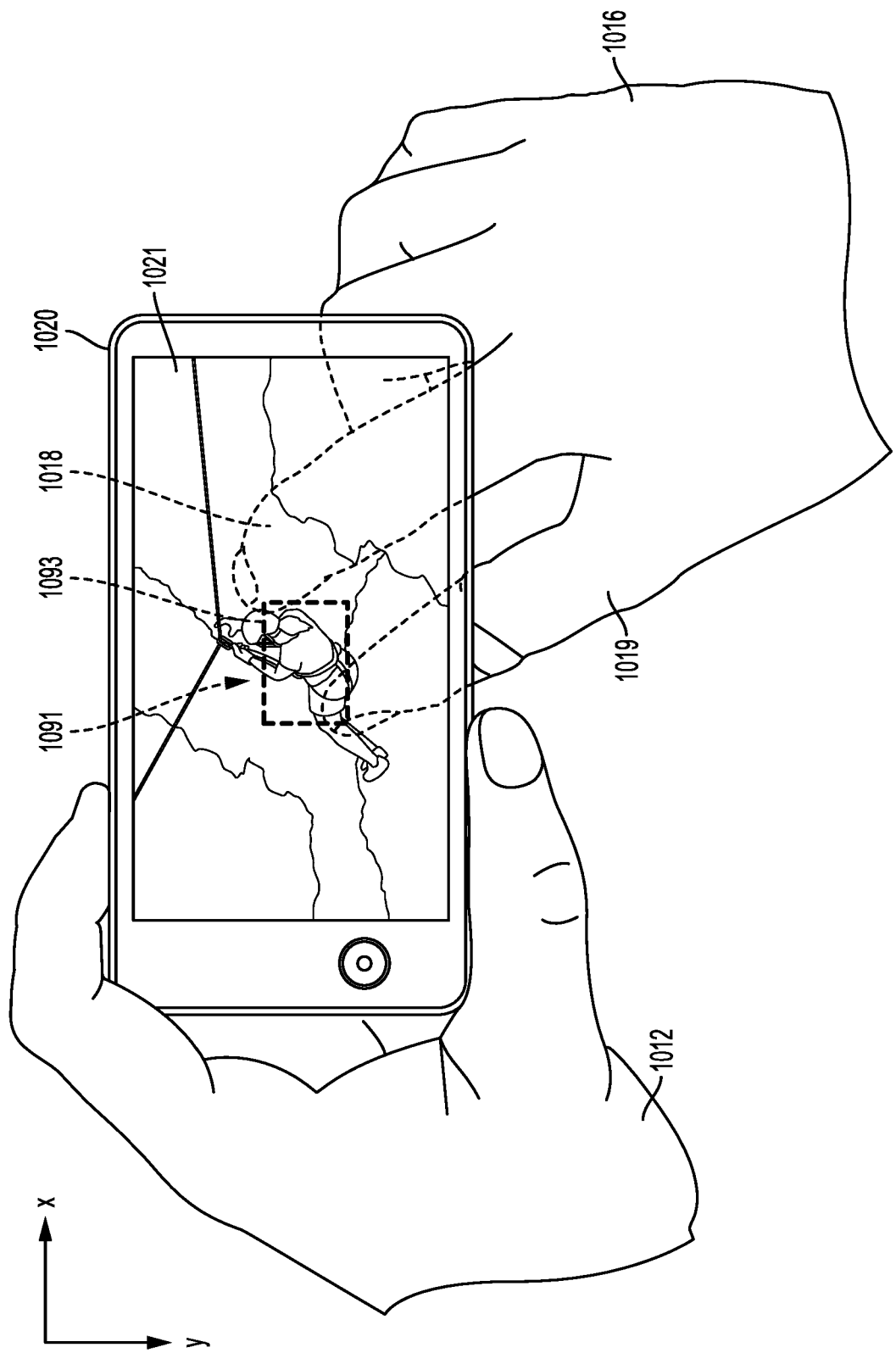
FIGS. 10A-10C depict an additional example of imaging operations controlled in response to user input provided via an input surface of a device.
Figure 10B:
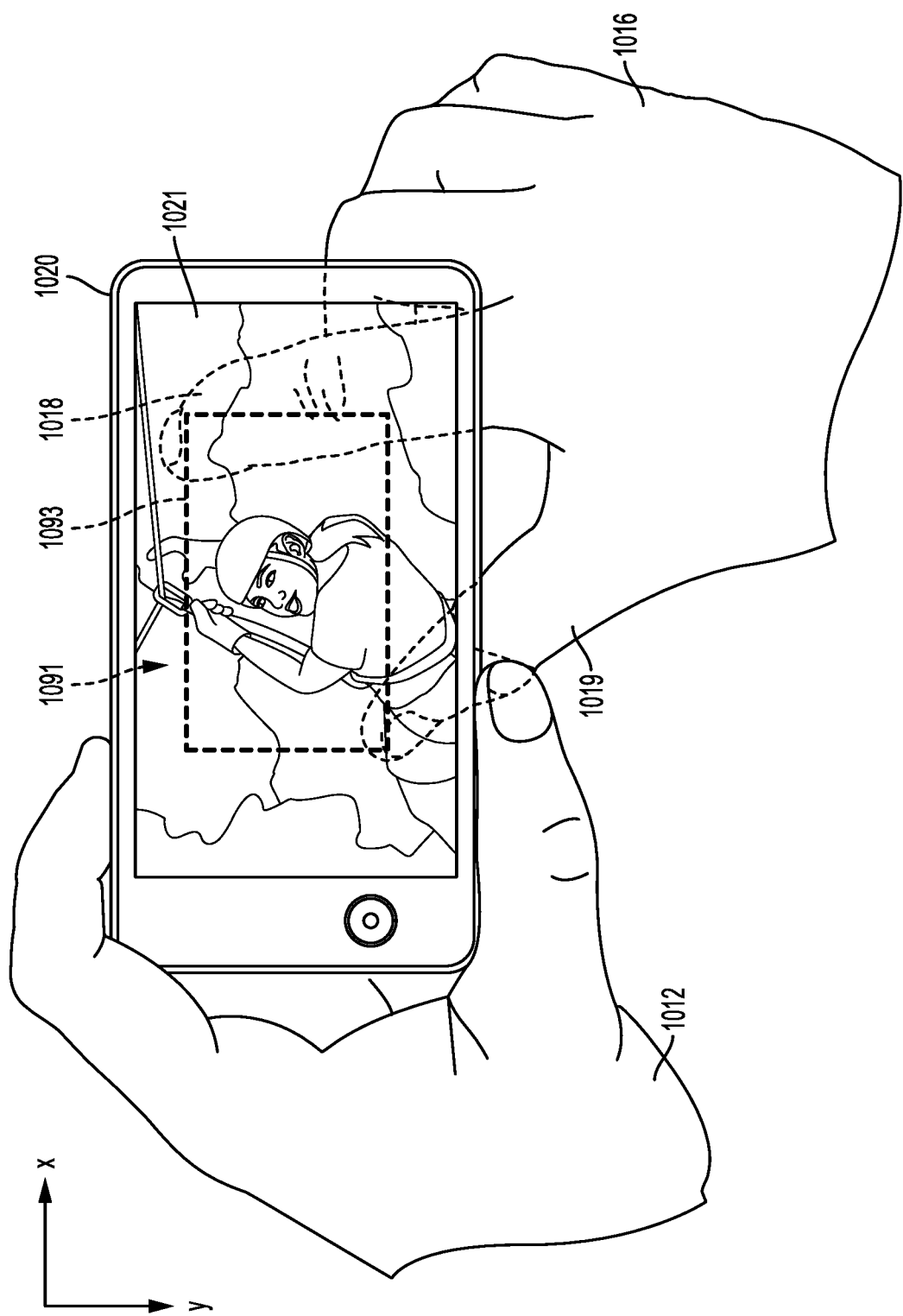
Figure 10C:
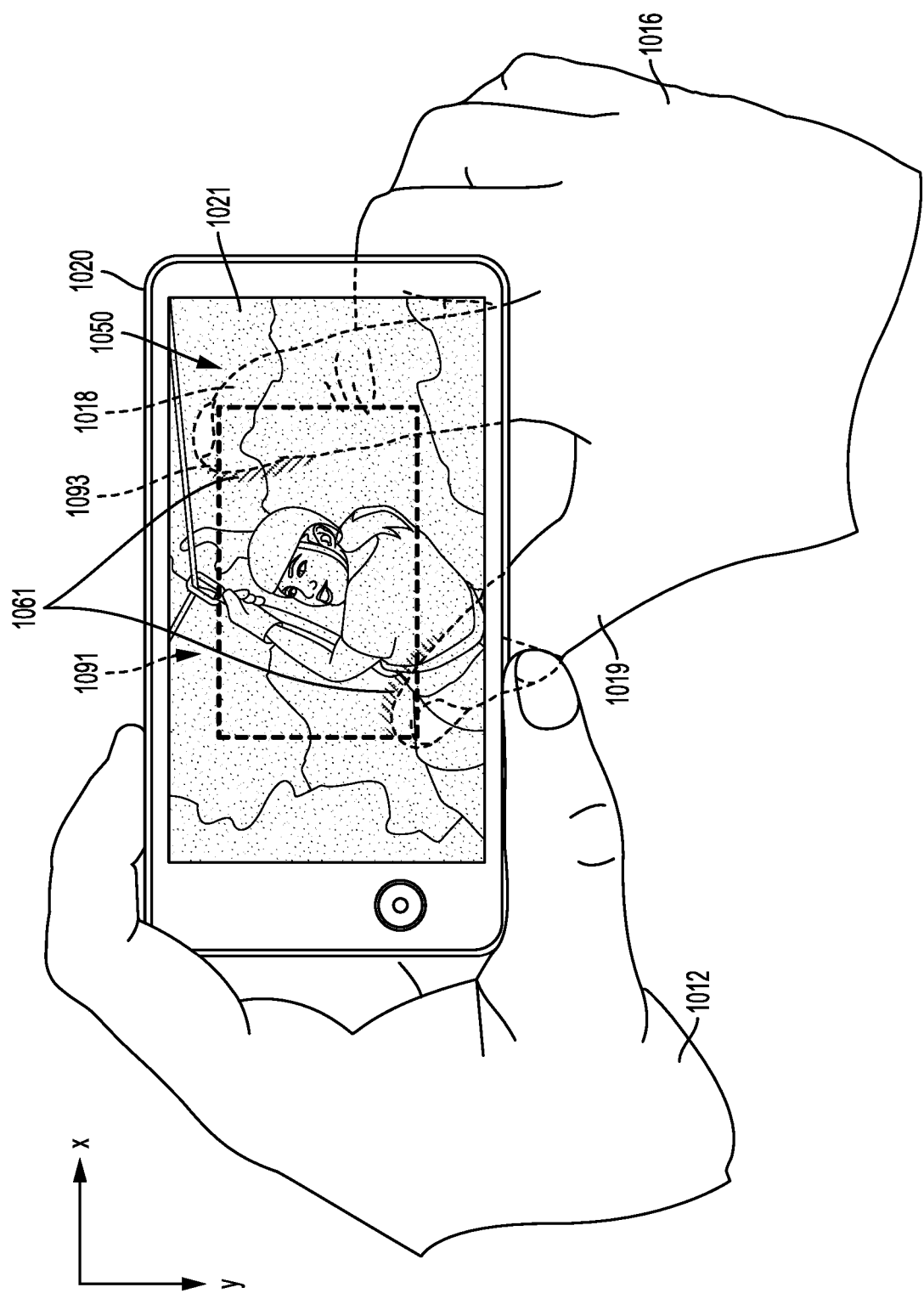

Turning now to FIGS. 10A-10C, imaging operations performed in response to another example of a continuous user input are depicted. FIG. 10A includes an example electronic image capture device 1020 that is supported and positioned by a first hand 1012 of a user to frame a scene. Preview image frames depicting the scene are provided by a display 1021 which optionally outputs a graphical element 1091 including a bounding box 1093 sized and shaped in response to sensed input positions of first and second structures 1018, 1019 (e.g., thumb and forefinger) of a second hand 1016 of the user.

Referring now to FIGS. 10A and 10B, the first and second structures 1018, 1019 can be manipulated relative to one another and relative to an input surface of the display 1021 so as to provide input relating to an imaging operation. For example, as shown, a zoom level control operation is performed in response to an expanded pinch gesture performed between FIG. 10A and FIG. 10B. That is, a zoom level is increased by the movement of the first and second structures 1018, 1019 away from each other and along the display 1021. As with other examples described herein, those having skill in the art will appreciate that different multi-touch gestures can be implemented to control an imaging operation (e.g., to control a zoom level adjustment). In any case, the example movement of the first and second structures 1018, 1019 illustrated in FIGS. 10A and 10B can be considered a first type of user input received during a first portion of a user input with an imaging operation being controlled in response to the first type of user input.

FIG. 10C illustrates a release of the first and second structures 1018, 1019 of the second hand 1016 from the display 1021. The release includes a separation 1061 between the first and second structures 1018, 1019 and the input surface of the display 1021. In response to the release of the first and second structures 1018, 1019, a second imaging operation performed by the electronic image capture device 1020 can be performed. For example, as illustrated, the release of the first and second structures 1018, 1019 can form a second type of user input that causes an image frame 1050 of the scene to be captured. In this way, it will be understood, similar to the examples described above with reference to FIGS. 5 and 6, that multiple structures from one or more input elements can be used to provide a single, continuous user input to efficiently control two or more imaging operations. For example, a first portion of the user input can include a first type of input (e.g., a dragging movement of one or more structures along an input surface) to control a first imaging operation and a second portion of the user input can include a separate type of input (e.g., a different type of movement along the input surface and/or a release from the input surface) to control a second imaging operation. Hence, a user experience when controlling different imaging operations in succession (or near succession) can be improved by minimizing a time and/or coordination required to transition between an input type to control a first imaging operation and an input type to control a second imaging operation.

Figure 11:
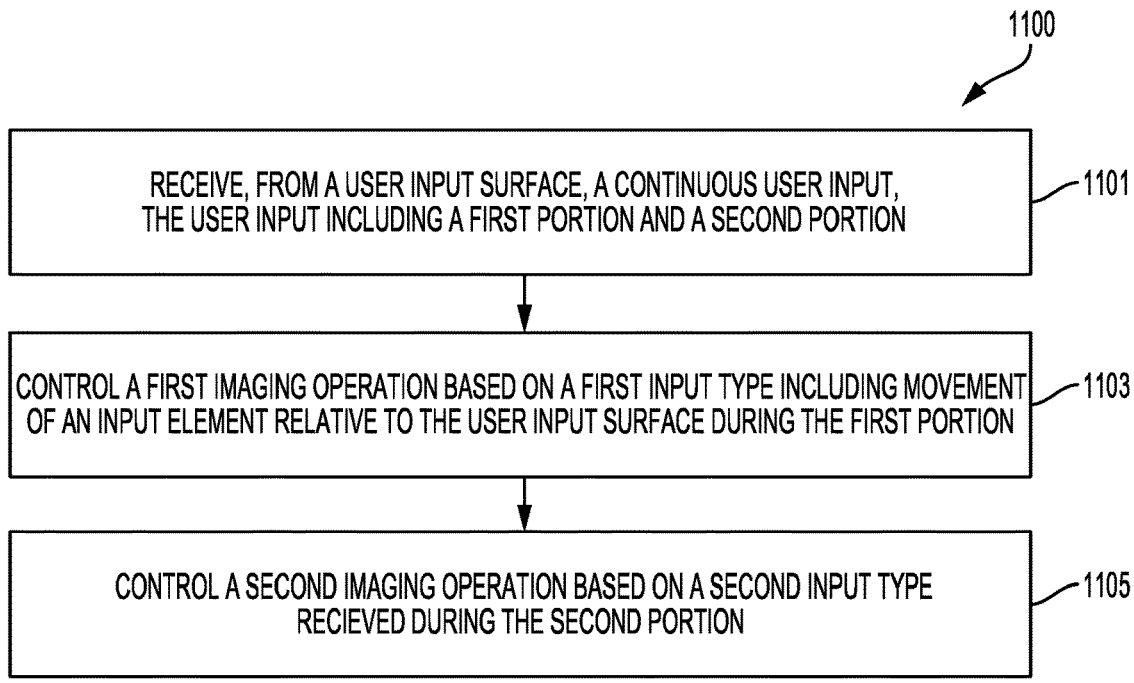
FIG. 11 is a flow chart illustrating an example operation for controlling a first imaging operation and a second imaging operation in response to a continuous user input.

FIG. 11 is a flow chart illustrating an example operation 1100 for controlling a first imaging operation and a second imaging operation in response to a continuous user input. The example operation 1100 can be implemented by the electronic image capture device 400 of FIG. 4. Further, those having skill in the art will appreciate that the operation 1100 can be implemented in other example devices.

The operation 1100 begins at block 1101 with receiving, from a user input surface, a continuous user input including a first portion and a second portion. The user input can be received by a processor. For example, processor 406 of the example device 400 of FIG. 4. In some implementations, the processor can be coupled to a camera module, the user input surface, and a memory. Those having skill in the art will appreciate that the user input surface can be part of a touch-sensitive display.

Turning now to block 1103, the example operation 1100 continues with controlling a first imaging operation based on a first input type including movement of an input element relative to the user input surface during the first portion. In some implementations, the first imaging operation includes a zoom level adjustment operation and the zoom level adjustment can be reflected in a preview stream that is displayed during the first portion. Further, in some implementations the first input type can include a twist of the input element relative to the user input surface and/or a translation of the input element relative to the user input surface. In some implementations, the input element can include one or more fingers or a stylus.

Still referring to FIG. 11, the operation 1100 continues at block 1105 with controlling a second imaging operation based on a second input type received during the second portion. The second imaging operation can optionally be a different type of imaging operation than the first imaging operation. For example, the second imaging operation can include an AF operation, a flash photography operation, an AE operation, an image capture operation, etc. In some implementations, the second input type can include a release of the input element from the user input surface and/or a translation of the input element relative to the user input surface.

Still referring to FIG. 11, as discussed above, in some examples the operation can include causing a touch-sensitive display including the user input surface to display one or more graphical user interface elements. For example, a graphical user interface element can be displayed in a predetermined and persistent location or a location of the graphical user interface element can be based on a relative position of the user interface element when the user input is initiated. In some embodiments, the graphical user interface element can include a first region and a second region. The first input type can include movement of the input element over at least a portion of the first region and the second input type can include movement along the user input surface between the first region and the second region. Moreover, in some implementations, movement of the input element during the first portion can cause the second region to move relative to the first region during the first portion. For example, movement of the second region during the first portion can track a location of the input element relative to the user input surface as the input element moves relative to the first region.

Those having skill in the art will appreciate that a device implementing the example operation 1100 of FIG. 11 can include two or more camera modules. In such examples, the first and second imaging operations can be associated with a first camera module and other imaging operations associated with a second camera can be controlled in response to a second user input. For example, the operation can optionally include receiving a second continuous user input including a first portion and a second portion, and controlling a first imaging operation associated with the second camera module based on a first input type received during the first portion of the second continuous user input. The first input type received during the first portion of the second continuous user input can be similar or different than the first input type received during the first portion of the first continuous user input. Additionally, the first imaging operation associated with the second camera module can be similar or different than the first imaging operation performed in response to the first portion of the continuous user input of block 1101. In this way, different camera modules (e.g., front and rear facing camera modules on an example device) can be controlled differently, or similarly, via separate continuous user inputs. For example, the first imaging operation associated with each camera module can relate to a zoom level adjustment. However, a receivable range of motion to control the first imaging operation associated with the first camera module can be different than a receivable range of motion to control the first imaging operation associated with the second camera module to account for differences in input elements (e.g., a thumb vs. a forefinger) that may be expected for each camera module.

Figure 12:
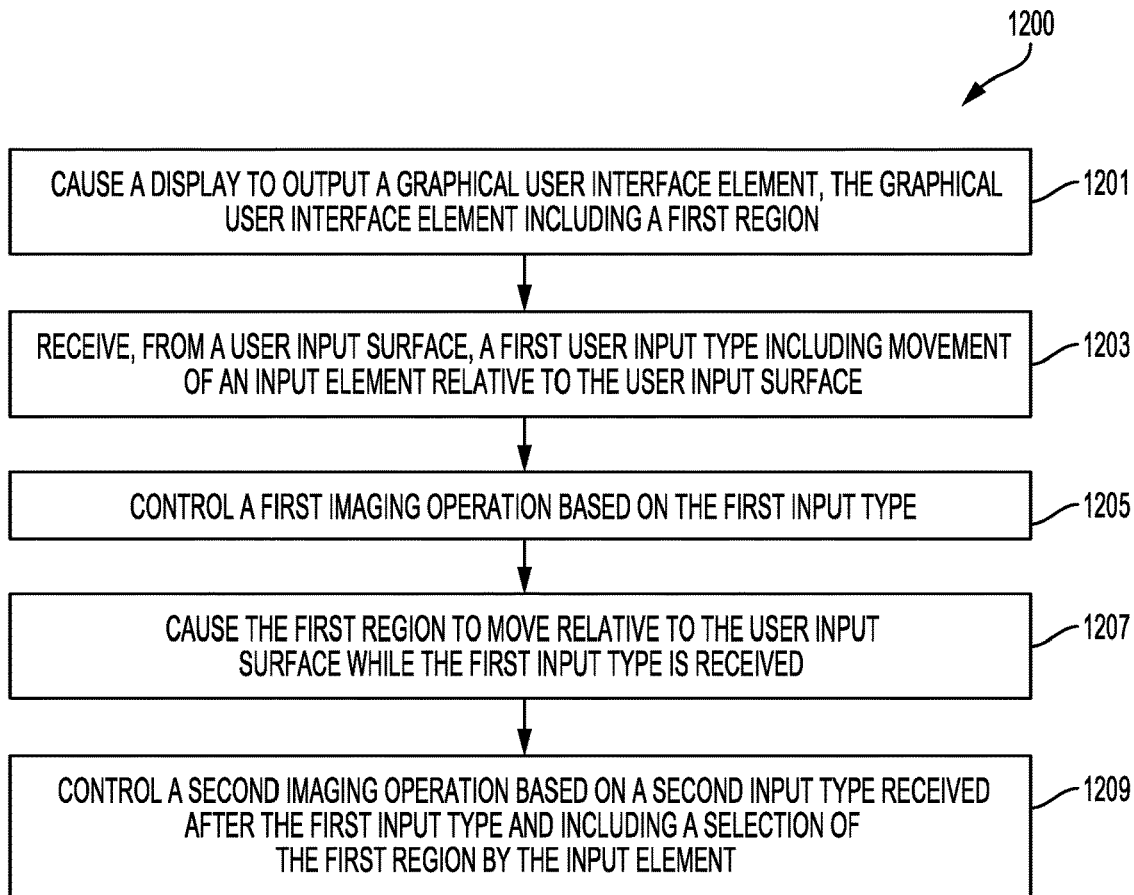
FIG. 12 is a flow chart illustrating another example operation for controlling a first imaging operation and a second imaging operation.

FIG. 12 is a flow chart illustrating another example operation 1200 for controlling a first imaging operation and a second imaging operation. The operation 1200 begins at block 1201 with causing a display to output a graphical user interface element including a first region. In some examples, the graphical user interface element can be part of a graphical user interface that is output by a touch-sensitive display of a device that also includes a memory, a processor, and a camera module.

Referring now to block 1203, the operation 1200 continues with receiving, from a user input surface of the display, a first user input type including movement of an input element relative to the user input surface. In some examples, the input element can include a digit of a hand (e.g., a thumb and/or finger) or a stylus. Additionally, in some examples, the movement of the input element relative to the user input surface can include a continuous tactile or touch input (e.g., a drag touch gesture). In other examples, a contact between the input element and the user input surface during the first user input type can be intermittent or the input element may provide a touchless gesture or input. Skilled artisans will appreciate that the first input type can include different forms of movement of the input element relative to the user input surface. For example, a twist and/or a translational movement.

Block 1205 of operation 1200 includes controlling a first imaging operation based on the first input type. In some examples, the first imaging operation can include an AF operation, an AE operation, a flash photography operation, a region of interest tracking operation, a camera mode selection operation, and/or a zoom level adjustment operation. Further, in some embodiments, the processor can optionally be configured to cause the display to output a preview stream received from the camera module while the first input type is received to provide feedback to a user related to the first imaging operation.

Turning now to block 1207, the first region is caused to move relative to the user input surface while the first input type is received. In some examples, the movement of the first region can be based on a motion of the input element relative to user input surface. For examples, the first region can move to track a position of the input element relative to the user input surface. In this way, a distance and/or a direction between the input element and the first region can be maintained while the first input type is received. In some implementations, at least one of the distance and/or direction between the input element and the first region can be user adjustable and/or selectable. Those having skill in the art will appreciate that the movement of the first region can facilitate a transition between the first input type and a second input type.

Still referring to FIG. 12, in some implementations the graphical user interface element can include a second region. For example, a second region of the graphical user interface element can be maintained in a stationary location relative to the user input surface while the first input type is received. The first input type can include a movement of the input element over at least a portion of the second region. As discussed above, in some examples, the graphical user interface element can include a third region that moves relative to the second region and that tracks a movement of the first region. For example, a user may provide input via the third region and the third region can move along with the location of user input.

Turning now to block 1209, the operation includes controlling a second imaging operation based on a second input type that is received after the first input type. The second input type includes a selection of the first region by the input element. In some examples, the second imaging operation can include an image frame capture operation. Or course, the first input type can optionally be received during a first portion of a continuous user input with the second input type received during a second portion of the continuous user input. In this optional embodiment, the second input type can include a translation of the input structure relative to the input surface. For example, the input element can include a first structure (e.g., a finger) and a second structure (e.g., a thumb and/or finger). In this example, the first and second structures can move relative to one another and relative to the user input surface while the first input type is received. Further, one of the first and second structures can remain stationary while the second input type is received while the other moves relative to the user input surface to select the first region of the graphical user interface element.

Finally, it should be noted that the example operation 1200 of FIG. 12 can be implemented in an electronic image capture device (e.g., any of the devices described herein) including, or having access to, a camera module. In devices having two or more camera modules, the devices may be configured to output a first graphical user interface element to control imaging operations associated with a first camera module, and to output a second graphical user interface element to control imaging operations associated with the second camera module. In this way, the similar imaging operations related to the first and second camera modules can be controlled based on inputs received from differently configured graphical user interface elements. Alternatively, different imaging operations associated with each camera module can be controlled based on inputs received from similarly configured graphical user interface elements.

Certain aspects and embodiments of this disclosure have been provided above. Some of these aspects and embodiments may be applied independently and some of them may be applied in combination as would be apparent to those of skill in the art. In the foregoing description, for the purposes of explanation, specific details are set forth in order to provide a thorough understanding of embodiments of the invention. However, it will be apparent that various embodiments may be practiced without these specific details. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Moreover, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Further, the various illustrative logical blocks, modules, circuits, and algorithm steps described in connection with the embodiments disclosed herein may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASIC s), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A device comprising:
a memory; and
a processor coupled to an image sensor, a display having a user input surface, and the memory, the processor configured to:
cause the display to output a graphical user interface, the graphical user interface including a first element;
receive, from the user input surface, a first input type including movement of an input element relative to the user input surface;
control a zoom level adjustment operation based on the first input type;
cause the first element to move relative to the user input surface while the first input type is received, wherein the first element is spaced apart along the user input surface from a location of the input element while the first input type is received, and wherein a distance between the input element and the first element is persistent while the first input type is received; and
control a second imaging operation based on a second input type, wherein the second imaging operation includes an image frame capture operation or a video capture operation, and wherein the second input type is received after the first input type and includes an interaction with the first element of the graphical user interface by the input element.

2. The device of claim 1, further comprising:
the image sensor; and
the display.

3. The device of claim 2, wherein the processor is configured to cause the display to output a preview stream received from the image sensor while the first input type is received.

4. The device of claim 3, wherein the second imaging operation is different than the zoom level adjustment operation.

5. The device of claim 4, wherein the second imaging operation includes an image frame capture operation.

6. The device of claim 1, wherein the processor is configured to cause the display to output a second element of the graphical user interface in response to an initiation of the first input type, and wherein the second element is spaced apart along the user input surface from the first element during the zoom level adjustment operation and the second imaging operation.

7. The device of claim 1, wherein the movement of the first element while the first input type is received is based on a motion of the input element relative to the user input surface.

8. The device of claim 7, wherein the movement of the first element while the first input type is received tracks a position of the input element relative to the user input surface.

9. The device of claim 7, wherein a direction between the input element and the first element while the first input type is received is persistent.

10. The device of claim 9, wherein the processor is further configured to:
receive a selection from a user setting the distance or direction between the input element and the first element for use during a reception of the first input type.

11. The device of claim 1, wherein the graphical user interface includes a second element spaced apart along the user input surface from the first element.

12. The device of claim 11, wherein the second element is stationary relative to the user input surface while the first input type is received.

13. The device of claim 12, wherein the first input type includes a movement of the input element over at least a portion of the second element.

14. The device of claim 13, wherein the first input type includes a twist of the input element relative to the user input surface.

15. The device of claim 13, wherein the first input type includes a translation of the input element relative to the user input surface.

16. The device of claim 13, wherein the second element includes a zoom level indicator.

17. The device of claim 1, wherein the processor is coupled to a second image sensor, the second image sensor facing a different direction than the image sensor, the processor configured to:
receive, from the user input surface, a third input type including movement of an input element relative to the user input surface;
control a first imaging operation associated with the second image sensor based on the third input type;
cause an element of the graphical user input surface to move relative to the user input surface while the third input type is received; and
control a second imaging operation associated with the second image sensor based on a fourth input type, wherein the fourth input type is received after the third input type and includes an interaction with the element of the graphical user interface by the input element.

18. The device of claim 17, wherein the element of the graphical user interface element differs in at least one of size and shape from the first element of the graphical user interface.

19. A method comprising:
causing a display to output a graphical user interface, the graphical user interface including a first element;
receiving, from a user input surface, a first input type including movement of an input element relative to the user input surface;
controlling a zoom level adjustment operation based on the first input type;
causing the first element to move relative to the user input surface while the first input type is received, wherein the first element is spaced apart along the user input surface from a location of the input element while the first input type is received, and wherein a distance between the input element and the first element is persistent while the first input type is received; and
controlling a second imaging operation based on a second input type, wherein the second imaging operation includes an image frame capture operation or a video capture operation, and wherein the second input type is received after the first input type and includes an interaction with the first element of the graphical user interface by the input element.

20. The method of claim 19, further comprising causing the display to output a preview stream received from an image sensor while the first input type is received.

21. The method of claim 20, wherein the second imaging operation is different than the zoom level adjustment operation.

22. The method of claim 21, wherein the second imaging operation includes an image frame capture operation.

23. The method of claim 19, further comprising causing the display to output a second element of the graphical user interface in response to an initiation of the first input type, and wherein the second element is spaced apart along the user input surface from the first element during the zoom level adjustment operation and the second imaging operation.

24. The method of claim 19, wherein the movement of the first element while the first input type is received is based on a motion of the input element relative to the user input surface.

25. The method of claim 24, wherein the movement of the first element while the first input type is received tracks a position of the input element relative to the user input surface.

26. The method of claim 24, wherein a direction between the input element and the first element while the first input type is received is persistent.

27. The method of claim 19, further comprising receiving a selection from a user setting the distance or direction between the input element and the first element for use during a reception of the first input type.

28. The method of claim 19, wherein the graphical user interface includes a second element spaced apart along the user input surface from the first element.

29. The method of claim 28, wherein the second element is stationary relative to the user input surface while the first input type is received.

30. The method of claim 29, wherein the first input type includes a movement of the input element over at least a portion of the second element.

31. The method of claim 30, wherein the first input type includes a twist of the input element relative to the user input surface.

32. The method of claim 30, wherein the first input type includes a translation of the input element relative to the user input surface.

33. The method of claim of claim 30, wherein the second element includes a zoom level indicator.

34. A non-transitory computer-readable storage medium storing instructions thereon that when executed cause one or more processors to:
cause the display to output a graphical user interface, the graphical user interface including a first element;
receive, from the user input surface, a first input type including movement of an input element relative to the user input surface;
control a zoom level adjustment operation based on the first input type;
cause the first element to move relative to the user input surface while the first input type is received, wherein the first element is spaced apart along the user input surface from a location of the input element while the first input type is received, and wherein a distance between the input element and the first element is persistent while the first input type is received; and
control a second imaging operation based on a second input type, wherein the second imaging operation includes an image frame capture operation or a video capture operation, and wherein the second input type is received after the first input type and includes an interaction with the first element of the graphical user interface by the input element.

* * * * *